United States Patent
Wessells et al.

(10) Patent No.: US 10,862,168 B2
(45) Date of Patent: Dec. 8, 2020

(54) ELECTROLYTE ADDITIVES FOR ELECTROCHEMICAL DEVICES

(71) Applicant: Natron Energy, Inc., Santa Clara, CA (US)

(72) Inventors: Colin Deane Wessells, Palo Alto, CA (US); Shahrokh Motallebi, Los Gatos, CA (US)

(73) Assignee: Natron Energy, Inc., Santa Clara, CA (US)

(*) Notice: Subject to any disclaimer, the term of this patent is extended or adjusted under 35 U.S.C. 154(b) by 0 days.

(21) Appl. No.: 16/215,339

(22) Filed: Dec. 10, 2018

(65) Prior Publication Data

US 2019/0109347 A1   Apr. 11, 2019

Related U.S. Application Data

(63) Continuation of application No. 15/829,912, filed on Dec. 2, 2017, which is a continuation-in-part of
(Continued)

(51) Int. Cl.
*H01M 10/0567* (2010.01)
*H01M 10/34* (2006.01)
(Continued)

(52) U.S. Cl.
CPC ......... *H01M 10/0567* (2013.01); *H01M 4/36* (2013.01); *H01M 4/485* (2013.01); *H01M 4/505* (2013.01); *H01M 4/58* (2013.01); *H01M 4/60* (2013.01); *H01M 4/628* (2013.01); *H01M 4/9008* (2013.01); *H01M 8/188* (2013.01); *H01M 10/056* (2013.01);
(Continued)

(58) Field of Classification Search
CPC .......... H01M 10/056; H01M 10/0567; H01M 10/4235; H01M 10/44
USPC .......................................... 429/213
See application file for complete search history.

(56) References Cited

U.S. PATENT DOCUMENTS

| 5,869,207 A | 2/1999 | Saidi et al. |
| 6,277,525 B1 | 8/2001 | Yamamoto et al. |

(Continued)

FOREIGN PATENT DOCUMENTS

| CN | 102522553 A | 6/2012 |
| EP | 86555 A1 | 8/1983 |

(Continued)

OTHER PUBLICATIONS

Huggins, Robert A., Advanced Batteries: Materials Science Aspects, 2008, Springer, pp. 27-36.*

(Continued)

*Primary Examiner* — James M Erwin
(74) *Attorney, Agent, or Firm* — Patent Law Offices of Michael E. Woods

(57) ABSTRACT

A system and method for stabilizing electrodes against dissolution and/or hydrolysis including use of cosolvents in liquid electrolyte batteries for three purposes: the extension of the calendar and cycle life time of electrodes that are partially soluble in liquid electrolytes, the purpose of limiting the rate of electrolysis of water into hydrogen and oxygen as a side reaction during battery operation, and for the purpose of cost reduction.

29 Claims, 50 Drawing Sheets

Related U.S. Application Data application No. 15/442,634, filed on Feb. 25, 2017, now abandoned, and a continuation-in-part of application No. 15/062,171, filed on Mar. 6, 2016, now Pat. No. 9,972,867, which is a continuation of application No. 14/231,571, filed on Mar. 31, 2014, now Pat. No. 9,287,589, and a continuation-in-part of application No. 13/892,982, filed on May 13, 2013, now Pat. No. 9,853,318.

(60) Provisional application No. 61/810,684, filed on Apr. 10, 2013, provisional application No. 61/722,049, filed on Nov. 2, 2012.

(51) Int. Cl.
| | | |
|---|---|---|
| H01M 4/60 | (2006.01) | |
| H01M 4/90 | (2006.01) | |
| H01M 8/18 | (2006.01) | |
| H01M 10/08 | (2006.01) | |
| H01M 4/36 | (2006.01) | |
| H01M 4/505 | (2010.01) | |
| H01M 10/0568 | (2010.01) | |
| H01M 10/0569 | (2010.01) | |
| H01M 4/485 | (2010.01) | |
| H01M 10/36 | (2010.01) | |
| H01M 4/58 | (2010.01) | |
| H01M 10/056 | (2010.01) | |
| H01M 10/44 | (2006.01) | |
| H01M 10/42 | (2006.01) | |
| H01M 4/62 | (2006.01) | |
| H01M 4/02 | (2006.01) | |

(52) U.S. Cl.
CPC ... *H01M 10/0568* (2013.01); *H01M 10/0569* (2013.01); *H01M 10/08* (2013.01); *H01M 10/345* (2013.01); *H01M 10/36* (2013.01); *H01M 10/4235* (2013.01); *H01M 10/44* (2013.01); *H01M 2004/027* (2013.01); *H01M 2220/10* (2013.01); *H01M 2220/20* (2013.01); *H01M 2250/10* (2013.01); *H01M 2250/20* (2013.01); *H01M 2300/002* (2013.01); *H01M 2300/0002* (2013.01); *H01M 2300/004* (2013.01); *H01M 2300/0025* (2013.01); *H01M 2300/0028* (2013.01); *H01M 2300/0037* (2013.01); *H01M 2300/0091* (2013.01); *Y02B 90/10* (2013.01); *Y02E 60/50* (2013.01); *Y02T 90/40* (2013.01)

(56) References Cited

U.S. PATENT DOCUMENTS

| | | | |
|---|---|---|---|
| 6,436,582 | B1 | 8/2002 | Hamamoto et al. |
| 6,924,061 | B1 | 8/2005 | Jow et al. |
| 8,308,971 | B1 | 11/2012 | Bhat et al. |
| 9,123,966 | B2 | 9/2015 | Wessells et al. |
| 9,130,234 | B2 | 9/2015 | Wessells et al. |
| 9,287,589 | B2 | 3/2016 | Wessells et al. |
| 2005/0019670 | A1 | 1/2005 | Amine et al. |
| 2007/0117007 | A1 | 5/2007 | Visco et al. |
| 2009/0007961 | A1 | 1/2009 | Morooka |
| 2009/0035662 | A1 | 2/2009 | Scott et al. |
| 2009/0087742 | A1 | 4/2009 | Martinet et al. |
| 2009/0280410 | A1 | 11/2009 | Zaguib et al. |
| 2010/0216019 | A1 | 8/2010 | Morishima |
| 2010/0221596 | A1 | 9/2010 | Huggins et al. |
| 2011/0189548 | A1* | 8/2011 | Xu .................. H01M 6/00 429/332 |
| 2012/0214047 | A1 | 8/2012 | Kwak et al. |
| 2012/0328936 | A1 | 12/2012 | Wessells et al. |
| 2013/0052538 | A1 | 2/2013 | Pasta et al. |
| 2013/0224606 | A1* | 8/2013 | Koh .................. H01G 11/62 429/332 |
| 2013/0224632 | A1 | 8/2013 | Roumi |
| 2013/0260232 | A1 | 10/2013 | Lu et al. |
| 2013/0266857 | A1* | 10/2013 | Lee .................. H01M 4/0471 429/211 |
| 2014/0127591 | A1* | 5/2014 | Wessells ............ C25D 17/10 429/347 |
| 2014/0308544 | A1* | 10/2014 | Wessells ............ H01M 10/36 429/50 |
| 2016/0293938 | A1* | 10/2016 | Takeuchi ............ H01B 1/127 |

FOREIGN PATENT DOCUMENTS

| | | |
|---|---|---|
| EP | 0131392 A1 | 1/1985 |
| WO | 2012177932 A2 | 12/2012 |
| WO | 2013032567 A1 | 3/2013 |
| WO | 2013157660 A1 | 10/2013 |

OTHER PUBLICATIONS

Asakura, D., et al. Fabrication of a Cyanide-Bridged Coordination Polymer Electrode for Enhanced Electrochemical Ion Storage Ability. J. Phys. Chem. C, 116, 8364 (2012).

Bellomo, A. Formation of Copper(II), Zinc(I), Silver(I), and Lead(II) Ferrocyanides. Talanta, 17, 1109 (1970).

Buser, H. J., et al. The Crystal Structure of Prussian Blue: $Fe_4[Fe(CN)_6]_3$-$xH_2O$. Inorg. Chem., 16, 2704 (1977).

Casado, J., et al. Photogalvanic Behavior of $K_3Mn(CN)_6$ in CN-Aqueous Solutions. Electrochim. Acta., 35, 427 (1990).

Catala, L., et al. Core-Multishell Magnetic Coordination Nanoparticles: Toward Multifunctionality on the Nanoscale. Angew. Chem. Int. Ed., 121, 189 (2009).

Clauss, V. D., et al. Über Hexacyanomanganate(I) und Hexacyanorenat(I), Z. Anorg. Allg. Chem., 297, 300 (1958).

Colin D. Wessells et al: "The Effect of Insertion Species on Nanostructured Open Framework Hexacyanoferrate Battery Electrodes", Journal of the Electrochemical Society, vol. 159, No. 2, Jan. 1, 2012 (Jan. 1, 2012 ), p. A98, XP055092033, ISSN: 0013-4651, DOI: 10.1149/2.060202jes.

Eftekhari, A. Fabrication of all-solid-state thin-film secondary cells using hexacyanometalate-based electrode materials. J. Power Sources, 132, 291 (2004).

Grabner, E. W., and Kalwellis-Mohn, S. Hexacyanoferrate layers as electrodes for secondary cells. J. Appl. Electrochem., 17, 653 (1987).

Griffith, W. P. Cyanide Complexes of the Early Transition Metals (Groups IVa-VIIa). Coord. Chem. Rev., 17, 177 (1975).

Her, J.-H., et al. Anomalous Non-Prussian Blue Structures and Magnetic Ordering of $K_2MnII[MnII(CN)_6]$ and $Rb_2MnII[MnII(CN)_6]$. Inorg. Chem., 49, 1524 (2010).

Honda, K. and Hayashi, H. Prussian Blue Containing Nafion Composite Film as Rechareable Battery. J. Electrochem. Soc., 134, 1339 (1987).

Hongkyung Lee et al: "Sodium zinc hexacyanoferrate with a welldefined open framework as a positive electrode for sodium ion batteries", Chemical Communications, vol. 48, No. 67, Jan. 1, 2012 (Jan. 1, 2012 ), p. 8416, XP055092042, ISSN: 1359-7345, DOI: 10.1039/c2cc33771 a.

Huihui Wang et al: "One-step synthesis and self-organization of polypyrrole ultrathin films inlayed with Prussian blue nanoparticles induced by a drop of toluene solution on water surface", Thin Solid Films, Elsevier-Sequoias.A. Lausanne, CH, vol. 520, No. 6, Sep. 28, 2011 (Sep. 28, 2011), pp. 2026-2031, XP028444283, ISSN: 0040-6090, DOI: 10.1016/J.TSF.2011.09.077 [retrieved on Oct. 6, 2011].

Itaya, K., et al. Electrochemistry of Polynuclear Transition Metal Cyanides: Prussian Blue and Its Analogues. Acc. Chem. Res., 19, 162 (1986).

Jayalakshmi, M., and Scholz, F. Charge-discharge characteristics of a solid-state Prussian blue secondary cell. J. Power Sources, 87, 212 (2000).

(56) References Cited

OTHER PUBLICATIONS

Jayalakshmi, M., and Sholz, F. Performance characteristics of zinc hexacyanoferrate/Prussian blue and copper hexacyanoferrate/Prussian blue sold state secondary cells. J. Power Sources, 91, 217 (2000).

Jianping Li et al: "Highly Sensitive Molecularly Imprinted Electrochemical Sensor Based on the Double Amplification by an Inorganic Prussian Blue Catalytic Polymer and the Enzymatic Effect of Glucose Oxidase", Analytical Chemistry, vol. 84, No. 4, Feb. 21, 2012 (Feb. 21, 2012 ), pp. 1888-1893.

Kalwellis-Mohn, S., and Grabner, E. W. A Secondary Cell Based on Thin Film Layers of Zeolite-Like Nickel Hexacyanometallates. Electrochim. Acta., 34, 1265 (1989).

Kaneko, M., and Okada, T. A secondary battery composed of multilayer Prussian Blue and its reaction characteristics. J. Electroanal. Chem., 255, 45 (1988).

Kasem K K ED—Crupi DR et al: "Electrochemkal behavior of iron-hexacyanoruthenate(II) thin films in aqueous electrolytes: potential analytical and catalytic applications", Materials Science and Engineering B, Elsevier Sequoia, Lausanne, CH, vol. 83, No. 1-3, Jun. 21, 2001 (Jun. 21, 2001), pp. 97-105.

López-Cueto, G., et al. Fast disproportionation of hexacyanomanganate(III) in acidic solution. Formation of hexacyanomanganate(IV) and kinetics of its decomposition. Can. J. Chem., 64, 2301 (1986).

M. Presle et al: Controlled growth of core@shell heterostructures.

Messina, R., and Perichon, J. Mécanisme de la réduction électrochimique en milieu non aqueux de materiaux cathodiques utilizes dan les piles au lithium. V. Utilisation des hexacyanoferrates de fer (II et III) comme materiaux cathodiques reversibles. J. Appl. Electrochem., 10, 655 (1980).

Messina, R., Perichon, J., and Broussely, M. Mécanismes de la réduction électrochimique en milieu non aqueux de materiaux cathodiques utilizes dans les piles au lithium. IV. Réduction d'électrodes membranaires d'hexacyanoferrates (II et III) d'argent dans le mélange carbonate de propylene-1,2-diméthoxyéthane. J. Appl. Electrochem., 9, 677 (1979).

Neff, V. D. Some Performance Characteristics of a Prussian Blue Battery. J. Electrochem. Soc., 132, 1382 (1985).

Okubo, M., et al. Switching Redox-Active Sites by Valence Tautomerism in Prussian Blue Analaogues AxMny[Fe(CN)6]-nH2O (A: K, Rb): Robust Frameworks for Reversible Li Storage. J. Phys. Chem. Lett., 1, 2063 (2010).

Pasta, M., et al. A high-rate and long cycle life aqueous electrolyte battery for grid-scale energy storage. Nature Comm., 3, 1149 (2012).

Rastler, D. Electricity Energy Storage Technology Options, Electric Power Research Institute, 1020676 (2010).

Robin, M. B., The Color and Electronic Configurations of Prussian Blue. Inorg. Chem., 1, 337 (1962).

Scholz, F., et al. The Formal Potentials of Solid Metal Hexacyanometalates. Angew. Chem. Int. Ed. Engl., 34, 2685 (1995).

Schwochau, V. K., et al. Darstellung und Eigenschaften von Kalium-cyanotechnetat(I), Z. Anorg. Allg. Chem., 319, 148 (1962).

Shannon, R. D. Revised Effective Ionic Raddi and Systematic Studies of Interatomic Distances in Halides and Chalcogenides, Acta Cryst., A32, 751 (1976).

Soto, M. B., et al. The thermodynamics of the insertion electrochemistry of solid metal hexacyanometallates. J. Electroanal. Chem., 521, 183 (2002).

Stilwell, D. E., et al. Electrochemical studies of the factors influencing the cycle stability of Prussian Blue films. J. Appl. Electrochem., 22, 325 (1992).

Wessells, C. D., et al. Copper hexacyanoferrate battery electrodes with long cycle life and high power. Nature Comm., 2, 550 (2011).

Wessells, C. D., et al. Nickel Hexacyanoferrate Nanoparticle Electrodes for Aqueous Sodium and Potassium Ion Batteries. Nano Lett., 11, 5421 (2011).

Wessells, C. D., et al. The Effect of Insertion Species on Nanostructured Open Framework Hexacyanoferrate Battery Electrodes. J. Electrochem. Soc., 159, A98 (2012).

Wessells, C. D., et al. Tunable Reaction Potentials in Open Framework Nanoparticle Battery Electrodes for Grid-Scale Energy Storage. ACS Nano, 6, 1688 (2012).

Xiaoouan Lu et al: "A simple and an efficient strategy to synthesize multi-component nanocomposites for biosensor applications", Anal Ytica Chimica Acta, Elsevier, Amsterdam, NL, vol. 711, Nov. 2, 2011 (Nov. 2, 2011), pp. 40-45, XP028339021, ISSN: 0003-2670, DOI: 10.1016/J.ACA.2011.11.005 [retrieved on Nov. 11, 2011].

Zadronecki, M., et al. High Affinity of Thallium Ions to Copper Hexacyanoferrate Films. J. Electrochem. Soc., 148, E348 (2001).

Roman Imhof et al. "In Situ Investigation of the Electrochemical Reduction of Carbonate Electrolyte Solutions at Graphite Electrodes," J. Electrochem. Soc., vol. 145, No. 4, (Apr. 1998).

Hiroshi Senoh et al., "Sulfone-Based Electrolyte Solutions for Rechargeable Magnesium Batteries Using 2,5-Dimethoxy-1,4-benzoquinone Positive Electrode," J. Electrochem. Soc. vol. 161 (9) A1315-A1320 (2014).

Hiroshi Senoh et al., "Sulfone-Based Electrolyte Solutions for Rechargeable Magnesium Batteries Using 2,5-Dimethoxy-1,4-benzoquinone Positive Electrode," J. Electrochem. Soc. 161 (9) A1315-A1320 (2014).

Yuu Watanabe et al., "Electrochemical properties and lithium ion solvation behavior of sulfone-ester mixed electrolytes for high-voltage rechargeable lithium cells," Journal of Power Sources, vol. 179, 770-779 (2008).

IUPAC-NIST Solubility Data Series. 83. Acetonitrile: Ternary and Quaternary Systems, published online Sep. 5, 2007.

Jayalakshmi, M. et al., "Electrochemical Behaviour of Prussian Blue Deposits in Presence of Some Non-Aqueous Background Solutions" Bulletin of Electrochemistry 16 (3) Mar. 2000, pp. 123-129.

Starkovich, J. A, et al., "Solubilities of some chloride and perchlorate salts in sulfolane", J. inorg. nucl. Chem, 1972, vol. 34, pp. 789-791.

Dinh, H, et al., "Electrochemical Analysis of Conductive Polymer-Coated LiFePO4 Nanocrystalline Cathodes with Controlled Morphology" Electroanalysis 2011, 23, No. 9, 2079-2086, (C) Wiley-VCH Verlag GmbH & Co. KGaA, Weinham.

W.P. Griffith, "Cyanide Complexes of the Early Transition Metals (Groups IVa-VIIa)", Coordination Chemistry Reviews, 17 (1975), pp. 177-247.

Notification of the First Office Action (for PCT Applications Entering the National Phase), State Intellectual Property Office of China, Application No. 201480020748.6, dated Mar. 21, 2017.

ThoughtCo. (2017; https://www.thoughtco.com/definition-of-aqueous-605823).

Dictionary.com (2017; http://www.dictionary.com/browse/aqueous).

Steven G. Bratsch, "Standard Electrode Potentials and Temperature Coefficients in Water at 298.15 K" J. Phys. Chem. Ref. Data, vol. 18, No. 1, 1989, pp. 1-21.

Besendhard, J.O., "Handbook of Battery Materials" Wiley-VCH 1999, pp. 1-17.

* cited by examiner

ELECTROLYTE ADDITIVES FOR ELECTROCHEMICAL DEVICES

CROSS REFERENCE TO RELATED APPLICATIONS

This Application is a Continuation of application Ser. No. 15/829,912 filed on Dec. 2, 2017; application Ser. No. 15/829,912 is a Continuation-in-part of application Ser. No. 15/442,634 filed on Feb. 25, 2017; application Ser. No. 15/829,912 is a Continuation-in-part of application Ser. No. 15/062,171 filed on Mar. 6, 2016; application Ser. No. 15/062,171 is a Continuation of application Ser. No. 14/231,571 filed on Mar. 31, 2014; application Ser. No. 14/231,571 claims the benefit of U.S. Provisional Application 61/810,684 filed on Apr. 10, 2013; application Ser. No. 15/829,912 is a Continuation-in-part of application Ser. No. 13/892,982 filed on May 13, 2013; application Ser. No. 13/892,982 claims the benefit of U.S. Provisional Application 61/722,049 filed on Nov. 2, 2012, the contents of which are all hereby expressly incorporated by reference thereto in their entireties for all purposes.

STATEMENT REGARDING FEDERALLY SPONSORED RESEARCH OR DEVELOPMENT

This invention was made with government support under ARPA-E Award No. DE-AR000300 With Alveo Energy, Inc., awarded by DOE. The government has certain rights in the invention.

FIELD OF THE INVENTION

The present invention relates generally to electrochemical devices, and more specifically, but not exclusively, to balancing electrode potential of electrodes in an electrochemical device in which at least one electrode includes a material in which potential may vary by state of charge.

The present invention also relates generally to rechargeable energy accumulators, and more specifically, but not exclusively, to stabilization of electrodes used with aqueous electrolytes and even more particularly to stabilization of electrodes used with aqueous electrolytes as part of an electrochemical cell.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A wide variety of battery technologies have been developed for portable and stationary applications, including lead acid, lithium-ion, nickel/metal hydride, sodium sulfur, and flow batteries, among others. Not one of these technologies is commonly used for applications related to the stabilization and reliability of the electric grid due to exorbitantly high cost, poor cycle and calendar lifetime, and low energy efficiency during rapid cycling. However, the development of lower cost, longer lived batteries is likely needed for the grid to remain reliable in spite of the ever-increasing deployment of extremely volatile solar and wind power.

Existing battery electrode materials cannot survive for enough deep discharge cycles for the batteries containing them to be worth their price for most applications related to the electric grid. Similarly, the batteries found in electric and hybrid electric vehicles are long lived only in the case of careful partial discharge cycling that results in heavy, large, expensive battery systems. The performance of most existing battery electrode materials during fast cycling is limited by poor kinetics for ion transport or by complicated, multiphase operational mechanisms.

The use of Prussian Blue analogues (PBAs), which are a subset of a more general class of transition metal cyanide coordination compounds (TMCCCs) of the general chemical formula $A_xP_y[R(CN)_6]_z \cdot nH_2O$ (A=alkali cation, P and R=transition metal cations, $0 \leq x \leq 2$, $0 \leq y \leq 4$, $0 \leq z \leq 1$, $0 \leq n$), has been previously demonstrated as electrodes in aqueous electrolyte batteries. TMCCC electrodes have longer deep discharge cycle life and higher rate capability than other intercalation mechanism electrodes, and they enjoy their highest performance in aqueous electrolytes. TMCCC cathodes rely on the electrochemical activity of iron in $Fe(CN)_6$ complexes at high potentials. TMCCC anodes, on the other hand, contain electrochemically active, carbon-coordinated manganese or chromium.

The development of a symmetric battery in which both the anode and the cathode are each a TMCCC is desirable because TMCCCs have longer cycle life and can operate at higher charge/discharge rates than other electrode systems. If one TMCCC electrode were to be paired with a different kind of electrode, it is likely that the full battery would not last as long, or provide the same high-rate abilities as a symmetric cell containing a TMCCC anode and a TMCCC cathode.

TMCCC cathodes are well understood, and the operation of a TMCCC cathode for over 40,000 deep discharge cycles has been previously demonstrated. These cathodes typically operate at about 0.9 to 1.1 V vs. the standard hydrogen electrode (SHE). One challenge for the development of practical batteries using TMCCC cathodes is their trace solubility in aqueous electrolytes. Their partial dissolution into the battery electrolyte can result in a decrease in battery charge capacity due to mass loss from the electrodes and a decrease in efficiency due to side reactions with the cathode's dissolution products.

In some embodiments, an order of production and assembly of components of an electrochemical device may affect performance metrics of the completed electrochemical device. For example, in some instances of a cosolvent electrochemical device, it may be better to add a chemical species to an electrolyte of the electrochemical device before adding the electrolyte to the rest of the electrochemical device.

The development of a TMCCC anode has proven much more challenging than that of TMCCC cathodes because these materials typically have reaction potentials either near 0 V or below −0.5 V vs. SHE, but not in the range between −0.5 V and 0 V that is most desirable in aqueous electrolytes, and because they operate only in a narrow pH range without rapid hydrolysis to manganese dioxide phases. As the useful electrochemical stability window of aqueous electrolytes at approximately neutral pH (pH=5-8) extends from about −0.4 V to 1 V vs. SHE, an anode reaction potential of 0 V results in a cell voltage lower than the maximum that is possible without decomposition of water. But, in the case of an anode reaction potential below −0.5 V vs. SHE, the charge efficiency of the anode can be poor due to rapid hydrolysis of water to hydrogen gas. Finally, if the Mn(CN)$_6$ groups in the TMCCC anode hydrolyze, the capacity of the electrode is rapidly lost.

For purposes of this application, electrode materials may be divided into two classes: 1) electrode potential is constant with respect to state of charge; and 2) electrode potential varies with respect to state of charge.

For an electrochemical cell using electrodes of the first class, there is no concern about unbalanced potentials on the electrode are balanced across a range of charge of the cell.

However, for an electrochemical cell using one or more electrodes of the second class, there is a possibility that there could be unbalanced potentials on the electrode, particularly in an event that the cell is not at maximum charge. Unbalanced potentials reduce an energy density of the cell.

Commonly used materials for electrodes, such as lithium and graphite, are materials of the first class. There are materials of the second class that offer some improvements over these more conventional materials. However electrochemical cells made with the materials of the second class may have a degraded performance in other areas, including the possibility of the unbalanced potentials.

There could be advantages to addressing the possible degradation when using electrode materials of the second class, such as improving energy density while gaining the desired advantages of the alternative electrode materials or for slowing and/or preventing dissolution of electrodes into an operating electrolyte to extend a calendar life of the electrodes.

BRIEF SUMMARY OF THE INVENTION

Disclosed is a system and method for addressing the possible degradation when using electrode materials of the second class, such as improving energy density while gaining the desired advantages of the alternative electrode materials and/or slowing and/or preventing dissolution of electrodes into an operating electrolyte to extend a calendar life of the electrodes. The following summary of the invention is provided to facilitate an understanding of some of technical features related to use of cosolvent electrolytes for more efficient and durable batteries, and is not intended to be a full description of the present invention and/or stabilization of TMCCC/PBA battery electrodes. A full appreciation of the various aspects of the invention can be gained by taking the entire specification, claims, drawings, and abstract as a whole. The present invention is applicable to other electrode types in addition to TMCCC cathodes and/or anodes, to other electrochemical devices in addition to full, partial, and/or hybrid battery systems including a liquid electrolyte, and to other cell chemistries, materials, and analogues.

Some examples in this patent application concern the use of solvents and cosolvents in liquid electrolyte batteries for multiple purposes: the extension of the calendar and cycle life time of electrodes that are partially soluble in liquid electrolytes, the purpose of limiting the rate of electrolysis of water into hydrogen and oxygen as a side reaction during battery operation, and for the purpose of cost reduction. Cosolvents are when two liquids are combined into a single solution, as in the case of water and ethanol in wine, which may also contain dissolved compounds such as salts. Herein is demonstrated a utility of these cosolvent electrolytes using the model system of an aqueous sodium ion electrolyte battery containing TMCCC electrodes, but the benefits of cosolvents to the performance of liquid electrolyte batteries apply generally to other electrode and battery systems as well. One cost benefit occurs because an organic cosolvent as disclosed herein allows one to have a higher voltage before water is quickly split into hydrogen and oxygen. When the organic cosolvent is relatively inexpensive, and the electrodes are the same materials (as in some embodiments disclosed herein when the anode has two different reaction potentials), then the organic cosolvent lets the electrochemical device have a higher voltage for about the same materials cost. Energy is equal to the product of the charge and the voltage, so a higher voltage electrochemical cell that gets more energy from the same materials will therefore have a lower cost/energy.

Embodiments of the present invention broadly includes a general concept of the use of cosolvents in liquid electrolyte batteries, particularly, but not exclusively, in several areas, including: first, the concept of using cosolvents to protect TMCCC electrodes from dissolution and/or hydrolysis, and second, the ability to use a hexacyanomanganate-based TMCCC anode with a reaction potential so low that it can only be used when reduction of water to hydrogen gas is suppressed (as is the case, for example, when a cosolvent is used as herein described).

Included herein is description of a novel method for the stabilization of TMCCC electrodes against dissolution and hydrolysis, while simultaneously suppressing hydrogen generation at the anode: for example an addition of a cosolvent to an aqueous electrolyte. A cosolvent electrolyte is one in which multiple liquid solvents are combined to form a single liquid phase, in which the electrolyte salt and any additional additives are then dissolved. The presence of a cosolvent can drastically change the solubility and stability of materials including both TMCCCs and electrolyte salts. The proper choice of cosolvent slows or prevents the dissolution and/or hydrolysis of TMCCC electrodes, and it allows for the high-efficiency operation of TMCCC anodes with reaction potentials below −0.5 V vs. SHE. The final result is an electrochemical device that operates at voltages of nearly double those that can be achieved in simple aqueous electrolytes, with longer electrode cycle and calendar lives.

Some embodiments of the present invention may include an electrochemical device including at least a pair of electrodes in chemical communication with one or more electrolytes, one, some, or all of the electrodes may each include a variable potential material, each such electrode including the same or different variable potential material, and one or more additives to the electrochemical device that each participates in a limited side-reaction with one or more electrodes having variable potential material. In response to charging the electrochemical device, each limited side-reaction degrades charging of the related electrode(s) for a limited duration. Those electrodes that do not participate in one of the limited side-reactions may begin charging immediately at full coulombic efficiency. Each electrode that is participating in a limited side-reaction charges more slowly due to degraded coulombic efficiency, for the duration of each applicable limited side-reaction. As each limited side-reaction completes, the associated electrode may then begin charging at full coulombic efficiency. Proper configuration and coordination of appropriate limited side-reactions allow different electrodes to be adjustably charged to different potentials from the same charging source.

A battery (cell) that comprises an electrolyte and two electrodes (an anode and a cathode), one or both of which is a TMCCC material of the general chemical formula $A_xP_y$ [$R(CN)_{6-j}L_j$]$.nH_2O$, where: A is a monovalent cation such as $Na^+$, $K^+$, $Li^+$, or $NH_4^+$, or a divalent cation such as $Mg^{2+}$ or $Ca^{2+}$; P is a transition metal cation such as $Ti^{3+}$, $Ti^{4+}$, $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ni^{2+}$, $Cu^+$, $Cu^{2+}$, or $Zn^{2+}$, or another metal cation such as $Al^{3+}$, $Sn^{2+}$, $In^{3+}$, or $Pb^{2+}$; R is a transition metal cation such as $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, or $Pt^{3+}$; L is a ligand that may be substituted in the place of a $CN^-$ ligand, including CO (carbonyl), NO (nitrosyl), or $Cl^-$; $0 \le x \le 2$; $0 < y < 4$; $0 < z \le 1$; $0 \le j \le 6$; and $0 \le n \le 5$; and where the electrolyte contains water, one or more organic cosolvents, and one or more salts, where: the electrolyte is a single phase.

A rechargeable electrochemical cell, includes a positive electrode; a negative electrode; and an electrolyte having a total electrolyte volume V including a first quantity of water comprising a first fraction V1 of the total electrolyte volume V and including a second quantity of one or more organic cosolvents together comprising a second fraction V2 of the total electrolyte volume V; wherein V1/V>0.02; wherein V2>V1; wherein a particular one electrode of the electrodes includes a transition metal cyanide coordination compound (TMCCC) material; and wherein the electrolyte is a single phase.

A rechargeable electrochemical cell, includes a positive electrode; a negative electrode; and an electrolyte having a total electrolyte weight W including a first quantity of water comprising a first fraction W1 of the total electrolyte weight W and including a second quantity of one or more organic cosolvents together comprising a second fraction W2 of the total electrolyte weight W; wherein W1/W>0.02; wherein W2>W1; wherein a particular one electrode of the electrodes includes a transition metal cyanide coordination compound (TMCCC) material; and wherein the electrolyte is a single phase.

A method for operating a rechargeable electrochemical cell having a negative electrode disposed in a single phase liquid electrolyte of a total electrolyte quantity Q including at least a total quantity Q1 of water wherein Q1/Q is approximately 0.02 or greater and wherein an electrolysis of the total quantity Q1 of water below a first potential V1 initiates a production of hydrogen gas at a first rate R1, including a) exchanging ions between the negative electrode and the liquid electrolyte at an electrode potential VE, VE<V1; and b) producing hydrogen gas at a second rate R2 less than R1 responsive to the electrode potential VE; wherein an electrolysis of the total electrolyte quantity Q a second quantity of one or more organic cosolvents together comprising a second fraction Q2 of the total electrolyte quantity Q below a second potential V2 initiates the production of hydrogen gas at the first rate R1, V2<V1; and wherein VE>V2.

A rechargeable electrochemical device, includes a first electrode; a second electrode; an electrolyte coupled with the electrodes; and a first additive in communication with the electrolyte; wherein a first particular one electrode of the electrodes includes a first variable potential material; and wherein the first additive participates in a first predetermined side-reaction with a first single one of the electrodes degrading a charging efficiency of the first single one of the electrodes for a duration of the first predetermined side-reaction.

A method for reducing a relative state-of-charge imbalance of a set of electrodes of a rechargeable electrochemical device during a recharging process, the set of electrodes coupled to an electrolyte and wherein at least one electrode of the set of electrodes includes a first variable potential material, including a) performing the recharging process for a recharging duration which charges the electrodes at different relative rates to tend to produce a relative state-of-charge imbalance for the set of electrodes; and b) reducing the relative state-of-charge imbalance by interfering with a charging of at least one electrode of the set of electrodes. In an embodiment, the reducing step b) may include b1) communicating an additive to the electrolyte to induce a predetermined side-reaction with the at least one electrode including the first variable potential material; and b2) degrading a charging efficiency of the at least one electrode for a duration of the predetermined side-reaction.

A battery (cell) including: an electrolyte (which may be aqueous or quasi-aqueous) and two electrodes (an anode and a cathode), one or both of which is a TMCCC material of the general chemical formula $A_xP_y[R(CN)_{6-j}L_j]_z \cdot nH_2O$, where: A is a monovalent cation such as $Na^+$, $K^+$, $Li^+$, or $NH_4^+$, or a divalent cation such as $Mg^{2+}$ or $Ca^{2+}$; P is a transition metal cation such as $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ni^{2+}$, $Cu^+$, $Cu^{2+}$, or $Zn^{2+}$, or another metal cation such as $Al^{3+}$, $Sn^{2+}$, $In^{3+}$, or $Pb^{2+}$; R is a transition metal cation such as $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, or $Pt^{3+}$; L is a ligand that may be substituted in the place of a $CN^-$ ligand, including CO (carbonyl), NO (nitrosyl), or $Cl^-$; $0 \le j \le 6$; $0 \le x \le 2$; $0 < y \le 4$; $0 \le z \le 1$; and $0 < n \le 5$.

A battery including an electrolyte in contact with two electrodes, in which a conformal coating of a TMCCC of the general chemical formula described herein on the surface of one or more of the electrodes prevents dissolution of that electrode into the electrolyte.

A battery including an electrolyte in contact with two electrodes, in which a conformal coating of a TMCCC of the general chemical formula described herein on the surface of the individual particles of the electrochemically active material within the electrode prevents dissolution of that material into the electrolyte.

A battery including an electrolyte in contact with two electrodes, in which a conformal coating of a mixed conducting polymer such as polypyrrole on the surface of one or more of the electrodes prevents dissolution of that electrode into the electrolyte.

A battery including an electrolyte in contact with two electrodes, in which a conformal coating of a mixed conducting polymer such as polypyrrole on the surface of the individual particles of the electrochemically active material within the electrode prevents dissolution of that material into the electrolyte.

An electrochemical apparatus including an operating aqueous electrolyte including a quantity of water, a plurality of ions, and an electrolyte additive distributed in the quantity of water; and a first electrode disposed in the operating aqueous electrolyte, the first electrode including a first TMCCC material having a general chemical formula $A_xP_y[R(CN)_{6-j}L_j]_z \cdot nH_2O$, where: A is a cation, P is a metal cation, R is a transition metal cation, and L is a ligand substitutable in the place of a $CN^-$ ligand, and $0 \le j \le 6$, $0 \le x \le 2$, $0 < y \le 4$, $0 < z \le 1$, and $0 \le n \le 5$, wherein the first TMCCC material has a first specific chemical formula conforming to the general chemical formula including a first particular cation $P_1$ and a first particular cation $R_1$, wherein the first electrode has a first rate of electrochemical capacity loss when disposed in the operating aqueous electrolyte, and wherein the first TMCCC material has a second rate of electrochemical capacity loss when disposed in a second aqueous electrolyte consisting of water and the plurality of ions without the electrolyte additive; wherein the first rate of electrochemical capacity loss is less than the second rate of electrochemical capacity loss.

A method for manufacturing an electrochemical apparatus including a first electrode having a first TMCCC material with a general chemical formula $A_xP_y[R(CN)_{6-j}L_j]_z \cdot nH_2O$, where: A is a cation, P is a metal cation, R is a transition metal cation, and L is a ligand substitutable in the place of a $CN^-$ ligand, and $0 \leq j \leq 6$, $0 \leq x \leq 2$, $0 < y \leq 4$, $0 < z \leq 1$, and $0 \leq n \leq 5$, wherein the first TMCCC material has a first specific chemical formula conforming to the general chemical formula including a first particular cation $P_1$ and a first particular cation $R_1$, and wherein the first TMCCC material has a rate of electrochemical capacity loss when disposed in an aqueous electrolyte including a plurality of ions, the method including (a) disposing the first electrode in the aqueous electrolyte; and (b) decreasing the rate of electrochemical capacity loss by distributing an electrolyte additive into the aqueous electrolyte.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 17-FIG. 18 illustrate a first pair of charts for Example A3 comparing a control (no additive) to a $Cu(NO_3)_2$ additive;

FIG. 17 illustrates an electrode potentials chart for Example A3; and

FIG. 18 illustrates a cell voltage chart for Example A3; and

FIG. 19-FIG. 20 illustrate a second pair of charts for Example A4 comparing a control (no additive) to a Benzoquinone additive;

FIG. 19 illustrates an electrode potentials chart for Example A4; and

FIG. 20 illustrates a cell voltage chart for Example A4; and

FIG. 21-FIG. 22 illustrate a third pair of charts for Example A5 comparing a control (no additive) to a Hydroquinone additive;

FIG. 21 illustrates an electrode potentials chart for Example A5; and

FIG. 22 illustrates a cell voltage chart for Example A5; and

FIG. 23-FIG. 24 illustrate a fourth pair of charts for Example A6 comparing a control (no additive) to a Ferrocene additive;

FIG. 23 illustrates an electrode potentials chart for Example A6; and

FIG. 24 illustrates a cell voltage chart for Example A6; and

FIG. 25-FIG. 26 illustrate a fifth pair of charts for Example A7 comparing a control (no additive) to a $Cu(NO_3)_2$ additive;

FIG. 25 illustrates an electrode potentials chart for Example A7; and

FIG. 26 illustrates a cell voltage chart for Example A7; and

FIG. 27-FIG. 28 illustrate a sixth pair of charts for Example A8 comparing a control (no additive) to an Oxalic acid additive;

FIG. 27 illustrates an electrode potentials chart for Example A8; and

FIG. 28 illustrates a cell voltage chart for Example A8; and

FIG. 29-FIG. 30 illustrate a seventh pair of charts for Example A9 comparing a control (no additive) to a Pyrrole additive;

FIG. 29 illustrates an electrode potentials chart for Example A9;

FIG. 30 illustrates a cell voltage chart for Example A9; and

FIG. 41 illustrates illustrates galvanostatic cycling of CuHCF/$Cu^{2+}$/Cumetal in 2 sub-figures, including FIG. 41a and FIG. 41b;

FIG. 46a illustrates scanning electron microscopy of a freshly deposited slurry electrode of copper hexacyanoferrate (80%), carbon black (10%), and polyvinylidene difluoride (10%) on a carbon cloth substrate; and;

FIG. 46b illustrates the same sample, after electrochemical reduction, followed by 40 minutes of exposure to a 2 mM aqueous solution of $Fe(CN)_3$ and $K_3Fe(CN)_6$;

FIG. 48 illustrates potential profiles of CuHCF with PB coating on the particles in two sub-figures, including FIG. 48a and FIG. 48b;

DETAILED DESCRIPTION OF THE INVENTION

Figure 1:
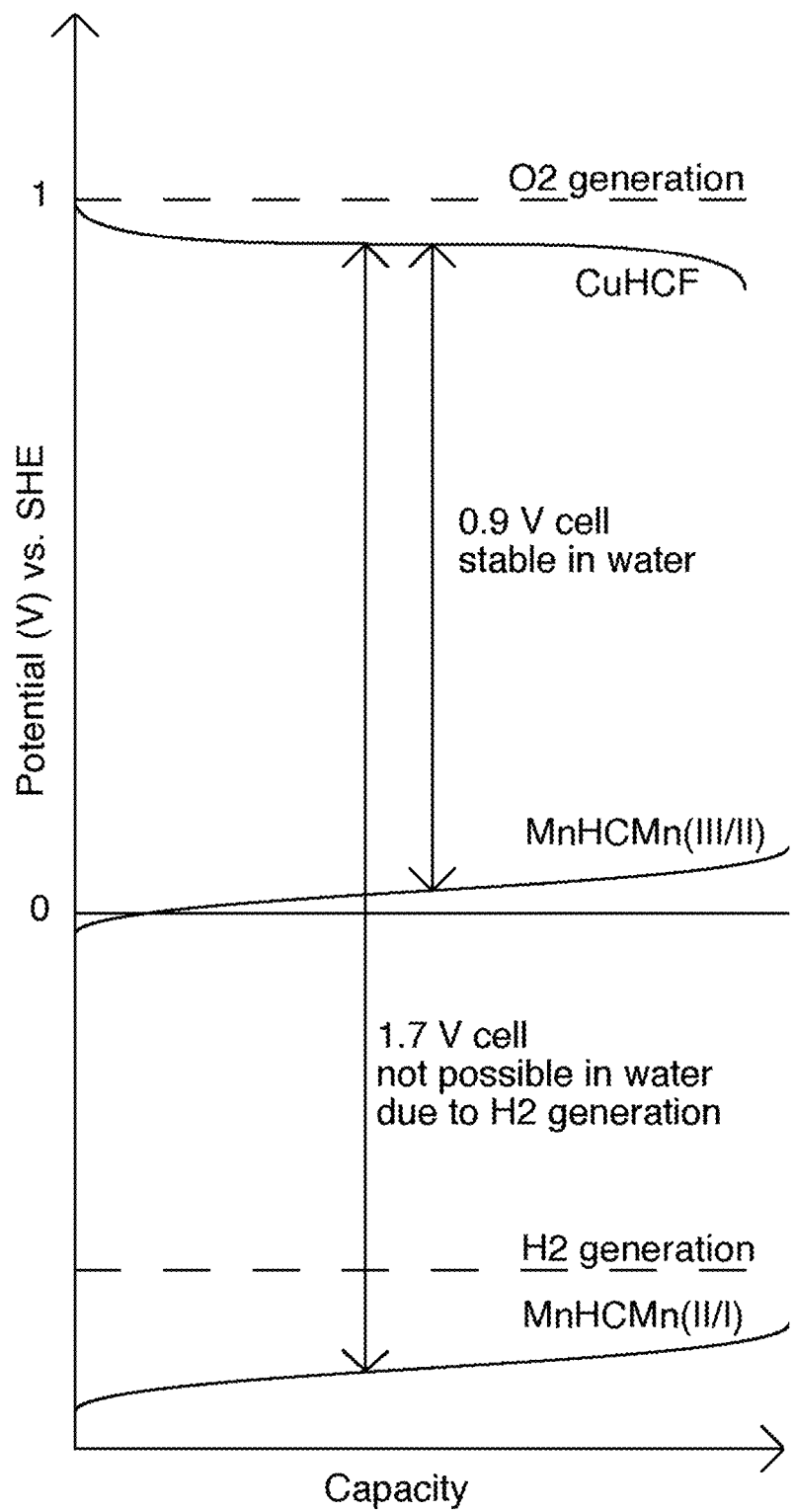
FIG. 1 illustrates a schematic of batteries using the higher and lower anode reactions for CuHCF and MnHCMn.

Embodiments of the present invention provide a system and method for addressing the possible degradation when using electrode materials of the second class, such as improving energy density while gaining the desired advantages of the alternative electrode materials. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "electrolyte" means an ion-conducting, but electronically insulating medium into which the electrodes of an electrochemical cell are disposed. A liquid electrolyte contains one or more liquid solvents and one or more salts that readily disassociate when dissolved in these solvents. Liquid electrolytes may also contain additives that enhance a performance characteristic of the electrochemical cell into which the electrolyte is disposed.

As used herein, the term "battery" means a rechargeable electrochemical device that converts stored chemical energy into electrical energy, including voltaic cells that may each include two half-cells joined together by one or more conductive liquid electrolytes.

As used herein, in the context of a cosolvent solution and a majority or primary solvent of such cosolvent solution, the term "majority" or "primary" means, for a two solvent cosolvent solution, a solvent having 50% or greater volume of the total solvent volume (% vol./vol.), or 50% or greater weight of the total solvent weight (% weight/weight). For a cosolvent solution having three or more solvents, the majority/primary solvent is the solvent present in the greatest quantity (by volume or weight) as compared to the quantities of any of the other solvents of the cosolvent solution. These determinations are preferably made before accounting for any salt or additive to the cosolvent solution. A "minority" or "secondary" solvent in a cosolvent solution is any other solvent other than the majority/primary solvent. For purposes of this present invention when considering cosolvent solutions, water is never a majority solvent and may be a minority/secondary solvent. Water is purposefully present as minority solvent in greater quantity than would be incidental or present as a contaminant having 2% or greater volume of the total solvent volume (% vol./vol.), or 2% or greater weight of the total solvent weight (% weight/weight). An aqueous electrolyte includes water as a majority solvent when in a cosolvent electrolyte and in some instances water may be the only solvent present in a single-solvent electrolyte. Cosolvent water, with water as a significant (e.g., about 2% or greater) solvent but not a majority solvent, may produce an electrolyte that is sometimes referred to as quasi-aqueous to indicate that water is present in more than trace amounts but is not the majority solvent for two or more cosolvents.

As used herein, the term "variable potential material" means a material, that when used as an electrode in an electrochemical device, experiences a variable potential as a function of state of charge. Transition metal cyanide coordination compound (TMCCC) materials are an example of a variable potential material. Other examples include: transition metal oxides including but not limited to lithium cobalt oxide, lithium nickel oxide, lithium manganese oxide, lithium nickel manganese cobalt oxide, lithium nickel cobalt aluminum oxide, manganese dioxide, sodium manganese oxide, sodium cobalt oxide, and tungsten trioxide; sulfur, lithium sulfide; carbons including but not limited to graphite, mesoporous carbons, and activated carbons including charcoal; silicon including nanostructured silicon; polymers including but not limited to polypyrrole, polythiophene, polyanilene, and poly(3,4-ethylenedioxythiophene) polystyrene sulfonate; and combinations of one or more of the above.

As used herein, the term "additive" in the context of a compound, substance, material, mixture, blend, composition, mix, amalgamation, or other addition or assembly relative to an electrochemical device including an electrolyte in chemical communication to a variable potential material that is capable of undergoing an electrochemical redox reaction with at least one electrode of the electrochemical device. One or more additives may be used in the electrochemical device. In some cases, this electrochemical redox reaction may be irreversible, resulting in consumption of the additive. In other cases, that reaction may be reversible resulting in non-consumption of the additive, or conversion of the additive through intermediate reactions of the additive, allowing the additive to be recycled and reused, such as through chemical recycling. In some embodiments, the additive may be added to the electrolyte before the electrolyte is added to the cell. In some embodiments, the additive may be added to the electrodes before they are added to the cell. In some embodiments, the additive may be added to the slurry or paste used to produce the electrodes.

Electrode Materials

Some disclosed embodiments of the invention relate to battery electrode materials in which dimensional changes in a host crystal structure during charging and discharging are small, thereby affording long cycle life and other desirable properties. Such dimensional changes can otherwise result in mechanical deformation and energy loss, as evidenced by hysteresis in battery charge/discharge curves.

Some embodiments relate to a class of transition metal cyanide coordination compound (TMCCC) electrode materials having stiff open framework structures into which hydrated cations can be reversibly and rapidly intercalated from aqueous (e.g., majority water-based) electrolytes or other types of electrolytes. In particular, TMCCC materials having the Prussian Blue-type crystal structure afford advantages including greater durability and faster kinetics when compared to other intercalation and displacement electrode materials. A general formula for the TMCCC class of materials is given by:

$A_xP_y[R(CN)_{6-j}L]_2 \cdot nH_2O$, where:

A is a monovalent cation such as $Na^+$, $K^+$, $Li^+$, or $NH_4^+$, or a divalent cation such as $Mg^{2+}$ or $Ca^{2+}$;

P is a transition metal cation such as $Ti^{3+}$, $Ti^{4+}$, $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ni^{2+}$, $Cu^+$, $Cu^{2+}$, or $Zn^{2+}$, or another metal cation such as $Al^{3+}$, $Sn^{2+}$, $In^{3+}$, or $Pb^{2+}$;

R is a transition metal cation such as $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, or $Pt^{3+}$;

L is a ligand that may be substituted in the place of a $CN^-$ ligand, including CO (carbonyl), NO (nitrosyl), or Cr;

$0 \leq x \leq 2$;

$0 < y \leq 4$;

$0 < z \leq 1$;

$0 \leq j \leq 6$; and $0 \leq n \leq 5$.

FIGURES

FIG. 1 illustrates a schematic of batteries using the higher and lower anode reactions for the MnHCMn anode and the reaction potential of the CuHCF cathode. This schematic shows the operational modes of a battery containing a TMCCC cathode and a TMCCC anode used together in two different electrolytes; 1) an aqueous electrolyte, and 2) a cosolvent electrolyte. In the aqueous electrolyte, rapid hydrogen evolution occurs above the lower operational potential of the anode, so only the upper operational potential of the anode can be used. The result is a 0.9 V cell. But, in the cosolvent electrolyte, hydrogen production is suppressed, resulting in efficient use of the lower operational potential of the anode and a full cell voltage of 1.7 V.

Figure 2:
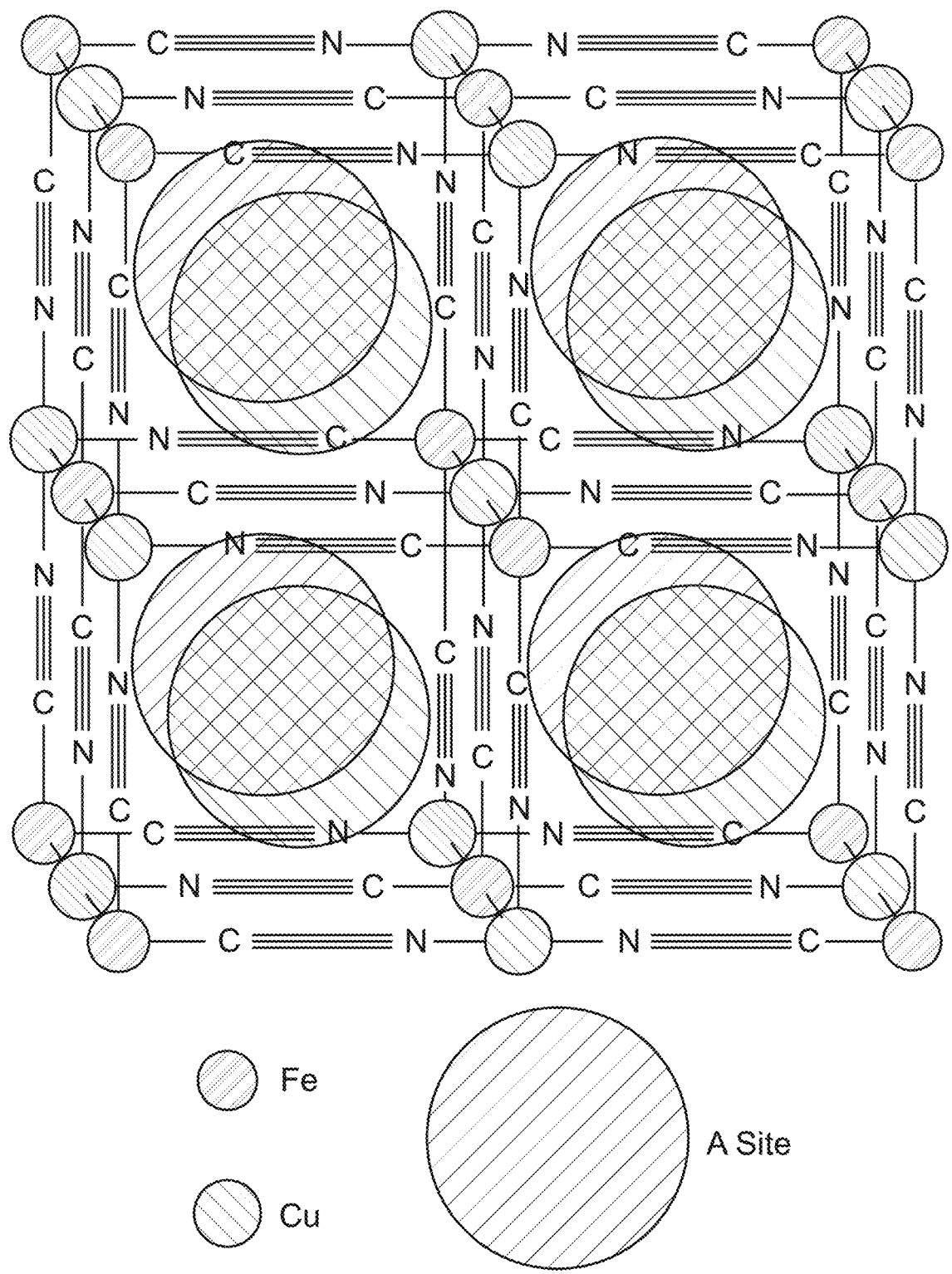
FIG. 2 illustrates a unit cell of the TMCCC crystal structure.

FIG. 2 illustrates a unit cell of the cubic Prussian Blue crystal structure, one example of a TMCCC structure. Transition metal cations are linked in a face-centered cubic framework by cyanide bridging ligands. The large, interstitial A sites can contain water or inserted alkali ions.

Figure 3:
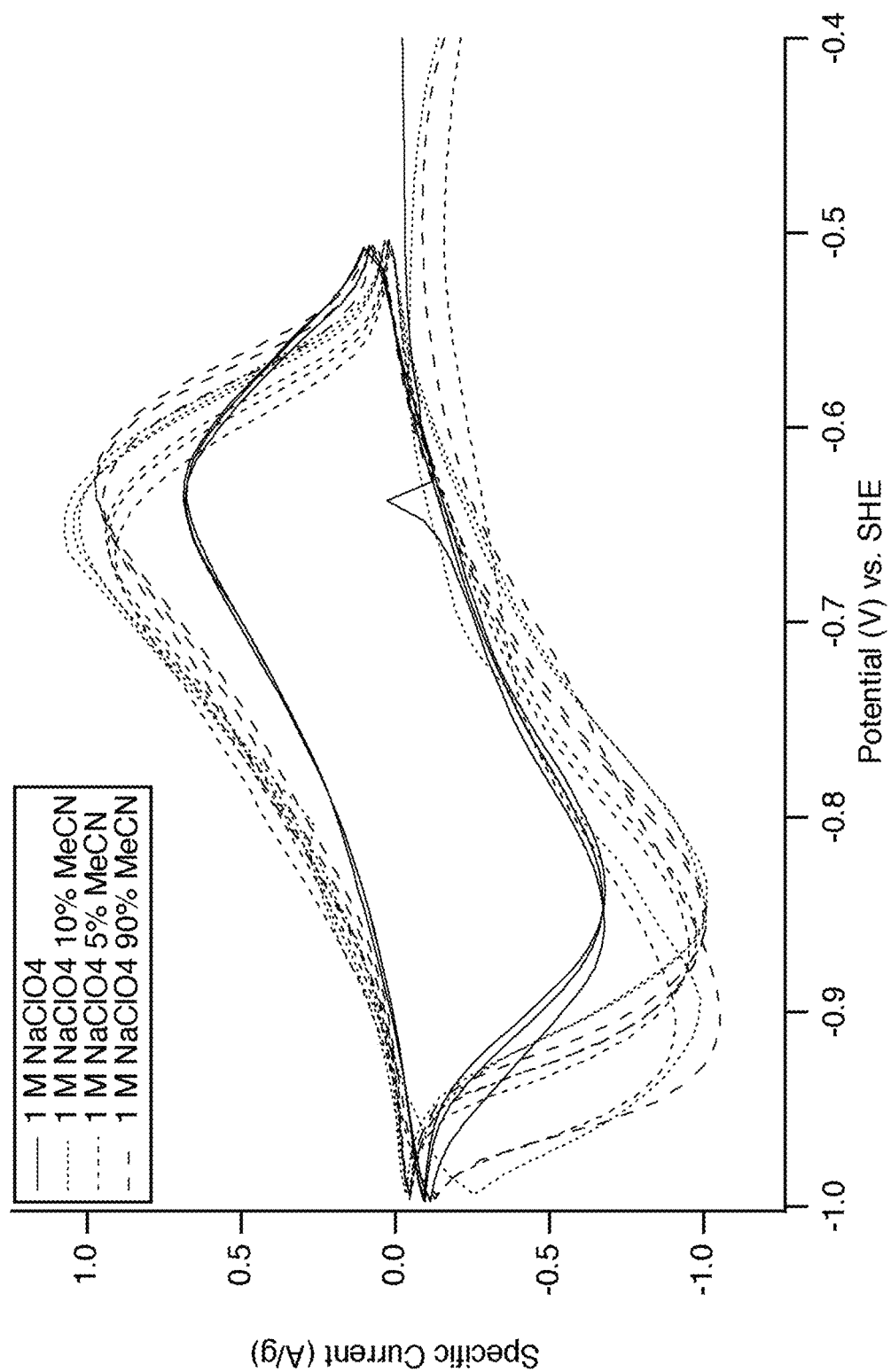
FIG. 3 illustrates a cyclic voltammogram of MnHCMn in cosolvents.

FIG. 3 illustrates a cyclic voltammogram of MnHCMn in cosolvents. Cyclic voltammetry of the lower operational potential of manganese hexacyanomanganate(II/I) is shown in aqueous 1 M $NaClO_4$ and 1 M $NaClO_4$ containing various concentrations of acetonitrile. The position and hysteresis between the current peaks vary only slightly with acetonitrile concentration, indicating that the reaction mechanism and performance is largely independent of the cosolvent.

Figure 4:
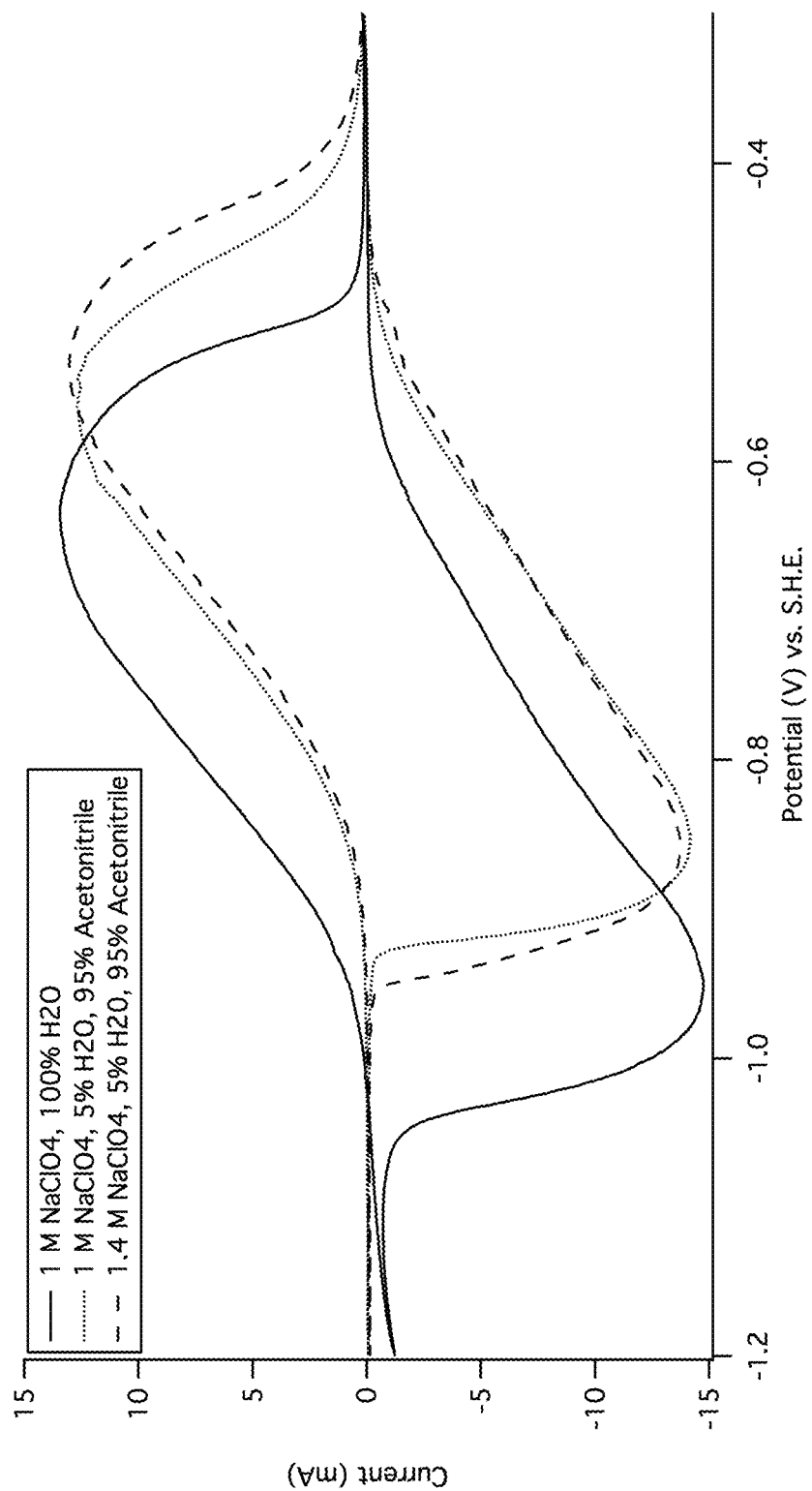
FIG. 4 illustrates a cyclic voltammogram of MnHCMn in cosolvents.

FIG. 4 illustrates a cyclic voltammogram of MnHCMn in cosolvents. Cyclic voltammetry of the lower operational potential of manganese hexacyanomanganate(II/I) is shown in aqueous 1 M $NaClO_4$ and 1 M $NaClO_4$ containing 95% solvent volume acetonitrile and 5% solvent volume water. Reversible cycling is achieved even with only 5% water present. The background current at −0.9 V is 1 mA in purely aqueous electrolyte, but only 0.1 mA in the primarily organic cosolvent electrolytes, demonstrating improved coulombic efficiency with an organic primary cosolvent.

Figure 5:
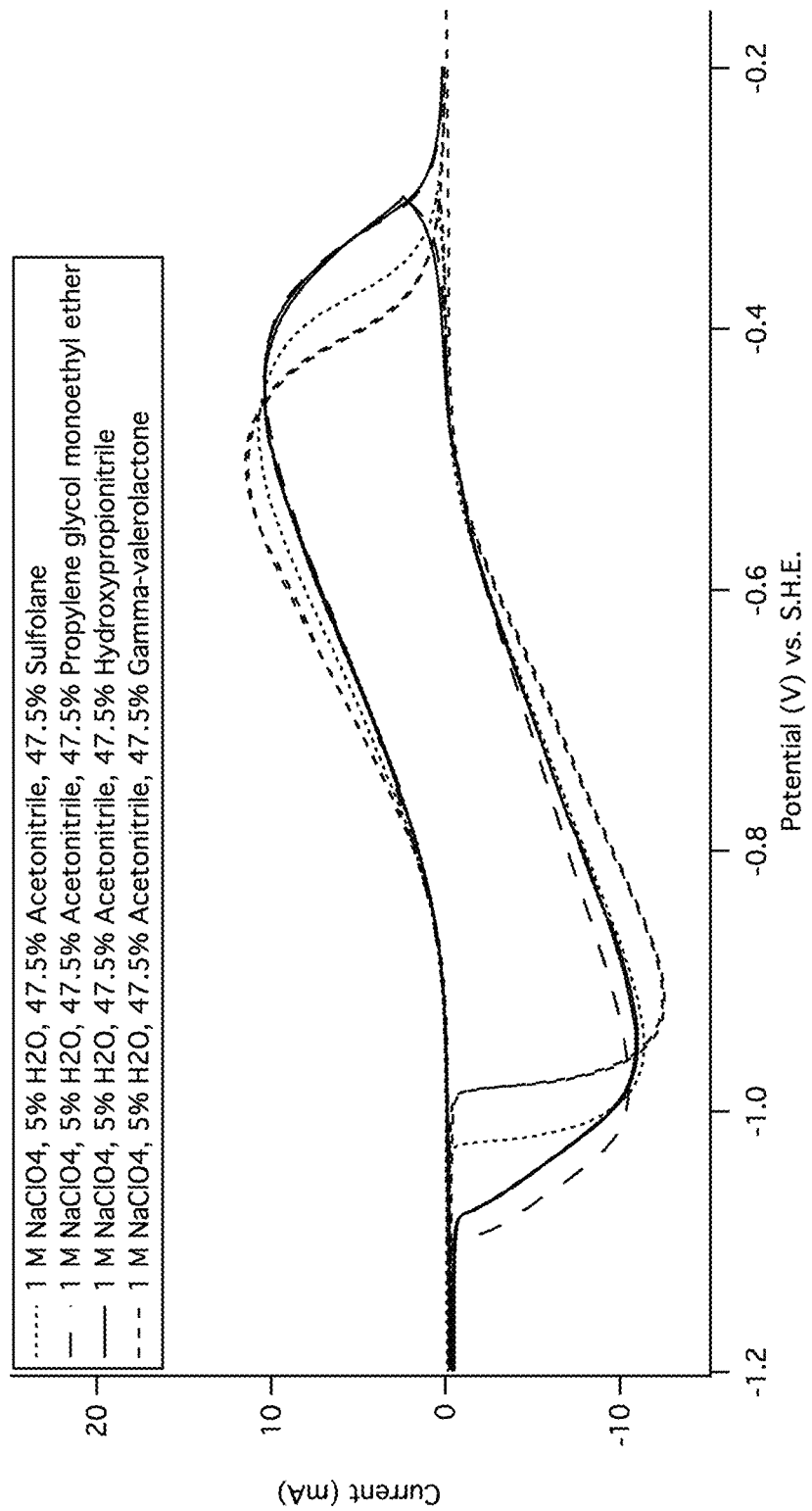
FIG. 5 illustrates a cyclic voltammogram of MnHCMn in cosolvents.

FIG. 5 illustrates a cyclic voltammogram of MnHCMn in cosolvents. Cyclic voltammetry of the lower operational potential of manganese hexacyanomanganate(II/I) is shown 1 M $NaClO_4$ containing 5% solvent volume water, 47.5% solvent volume acetonitrile, and 47.5% solvent volume of one of sulfolane, propylene glycol monoethyl ether, hydroxypropionitrile, or gamma-valerolactone. In all cases, cycling of MnHCMn is shown to be reversible.

Figure 6:
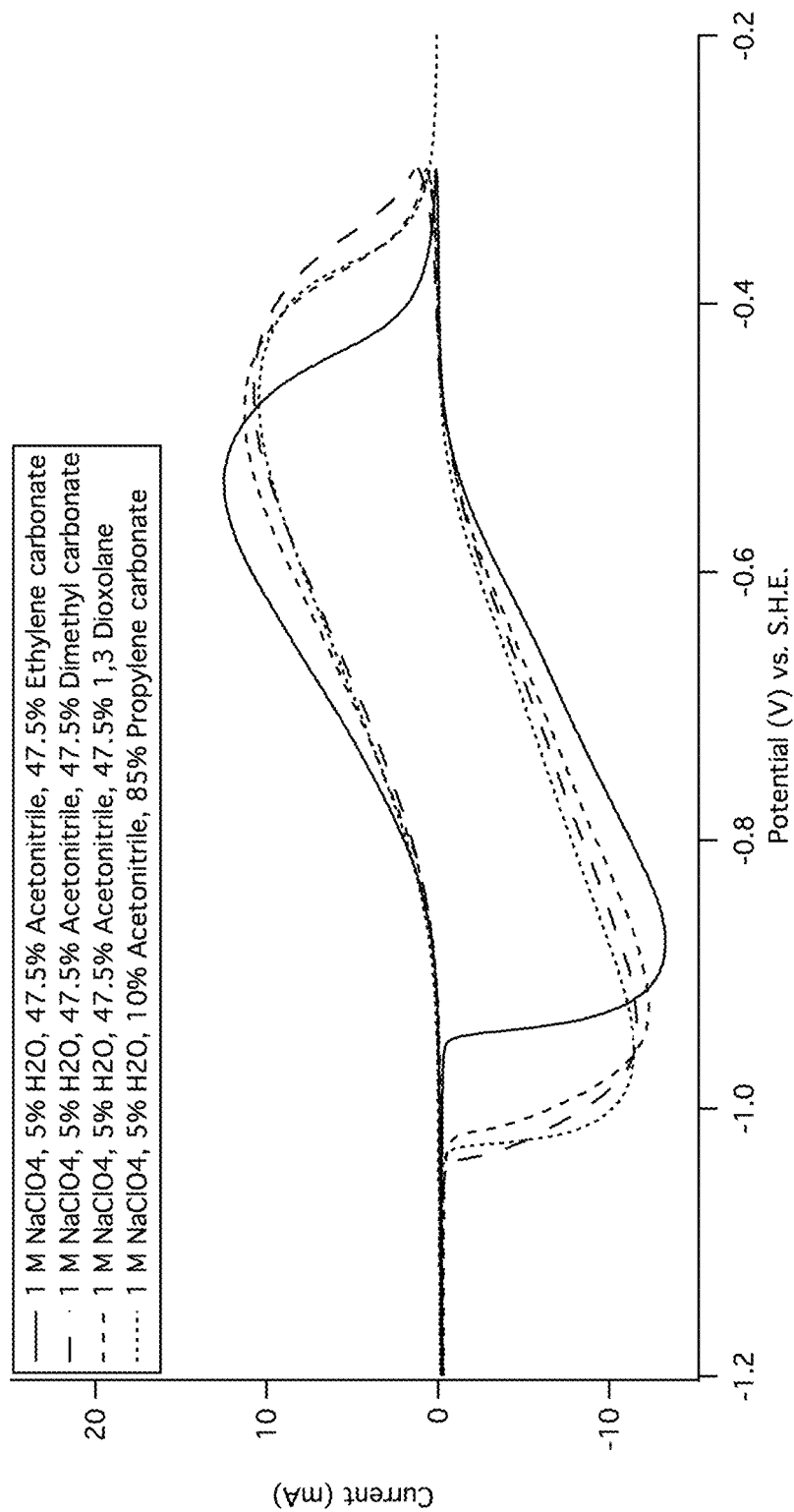
FIG. 6 illustrates a cyclic voltammogram of MnHCMn in cosolvents.

FIG. 6 illustrates a cyclic voltammogram of MnHCMn in cosolvents. Cyclic voltammetry of the lower operational potential of manganese hexacyanomanganate(II/I) is shown 1 M $NaClO_4$ containing 5% solvent volume water, 47.5% solvent volume acetonitrile, and 47.5% solvent volume of one of ethylene carbonate, dimethyl carbonate, or 1,3-dioxolane, or containing 5% solvent volume water, 10% solvent volume acetonitrile, and 85% solvent volume propylene carbonate. In all cases, cycling of MnHCMn is shown to be reversible.

Figure 7:
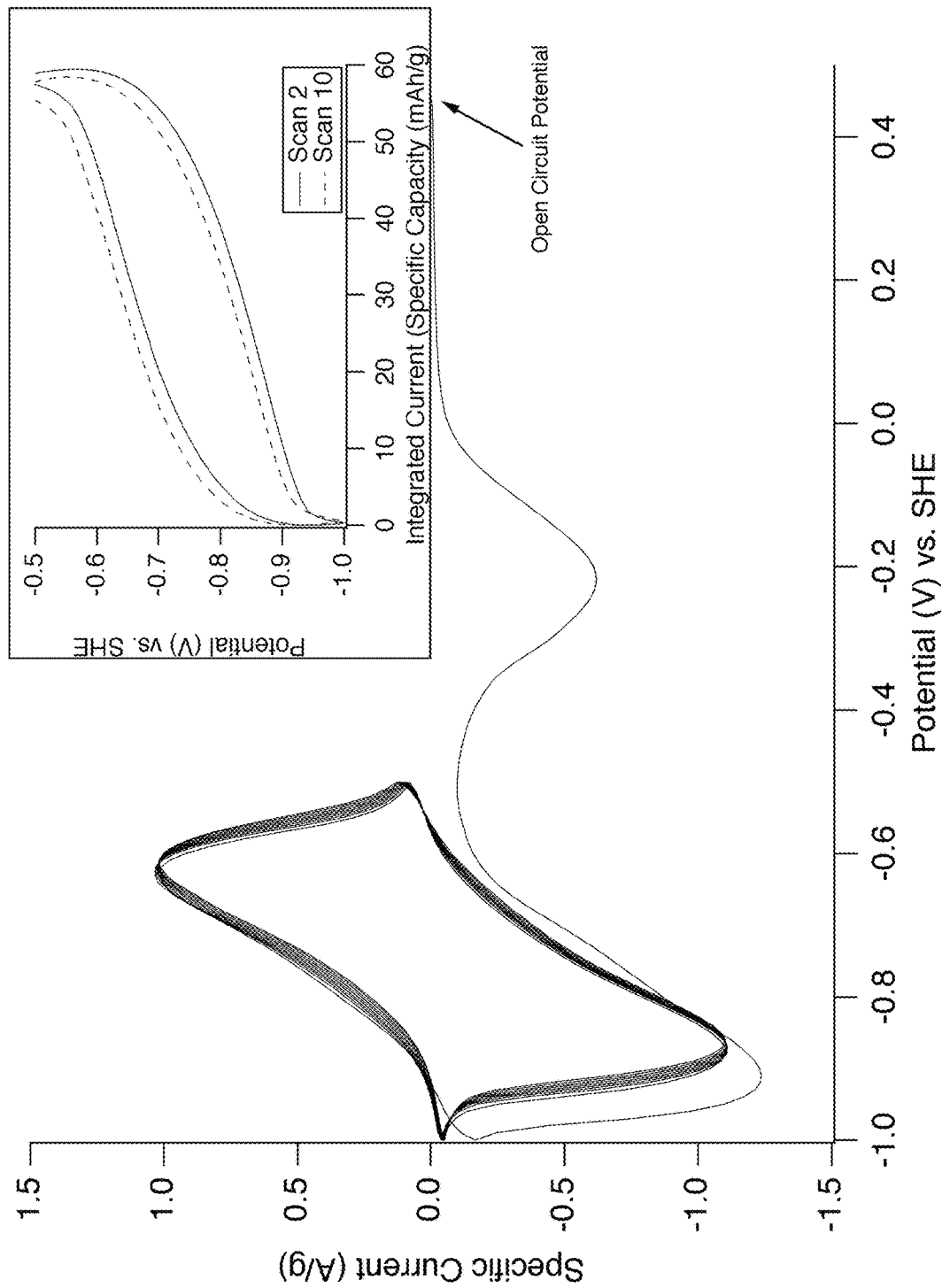
FIG. 7 illustrates a cyclic voltammogram and integrated current of MnHCMn in 90% MeCN.

FIG. 7 illustrates a cyclic voltammogram and integrated current of MnHCMn in 1 M $NaClO_4$ in 90% solvent volume acetonitrile and 10% solvent volume water. Main Figure: cyclic voltammetry of MnHCMn(II/I) in 1 M $NaClO_4$, 90%/10% $MeCN/H_2O$ shows an extremely reversible reaction centered at −0.75 V vs. SHE. The open circuit potential of the material is above the upper reaction [MnHCMN(III/II)] so during the first reductive sweep two reactions are observed. The peak current of ±1.2 A/g is the equivalent of a 20 C galvanostatic cycling rate, indicating extremely fast kinetics. Inset Figure: integration of the current during each scan gives the specific charge and discharge capacity of the electrode. About 57 mAh/g is observed, in close agreement with the approximate theoretical specific capacity of 60 mAh/g. A coulombic efficiency of well over 95% is achieved. There is little capacity fading, in agreement with GCPL measurements of MnHCMn(II/I) in the same electrolyte.

Figure 8:
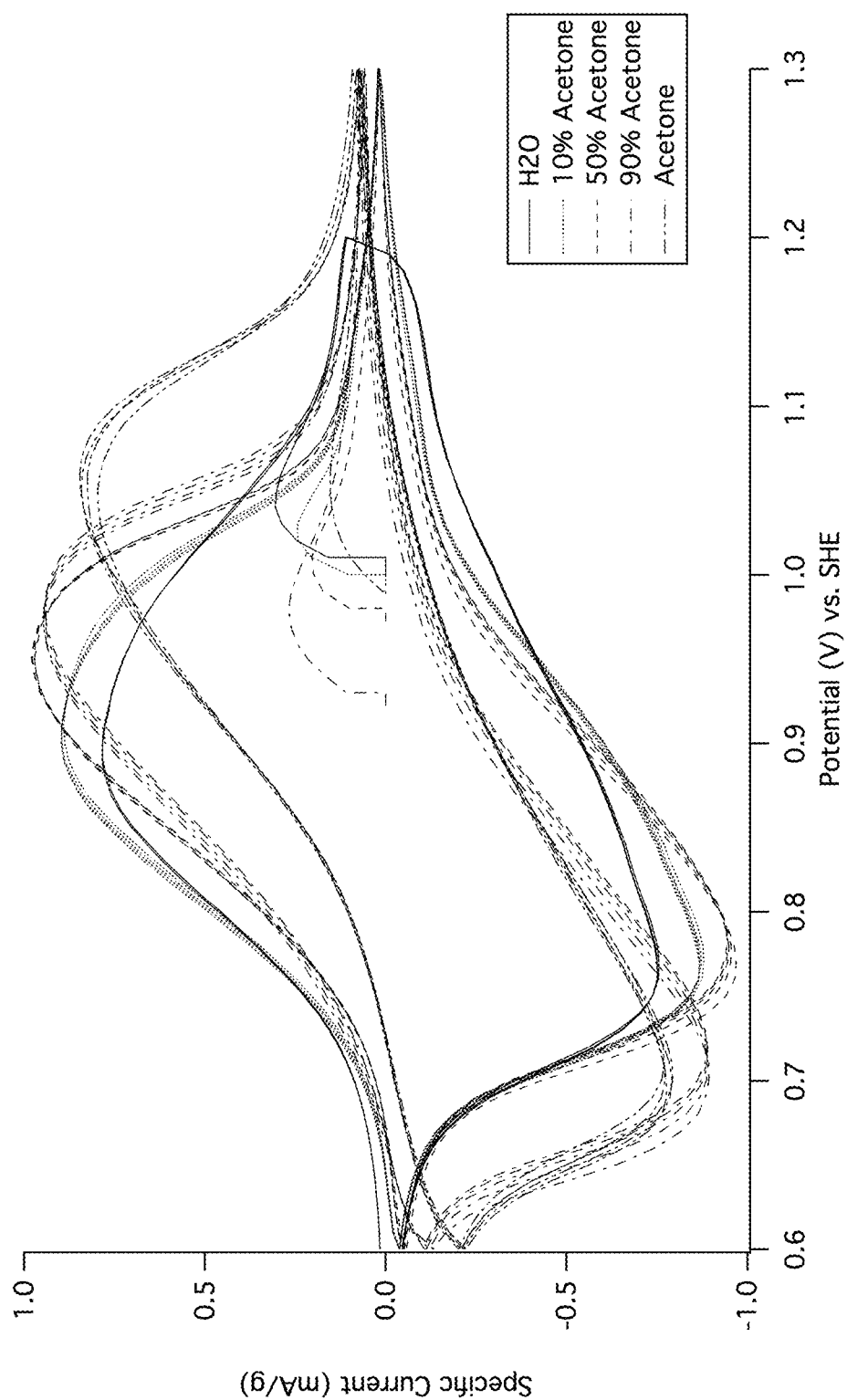
FIG. 8 illustrates a cyclic voltammogram of CuHCF in cosolvents.

FIG. 8 illustrates a cyclic voltammogram of CuHCF in cosolvents containing varying amounts of acetone. Cyclic voltammetry is shown of the copper hexacyanoferrate cathode in aqueous 1 M $NaClO_4$ and in 1 M $NaClO_4$ containing up to 90% solvent volume acetone and as little as 10% solvent volume water. There is little change in the potential of the reaction with increasing amounts of the cosolvent. No clear trend is observed in the small effects of the cosolvent on the reaction potential and kinetics of the charge and discharge of the electrode.

Figure 9:
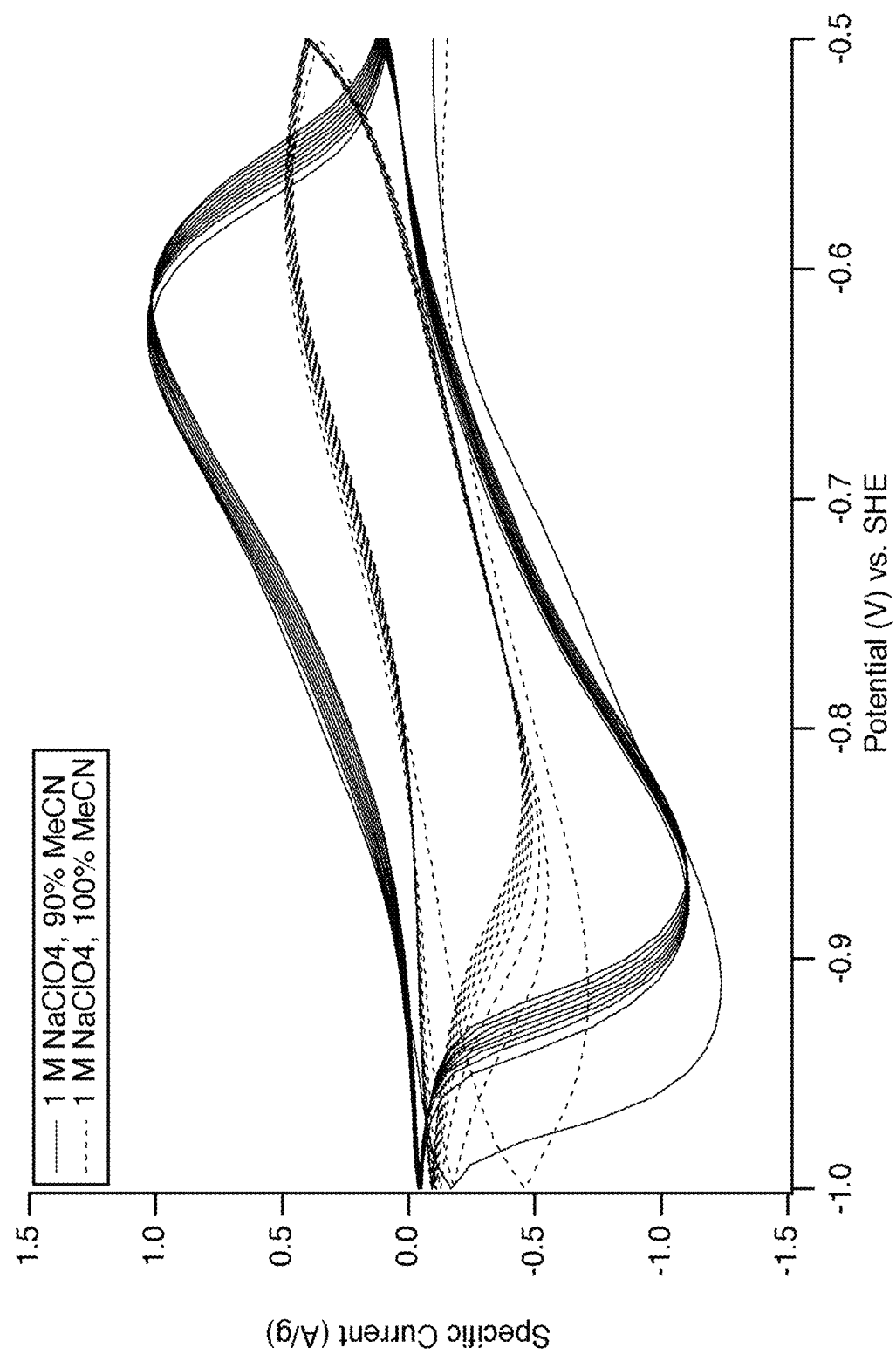
FIG. 9 illustrates a cyclic voltammogram of MnHCMn in 90% or 100% MeCN.

FIG. 9 illustrates a cyclic voltammogram of MnHCMn in 90% or 100% MeCN. Cyclic voltammetry is shown of the lower reaction manganese hexacyanomanganate(II/I) in 1 M $NaClO_4$ containing either 100% solvent volume acetonitrile or 90% solvent volume acetonitrile and 10% solvent volume water. The electrode has very poor kinetics and a poor current response in the 100% solvent volume acetonitrile electrolyte. In contrast, the addition of 10% water to the acetonitrile results in a reaction with faster kinetics and a higher peak current.

Figure 10:
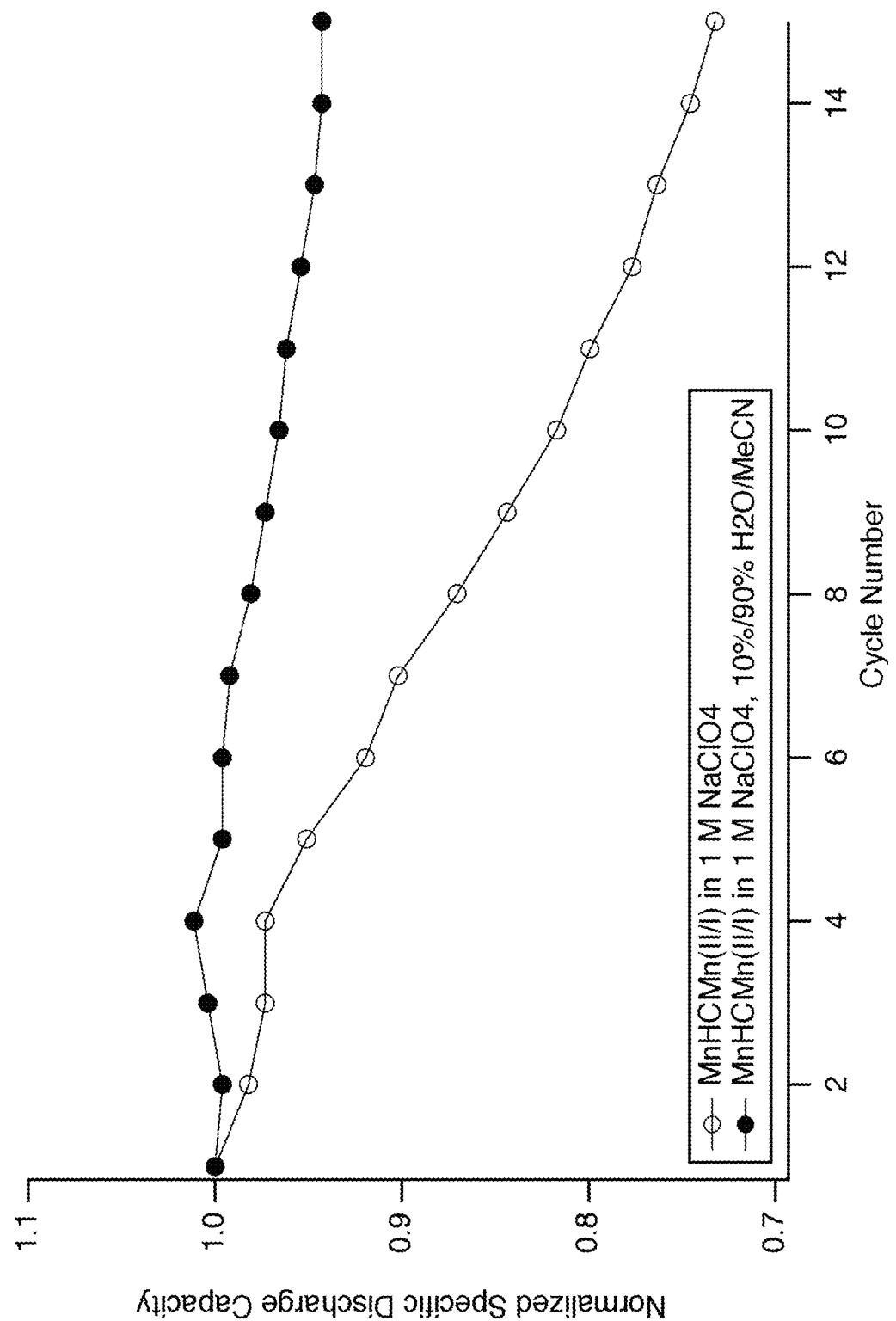
FIG. 10 illustrates a cycle life of MnHCMn in half cells.

FIG. 10 illustrates a cycle life of MnHCMn in half cells. During cycling in 1 M $NaClO_4$ containing 90% solvent volume acetonitrile and 10% solvent volume water, MnHCMn(II/I) shows good cycle life, losing only 5% of its initial discharge capacity after 15 cycles. In contrast, in aqueous 1 M $NaClO_4$ with no acetonitrile present, 25% of the initial discharge capacity is lost after 15 cycles.

Figure 11:
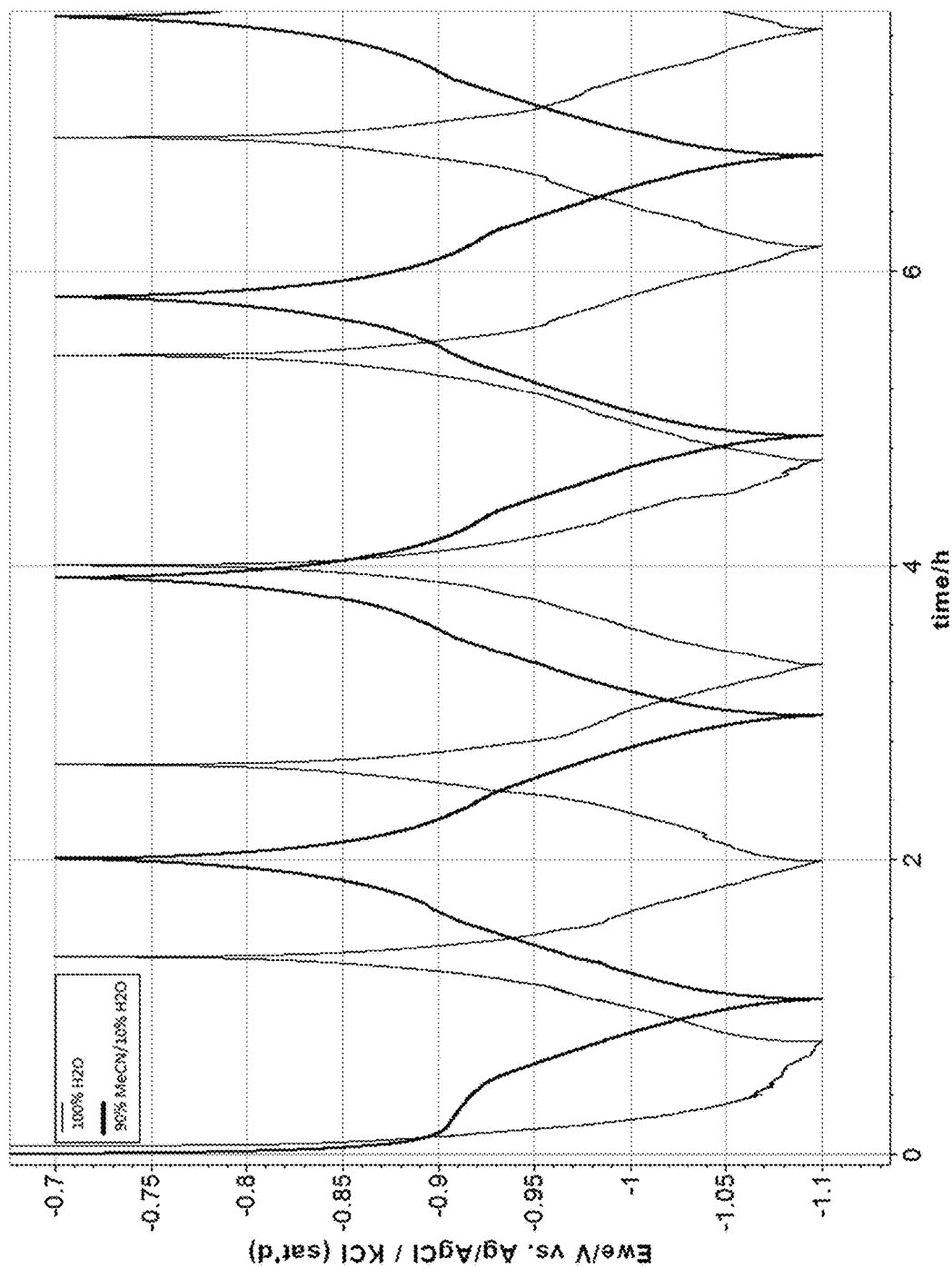
FIG. 11 illustrates a set of potential profiles of MnHCMn in half cells.

FIG. 11 illustrates a set of potential profiles of MnHCMn in half cells. The potential profiles of MnHCMn(II/I) are shown during cycling in two different electrolytes: aqueous 1 M $NaClO_4$ containing no organic cosolvent, and 1 M $NaClO_4$ containing 90% solvent volume acetonitrile and 10% solvent volume water. In both electrolytes, the MnHCMn reaction is centered at −0.95 V vs. Ag/AgCl, or equivalently, −0.75 V vs. SHE. Though both samples were cycled at the same 1 C rate, the sample operated in the purely aqueous electrolyte shows a much lower capacity of 40 mAh/g as rapid hydrolysis upon its insertion into the cell consumed one third of its capacity. In contrast, the MnHCMn electrode operated in the electrolyte containing the organic primary cosolvent had a specific discharge capacity of over 55 mAh/g, much closer to the maximum theoretical value (see FIG. 10).

Figure 12:
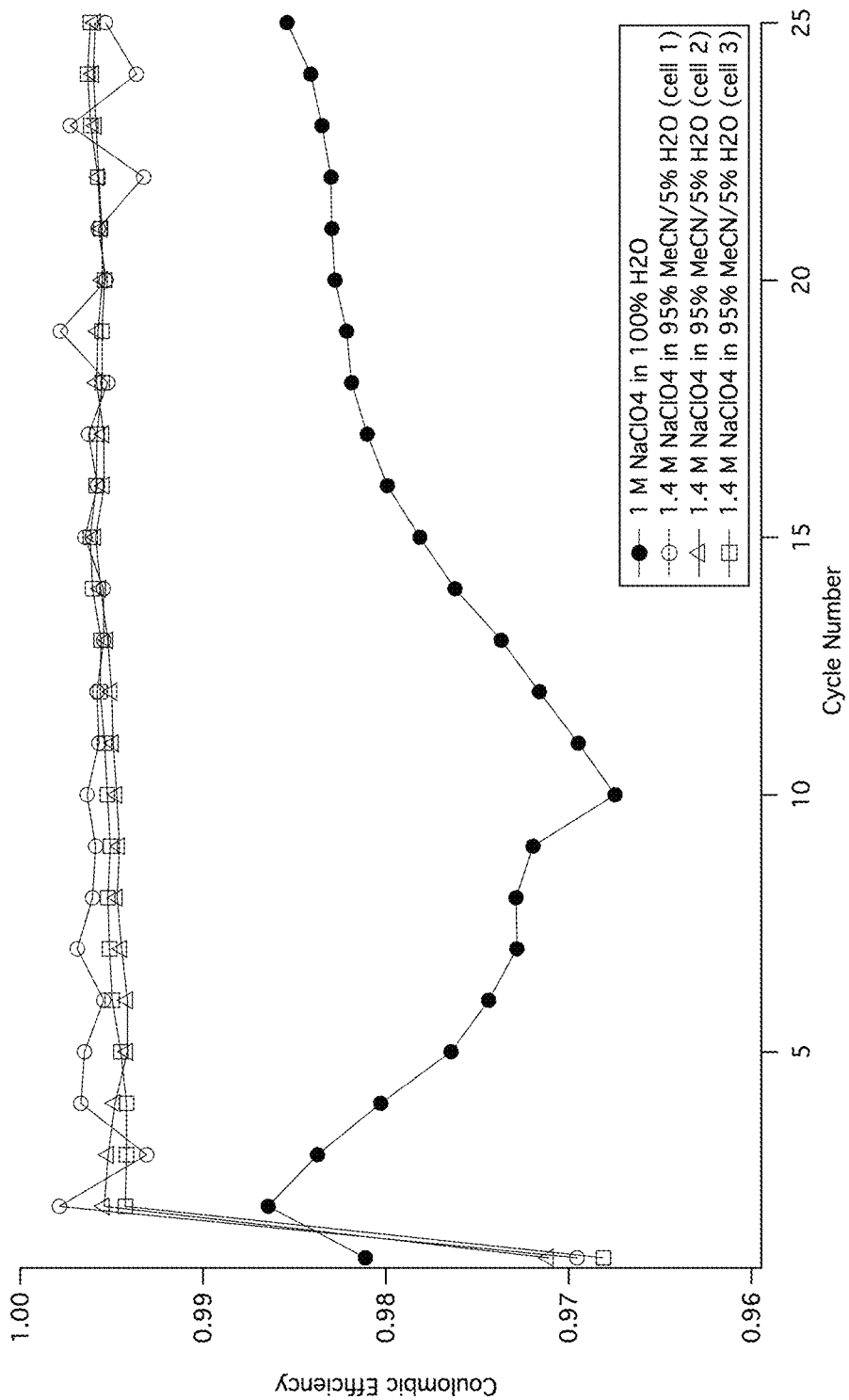
FIG. 12 illustrates a cycle life of CuHCF in half cells.

FIG. 12 illustrates a set of coulombic efficiencies of MnHCMn in half cells operated by galvanostatic cycling between −0.95 V and −0.5 V vs. SHE. The coulombic efficiency is defined as the ratio for each cycle of the discharge capacity divided by the charge capacity. In the cell containing an electrolyte of 1 M $NaClO_4$ and 100% solvent volume water, a coulombic efficiency of less than 99% is observed. In three identical cells each containing an electrolyte of 1.4 M $NaClO_4$, 95% solvent volume acetonitrile, and 5% solvent volume water, a coulombic efficiency of over 99.5% is observed.

Figure 13:
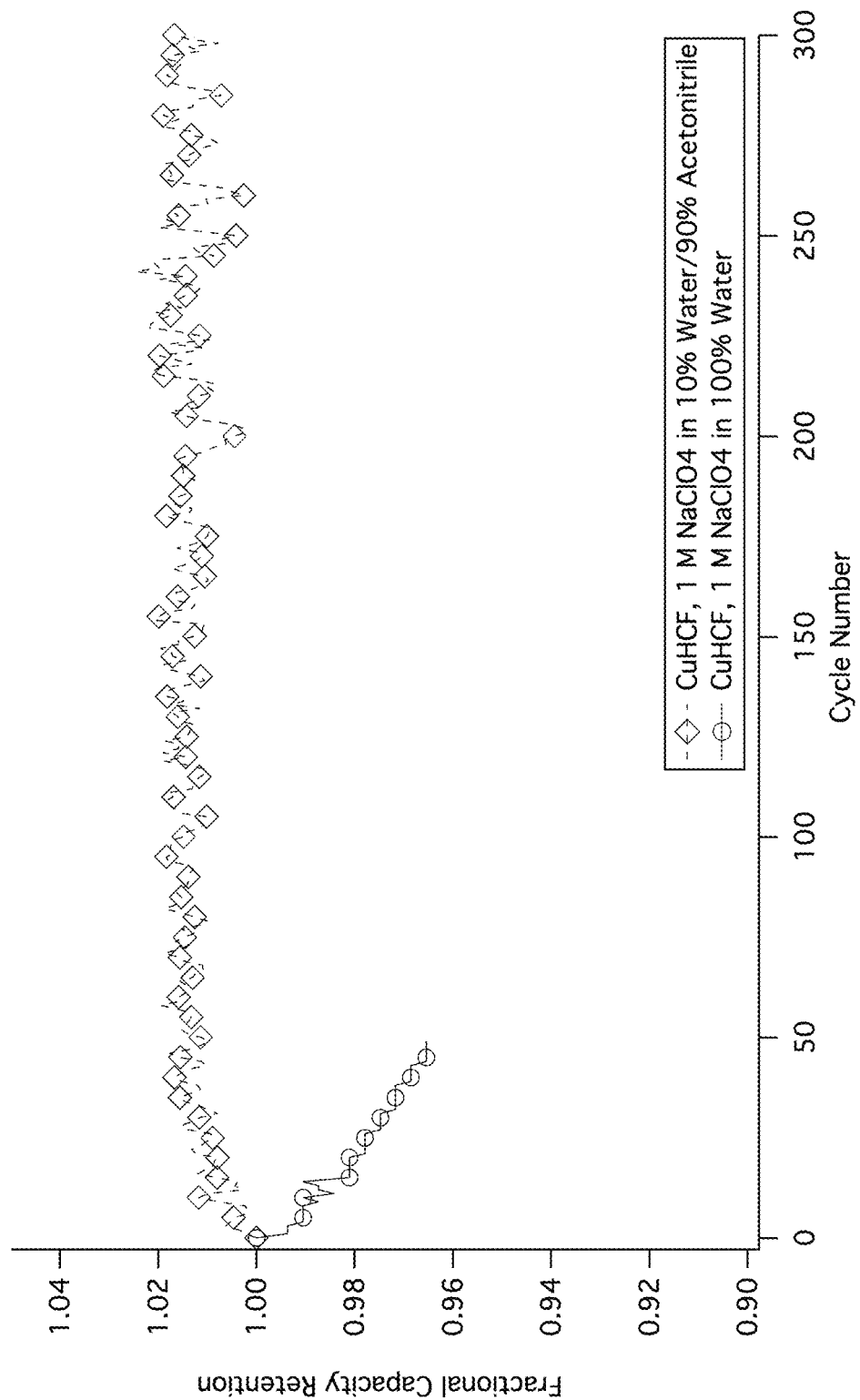
FIG. 13 illustrates a set of GCPL vs. time profiles of MnHCMn vs. CuHCF in the full cell.

FIG. 13 illustrates a cycle life of CuHCF in half cells. During cycling of CuHCF at a 1 C rate in aqueous 1 M $NaClO_4$ containing no organic cosolvents, 4% of the initial discharge capacity is lost after 50 cycles. In contrast, during cycling of CuHCF at a 1 C rate in 1 M $NaClO_4$ containing 90% solvent volume acetonitrile and 10% solvent volume water, zero capacity loss is observed after 300 cycles.

Figure 14:
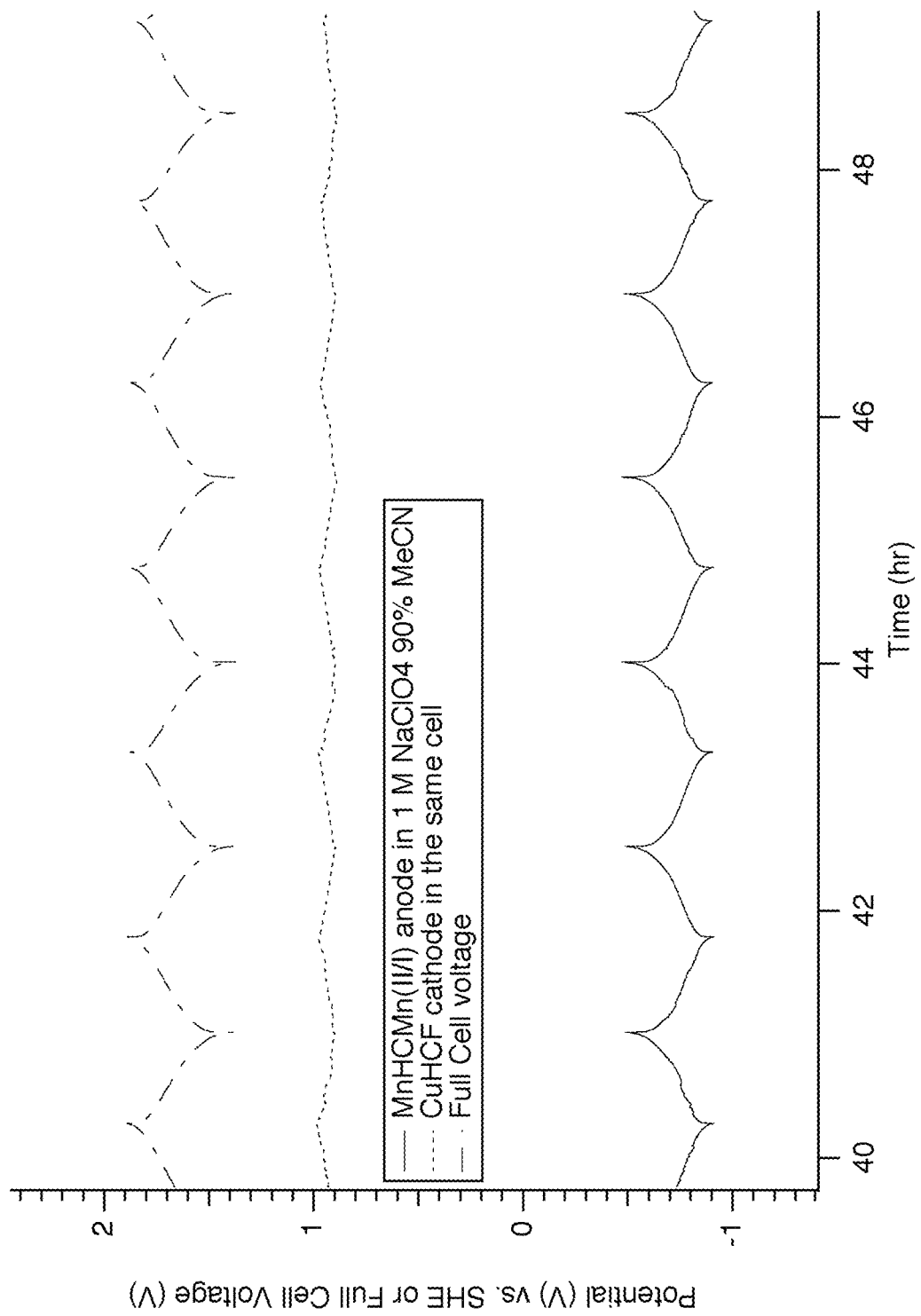
FIG. 14 illustrates a full cell voltage profile.

FIG. 14 illustrates a set of GCPL vs. time profiles of MnHCMn vs. CuHCF in the full cell. The potential profiles of the CuHCF cathode and MnHCMn(II/I) anode in a full cell, and the full cell voltage profile are shown. The electrolyte was 1 M NaClO$_4$, 10% solvent volume H$_2$O, 90% solvent volume MeCN, and cycling was performed at a 1 C rate with the anode operated as the working electrode. An excess of CuHCF was used in this case to avoid any oxygen generation at high potentials, so the potential profile of the cathode is flatter than that of the anode.

Figure 15:
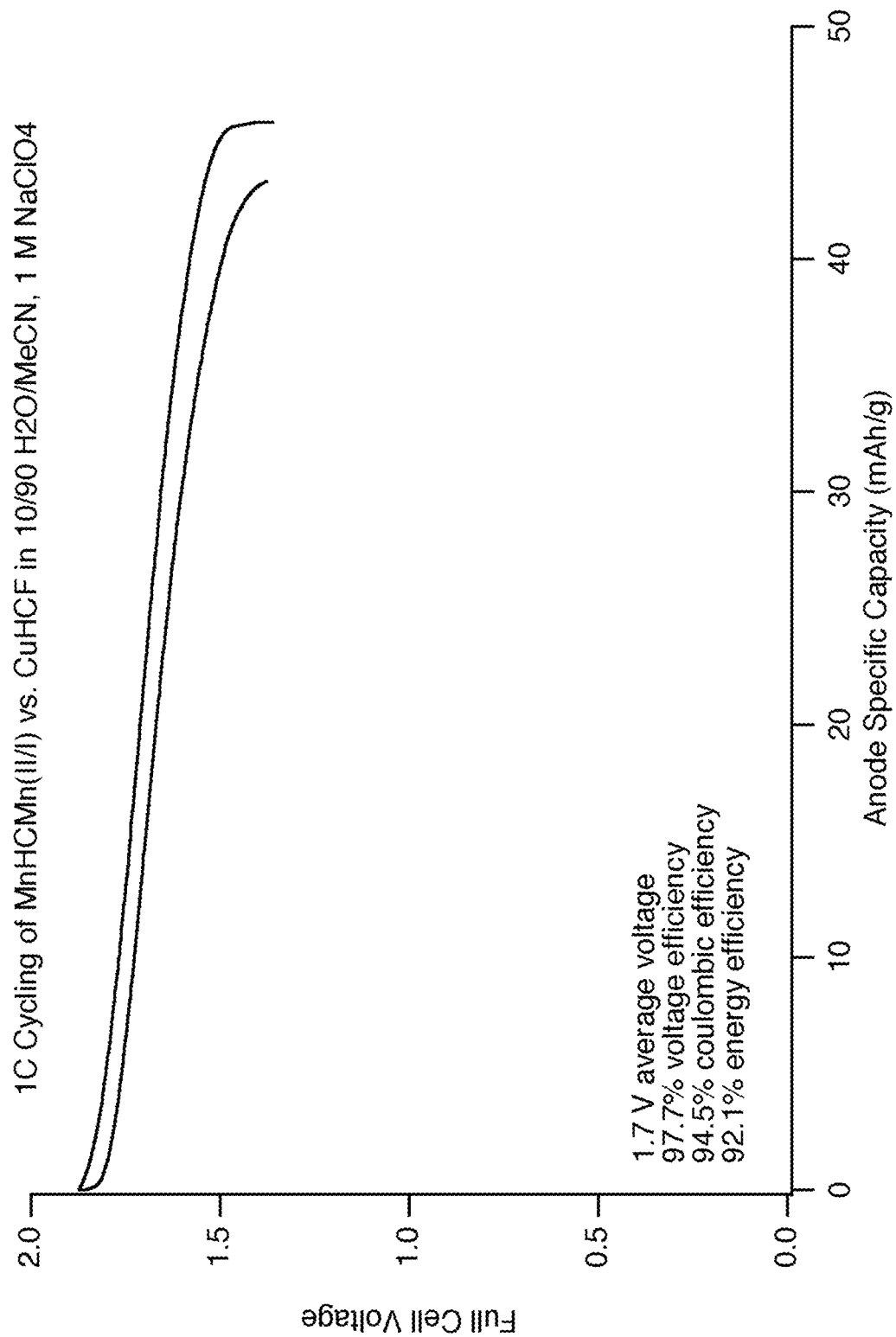
FIG. 15 illustrates a full cell voltage profile of the cell illustrated in FIG. 13.

FIG. 15 illustrates a full cell voltage profile. The full cell voltage profile is of the cell shown in FIG. 13. The average voltage of the cell is 1.7 V, nearly double the voltage achievable if the MnHCMn(III/II) reaction is used. The result is a cell with significantly higher energy and power.

Figure 16:
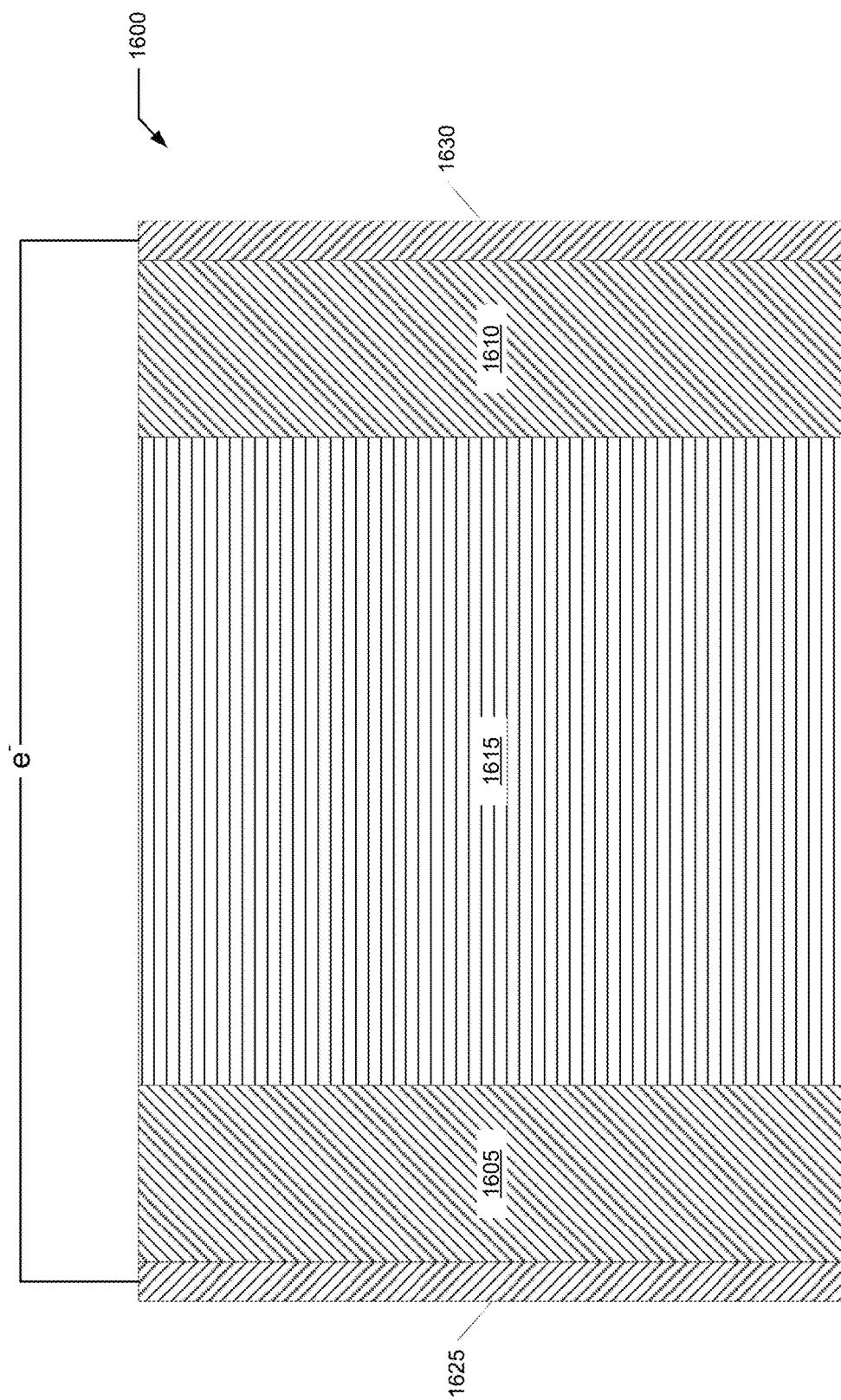
FIG. 16 illustrates a representative secondary electrochemical cell schematic having one or more TMCCC electrodes disposed in contact with a cosolvent electrolyte as described herein.

FIG. 16 illustrates a representative secondary electrochemical cell 1600 schematic having one or more TMCCC electrodes disposed in contact with a cosolvent electrolyte as described herein. Cell 1600 includes a negative electrode 1605, a positive electrode 1610 and an electrolyte 1615 electrically communicated to the electrodes.

OVERVIEW

A battery (or cell) comprises an anode, a cathode, and an electrolyte that is in contact with both the anode and the cathode. Both the cathode and the anode contain an electrochemically active material that may undergo a change in valence state, accompanied by the acceptance or release of cations and electrons. For example, during discharge of a battery, electrons are extracted from the anode to an external circuit, while cations are removed from the anode into the electrolyte. Simultaneously, electrons from the external circuit enter the cathode, as do cations from the electrolyte. The difference in the electrochemical potentials of the cathode and anode results in a full cell voltage. This voltage difference allows energy to be extracted from the battery during discharge, or stored in the battery during charge.

The battery may be rechargeable and include electrodes that may be made of variable potential material. Further, the battery may include one or more additives in chemical communication with the electrolyte. The additive(s) participate in one or more limited side-reactions with one or more of the electrodes. These limited side-reactions degrade charging of its associated electrode(s) for the duration of the side-reaction. This allows other electrodes to begin charging immediately at full coulombic efficiency. Consequently, in response to a charging source, the electrodes may have unbalanced charges. However, with appropriate selection and coordination of the limited side-reaction(s), the overall energy density of the electrochemical device may be greater than the case without the limited side-reactions.

For example, an electrochemical device may include a rechargeable battery including two variable potential electrodes having the same nominal charge capacities and linear variation in their electrochemical potentials with their states of charge, the first of which (cathode) undergoes a full charge or discharge between 1.0 volts and 1.5 volts as measured with respect to an arbitrary reference electrode, and the second of which (anode) undergoes a full charge or discharge between −1.0 volts and −1.5 volts with respect to the same reference electrode, in an electrolyte. Nominally, the cell may reach a full charge at 3.0 volts, with the cathode reaching a potential of 1.5 volts at full charge and the anode reaching a potential of −1.5 volts at full charge, with respect to the reference electrode. During a discharge of this cell to 2.0 volts, the cathode may discharge fully to a potential of 1.0 volts and the anode may discharge fully to a potential of −1.0 volts with respect to the reference electrode. However, in some cases there may be limitations to the cell, or with the chemistry of the cell, among a variety of other different reasons, that the cell cannot charge to 3.0 volts, but rather to a lower voltage. An example of this limitation is an electrolyte that is only electrochemically stable over a 2.8 volt range, less than a 3.0 volt range required to fully charge both electrodes. An embodiment of the present invention may address these situations. Various cases are described herein, for example, see the discussion below with respect to FIG. 31.

The electrolyte in a battery allows ions to flow from one electrode to the other, but that insulates the two electrodes from one another electronically. Typically battery electrolytes include aqueous acids and salts in lead acid and bases nickel/metal hydride batteries, and organic liquids containing lithium salts in lithium-ion batteries. The electrolyte may also contain additives that stabilize the electrodes, prevent side chemical reactions, or otherwise enhance battery performance and durability. The electrolyte may also contain multiple liquid components, in which case they are known as cosolvents. The liquid component making up the majority of the electrolyte is typically known as the primary solvent, while those making up the minority are known as minority solvents.

Organic cosolvents have been used in battery electrolytes in some types of batteries. For example, commercial lithium-ion battery electrolytes contain a variety of organic cosolvents, including ethylene carbonate, diethyl carbonate, propylene carbonate, and others. Those battery electrodes never include water as a minority solvent. Other aqueous electrolyte batteries such as lead acid, nickel/metal hydride, and flow batteries typically do not use cosolvent electrolytes. There is no precedent among previously documented battery systems for cosolvent electrolytes containing water as a minority component.

An electrolyte containing organic cosolvents in combination with water as a minority cosolvent offers several advantages in comparison to electrolytes that are either primarily aqueous or that contain solely organic cosolvents. First, when water is present as only a minority cosolvent, its decomposition into hydrogen and oxygen is suppressed, and a larger practical electrochemical stability window is achieved (FIGS. 1, 4). Second, electrode materials and other battery materials that are water-sensitive and may decompose by a hydrolysis mechanism are more stable when water is only a minority component of the system. Third, water has higher ionic conductivity than the organic solvents typically used in battery electrodes, so its presence as a minority cosolvent increases the electrolyte conductivity.

Cosolvent electrolytes are of interest for the stabilization of TMCCC electrodes that have inherent solubility in aqueous battery electrolytes. Copper hexacyanoferrate (CuHCF) is a TMCCC recently demonstrated to be a high performance battery electrode. In the open framework structure of CuHCF, iron is six-fold, octahedrally coordinated to the carbon ends of the cyanide branching ligands, while copper is octahedrally nitrogen-coordinated (FIG. 3). Depending on the method of synthesis, the A sites in CuHCF may contain potassium or another alkali cation such as sodium or lithium, or another type of cation such as ammonium. More generally, for a TMCCC of the general chemical formula $A_xP_y[R(CN)_6]_z \cdot nH_2O$, alkali cations $A^+$ and water occupy the interstitial A Sites, transition metal P cations are six-fold nitrogen coordinated, and transition metal R cations are six-fold carbon coordinated.

In the work described here, the electrochemical cells contained a TMCCC working electrode, a counter electrode, an electrolyte in contact with both the anode and cathode, and an Ag/AgCl reference electrode used to independently measure the potentials of the anode and cathode during charge and discharge of the cell. When the electrode of interest was a cathode material, then the working electrode was the cathode, and the counter electrode was the anode. When the electrode of interest was an anode material, then the working electrode was the anode, and the counter electrode was the cathode. In the case that the cell did not contain both a TMCCC cathode and a TMCCC anode, a capacitive activated charcoal counter electrode was used to complete the circuit while allowing the study of a single TMCCC electrode.

Electrochemical characterization of electrodes was performed using cyclic voltammetry (CV) and galvanostatic cycling with potential limitation (GCPL). During the CV technique, the potential of the working electrode is swept at a constant rate between high and low cutoff potentials, and the resulting current into or out of the electrode is measured. During the GCPL technique a constant current is applied to the cell until the working electrode reaches a maximum or minimum potential; upon reaching this potential extreme, the sign of the current is reversed.

Researchers have used TMCCCs as battery electrodes in cells containing aqueous and organic electrolytes For example, the reversible reduction of Prussian Blue to Everitt's Salt has allowed its use as an anode in aqueous cells. However, the electrochemical potential of Prussian Blue is relatively high, so using it as an anode with a TMCCC cathode results in a low full cell voltage of 0.5-0.7 V vs. SHE. Such low voltages make these cells impractical, as many cells in series would be required to achieve the high voltages needed for many applications.

Chromium hexacyanochromate (CrHCCr) has also been used as an anode in full cells that also contained Prussian Blue cathodes, and an aqueous/Nafion electrolyte. The performance of these cells was limited by the low potential and poor coulombic efficiency of CrHCCr in aqueous electrolytes and the use of acidic electrolytes in which CrHCCr hydrolyzes.

TMCCC anodes containing electrochemically active hexacyanomanganate groups have also been recently demonstrated. Examples include manganese hexacyanomanganate (MnHCMn), and zinc hexacyanomanganate (ZnHCMn). In hexacyanomanganate-based TMCCC anodes, the hexacyanomanganate groups undergo two electrochemical reactions. First, $Mn^{III}(CN)_6$ can be reversibly reduced to $Mn^{II}(CN)_6$ at potentials near or above 0 V vs. SHE. Second, $Mn^{II}(CN)_6$ can be reduced to $Mn^{I}(CN)_6$ at lower potentials, typically below −0.4 V vs. SHE. In general, the lower reaction cannot be efficiently used in aqueous electrolytes due to the simultaneous generation of hydrogen gas at such low potentials. One exception is chromium hexacyanomanganate (CrHCMn), which has a lower reaction potential of about −0.35 V, but high-purity CrHCMn is extraordinarily difficult to synthesize due to its affinity to form other phases such as mixed cyanides and oxides of chromium. In no prior art has the lower reaction of any hexacyanomanganate-based TMCCC been used with high coulombic efficiency in aqueous electrolytes.

Though the use of a basic electrolyte would result in a lower potential for the onset of $H_2$ generation, TMCCCs rapidly decompose at high pH except in the presence of an excess of free cyanide anions, which are a severe safety hazard. Mildly acidic or neutral electrolytes are needed for them to be stable. Thus, only the upper reaction of MnHCMn can be used without deleterious $H_2$ production. As the upper stability limit of these aqueous electrolytes is near 1 V, MnHCMn can be paired with a cathode such as CuHCF to produce a battery with an average full cell voltage of about 0.9-1 V.

TMCCCs have also been used as cathodes, but not as anodes, in organic electrolyte batteries. Most commonly, they have been used as cathodes in place of the standard $LiCoO_2$ cathode found in high-voltage organic electrolyte Li-ion cells. A number of studies have demonstrated TMCCCs containing electrochemically active iron and/or manganese as cathodes in these high voltage cells.

TMCCCs have not been previously used as battery electrodes in cosolvent electrolytes in which water is a minority cosolvent. In recently published patent application, we described the opportunity to do so for the specialized case of water acting as the primary cosolvent. However, a practical cosolvent had not yet been identified, and the cosolvent electrolytes described in that document decompose into multiple phases under some circumstances, making them impractical for use in an actual battery. In addition, in that previous work, the idea of a cosolvent was described and claimed in the context of an organic liquid additive to a water, with water as the primary solvent of the electrolyte. Herein we describe for the first time the principles for selecting cosolvents and electrolyte salts to combine with water to produce stable, single phase aqueous cosolvent electrolytes in which TMCCC electrodes operate with high efficiency, fast kinetics, and long lifetime. In addition, we demonstrate for the first time the operation of TMCCC electrodes in aqueous cosolvent electrolytes in which water is a minority solvent of the electrolyte, and an organic solvent is the primary solvent.

U.S. Patent Application No. 61/722,049 filed 2 Nov. 2012 includes a discussion of various electrolyte additives to aqueous electrolytes, as well as coatings on the electrodes of electrochemical cells, that can improve a rate of capacity loss. U.S. Patent Application No. 61/760,402 filed 4 Feb. 2013 includes a discussion of a practical TMCCC anode. Both of these patent applications are hereby expressly incorporated in their entireties by reference thereto for all purposes.

Herein we discuss and demonstrate for the first time the use of a practical aqueous cosolvent electrolyte for batteries containing a TMCCC anode and a TMCCC cathode. The use of an organic liquid as the primary solvent, with water as a minority solvent has no significant effects on the kinetics or reaction potentials of either TMCCC anodes or TMCCC cathodes as compared to the performance of those electrolytes in aqueous electrolytes containing no organic solvents. In addition, the cosolvent stabilizes TMCCCs against dissolution and hydrolysis, resulting in greater electrode stability and longer cycle and calendar life.

Our previous demonstration of the operation of TMCCC cathodes in cosolvent electrolytes did not demonstrate the use of an organic solvent as the majority electrolyte, and it considered only the effect of an organic minority cosolvent on the performance of TMCCC cathodes without showing the reduction to practice of a full cell containing a cosolvent electrolyte. Furthermore, it did not address the extreme sensitivity of hexacyanomanganate-based TMCCC anodes to electrolyte composition. For these reasons, among others, the work described here is novel and independent.

The addition of an organic cosolvent as the majority component to the battery electrolyte is especially important for the performance and lifetime of TMCCC anodes. Whereas without any cosolvents, the upper reaction of the MnHCMn anode must be used in aqueous electrolytes, here we show that the addition of a cosolvent to the electrolyte suppresses electrolysis of water to hydrogen gas. In a full cell also containing a CuHCF cathode, the result in an increase in average discharge voltage from about 0.9 V to about 1.7 V (FIG. 1). Nearly doubling the cell voltage has extraordinary ramifications for the performance and cost of the battery. Energy scales proportionally with voltage, while power scales with the square of the voltage. Thus, nearly doubling the voltage while using the same electrode materials results in about twice the energy and nearly four times the power, at about the same materials cost. Without the presence of a cosolvent that limits the rate of hydrogen production at the anode, cells with a TMCCC anode and cathode cannot achieve high efficiency at voltages above about 1.3 V. Thus, the addition of the cosolvent increases the maximum practical voltage, energy, and power of the cell.

Prior study of TMCCCs in organic electrolytes did include the use of organic cosolvent electrolytes in some cases. However, in anhydrous conditions, the kinetics of TMCCC electrodes are vastly reduced, making these electrodes impractical for high power applications. In this work, we demonstrate for the first time the use of aqueous cosolvent electrolytes containing non-negligible amounts of water. That water must be present for the TMCCC electrodes to be rapidly charged or discharged.

As a first example, acetonitrile (also known as methyl cyanide, or MeCN) is chosen as a cosolvent to be used in electrolytes for batteries containing TMCCC electrodes. MeCN is fully miscible with water and is electrochemically stable over a much wider potential range than water itself. High purity, anhydrous MeCN is used in commercial ultra-capacitors. Here, reagent-grade MeCN was used, as low voltage cells are less sensitive to electrolyte impurities that may result in parasitic side reactions at extreme potentials.

The choice of MeCN provides an additional benefit for the specific case of a battery containing TMCCC electrodes. In a cosolvent electrolyte containing MeCN as the primary solvent, the solvation shells of the TMCCC electrode particles will primarily be cyanide groups in which nitrogen faces the particle. This completes the six-fold nitrogen coordination of P-site cations in the particle at the surface or adjacent to hexacyanometalate vacancies. The result is improved material stability via suppression of dissolution via the formation of a hydration shell.

Other examples of organic solvents include ethylene carbonate, propylene carbonate, and dimethyl carbonate; sulfolane; 1,3 dioxolane; propylene glycol monoethyl ether; hydroxypropionitrile; diethylene glycol; gamma-valerolactone; acetone; ethylene glycol and glycerol. Organic cosolvents must be polar to allow them to form miscible single phase solutions with water and a salt, but they may be either protic or aprotic.

It is desirable when using hexacyanomanganate-based TMCCC anodes to use water as only a minority cosolvent, and organic liquids as the primary cosolvents. The manganese-carbon bond in hexacyanomanganate is labile and cyanide can be replaced by water and/or hydroxide. The choice of a larger, less polar organic species as the primary solvent results in weaker bonding to Mn and steric hindrance, both of which protect the hexacyanomananate group from suffering ligand exchange leading to its decomposition.

Proper selection of the electrolyte cosolvents, salts, and any additional additives will result in a single-phase system in which all of the components are miscible and do not phase segregate. Phase segregation in a battery electrolyte is undesirable because ion transport will occur primarily in the phase containing the higher salt concentration, while the other, less conductive phase or phases will impede the transport of ions. It is not enough to simply choose liquids that are miscible, as the addition of a salt can lead to decomposition of the electrolyte into multiple phases: for example, one that is mostly water, that has a high salt concentration, and that contains a small amount of the organic solvent, and a second phase that is mostly organic solvent, and contains little water or salt leads to poor performance when there is phase segregation, a problem addressed by proper selection of electrolyte cosolvents.

A very limited number of common electrolyte salts that are highly water soluble are also appreciably soluble in organic solvents. This is because most organic solvents have dielectric constants much lower than that of water. In other words, organic solvents are typically not as polar as water, so the formation of a solvation shell during the dissolution of an ionic salt is not energetically favorable. For example, potassium nitrate, which has a saturation of 3.6 M in water at room temperature, is only sparingly soluble in most organic solvents.

Here, to demonstrate a reduction to practice of the operation of TMCCC electrodes in cosolvent electrolytes containing an organic primary solvent, an embodiment may use sodium perchlorate hydrate as the electrolyte salt in cosolvent electrolytes of water and MeCN. The choice of $NaClO_4 \cdot H_2O$ is based on its ability to dissolve in high concentrations (greater than 1 M) over the entire range of cosolvent ratios from 100%/0% water/MeCN to 0%/100% water/MeCN without forming biphasic systems.

The ternary phase diagrams describing the solubility of salts such as $NaClO_4$ in cosolvents such as water/MeCN are tabulated. The general need for high salt concentration and a monophasic electrolyte can be used to select other combinations of salts and cosolvents from these data.

Other cosolvents besides acetonitrile that can be used with water in electrolytes for use in batteries containing TMCCC anodes include, but are not limited to, methanol, ethanol, isopropanol, ethylene glycol, propylene glycol, glycerine, tetrahydrofuran, dimethylformamide, and other small, polar linear and cyclic alcohols, polyols, ethers, and amines. However, while many of these solvents are fully miscible with pure water, they are not miscible in the presence of concentrated salt. For example, more than a few percent isopropyl alcohol will phase-segregate from concentrated aqueous salts of sodium, which this will not occur if acetonitrile is used in the place of isopropyl alcohol. A proper selection of the cosolvents and the salt will result in a single-phase solution.

CuHCF was synthesized as reported previously. An aqueous solution of $Cu(NO_3)_2$, and a second aqueous solution of $K_3Fe(CN)_6$ were added to water by simultaneous, dropwise addition while stirring. The final concentrations of the precursors were 40 mM $Cu(NO_3)_2$ and 20 mM $K_3Fe(CN)_6$. A solid, brown precipitate formed immediately. It was filtered or centrifuged, washed, and dried. In a prior study, CuHCF synthesized by this method was found to have the composition $K_{0.7}Cu[Fe(CN)_6]_{0.7} \cdot 2.8H_2O$. The CuHCF was found to have the cubic Prussian Blue open framework crystal structure using X-ray diffraction (XRD). The CuHCF was composed of nanoparticles about 50 nm in size, as verified by scanning electron microscope (SEM).

MnHCMn was produced state by adding a 10 mL aqueous solution containing 0.0092 mmol KCN to a 10 mL aqueous solution containing 0.004 mmol $MnCl_2 \cdot 4H_2O$ under constant stirring in the dark in a nitrogen atmosphere. After stirring the solution for 20 minutes, the resulting dark green precipitate was centrifuged, washed with methanol, and dried at room temperature in a nitrogen atmosphere. Analysis of this material using X-ray diffraction showed that it had the monoclinic crystal structure characteristic of MnHCMn (II) synthesized by a similar method Composition analysis using inductively coupled plasma optical emission spectrometry (ICP-OES) revealed that this material was $K_{0.4}Mn[Mn(CN)_6]_{0.6} \cdot nH2O$ (0<n<4).

Aqueous cosolvent electrolytes were prepared from reagent-grade $NaClO_4 \cdot nH_2O$, de-ionized water, and reagent grade MeCN. All electrolytes were pH-neutral, but not buffered. The salt was dissolved in a concentration of 1 M in cosolvents with solvent volume ratios of 100%/0%, 90%/10%, 50%/50%, 10%/90%, and 0%/100% water/MeCN.

Electrodes containing the freshly synthesized TMCCCs were prepared as reported previously. The electrochemically active material, carbon black, and polyvinylidene difluoride (PVDF) binder were ground by hand until homogeneous, and then stirred in 1-methyl-2-pyrrolidinone (NMP) solvent for several hours. This slurry was deposited on an electronically conductive carbon cloth substrate using a doctor blade or spatula. Other substrates including foils and meshes of stainless steel and aluminum can also be used. These electrodes were dried in vacuum at 60° C. For practical batteries, the binder is preferably selected such that it is stable against dissolution or excessive swelling in the cosolvent electrolyte, but is still fully wetted by the cosolvent. Methods for determining binder/electrolyte compatibilities such as Hansen Solubility Parameter analysis are well known.

Activated charcoal counter electrodes were prepared by grinding the charcoal with PVDF before stirring in NMP for several hours, followed by deposition and drying on conductive substrates following the same procedure as in the case of electrodes containing a TMCCC.

Electrochemical Characterization

Half-cell measurements were performed on TMCCC electrodes in cosolvent electrolytes. The cell contained the working electrode, an Ag/AgCl reference electrode, an activated charcoal counter electrode, and the deaerated electrolyte. Cyclic voltammetry was performed on the working electrode.

EXAMPLE 1

A MnHCMn electrode was disposed in a half cell in the configuration described above and operated by cyclic voltammetry. The reaction potentials of the reactions of MnHCMn with 1 M $Na^+$ were found to be about −0.76 V and 0.04 V vs. SHE. The potential of the lower reaction of MnHCMn varied only slightly with the addition of MeCN to the electrolyte, from 0% MeCN to 95% MeCN (FIG. 3-4). The magnitude and sign of the small shift in reaction potential showed no trend with MeCN concentration (FIG. 3). Furthermore, MnHCMn was found to cycle reversibly in 95% MeCN at with $Na^+$ salt concentrations of both 1 M and 1.4 M.

EXAMPLE 2

A MnHCMn electrode was disposed in a half cell in the configuration described above and operated by cyclic voltammetry. MnHCMn was found to cycle reversibly in cosolvent electrolytes containing water as a minority cosolvent comprising 5% of the total solvent volume, and with equal quantities of MeCN and a second organic cosolvent comprising the remaining 95% of the total solvent volume (FIG. 5-6). These second organic cosolvents were one of: sulfolane, propylene glycol monoethyl ether, hydroxypropionitrile, gamma-valerolactone, ethylene carbonate, dimethyl carbonate, and 1,3-dioxolane. In these example electrolytes, the solvent volume of MeCN is as little as 10%, with another primary organic cosolvent such as propylene carbonate comprising 85% solvent volume. These electrolyte compositions of matter demonstrate the use of multiple organic cosolvents in combination with water as a minority cosolvent.

EXAMPLE 3

A MnHCMn electrode was disposed in a half cell in the configuration described above and operated by cyclic voltammetry. Over 55 mAh/g of specific discharge capacity was achieved for the lower reaction of MnHCMn in a cosolvent electrolyte of 1 M $NaClO_4$ in 90% MeCN and 10% water (FIG. 7). This is comparable to the 50-60 mAh/g capacities typically achieved for the upper reaction of MnHCMn at 0.05 V in aqueous electrolytes. With no loss in specific capacity of the anode, but a gain in full cell voltage of about 0.8 V, full cells that operate by using the lower reaction of MnHCMn will have nearly double the energy of those that operate by using the upper reaction of MnHCMn, with the same electrode materials (and associated costs). This makes the use of the lower reaction, and therefore, the use of a cosolvent electrolyte, critically important to the economics and viability of the battery.

EXAMPLE 4

A CuHCF electrode was disposed in a half cell in the configuration described above and operated by cyclic voltammetry. The half cells contained electrolytes of 1 M $NaClO_4$ and quantities of water and acetone up to 90% acetone. During cyclic voltammetry the reaction potential of CuHCF with 1 M $Na^+$ was observed to be centered at 0.84 V vs. SHE, which is consistent with the previously observed value (FIG. 8). The reaction potential and peak current hysteresis of CuHCF during CV varied only slightly, 1 M $NaClO_4$ cosolvents containing increasing amounts of acetone up to 90% of the total solvent volume.

EXAMPLE 5

A MnHCMn electrode was disposed in a half cell in the configuration described above and operated by cyclic voltammetry. In this example, the half cell contained an electrolyte of pure MeCN and no water, and 1 M NaClO4. A much lower peak current of MnHCMn was observed in MeCN electrolyte without water added as a minority cosolvent (FIG. 9). In contrast, the CV curves shown in FIG. 3, FIG. 4, and FIG. 8 show that there is little change in the voltage difference between the peak currents in oxidation and reduction. This qualitatively indicates that the kinetics of the reaction of both MnHCMn and CuHCF with $Na^+$ do not change in the presence of MeCN, up to the case of a 95% MeCN primary solvent. This example demonstrates that a minimum amount of water must be present in the cosolvent electrolyte to allow reversible electrode cycling that yields useful discharge capacity.

EXAMPLE 6

A MnHCMn electrode was disposed in a half cell in the configuration described above and operated by cyclic voltammetry. In this example, the half cell contained an electrolyte of either pure water with no organic cosolvents and 1 M NaClO$_4$, or of 95% solvent volume basis MeCN, with 5% solvent volume basis water and 1 M or 1.4 M NaClO$_4$ (FIG. 4). The background current observed at −0.9 V vs. S.H.E. was approximately 1 mA in the aqueous electrolyte containing no organic cosolvents. In the 95% volume basis MeCN electrolytes, the background current at −0.9 V vs. S.H.E. was less than 0.1 mA. Background current during a cyclic voltammetry scan indicates a side reaction such as the decomposition of water that harms coulombic efficiency. This example demonstrates that the addition of a majority organic cosolvent results in an improvement in the coulombic efficiency of the MnHCMn anode.

EXAMPLE 7

A MnHCMn electrode was disposed in a half cell in the configuration described above and operated by galvanostatic cycling at a 1 C rate between −0.9 V and −0.6 V vs. S.H.E. In aqueous 1 M NaClO$_4$ containing no organic cosolvents, the MnHCMn electrode lost 25% of its initial specific discharge capacity after 15 cycles (FIG. 10). However, in a cosolvent electrolyte of 1 M NaClO$_4$ containing 90% solvent volume MeCN and 10% solvent volume water as a minority cosolvent, less than 5% capacity loss was observed after 15 cycles. This demonstrates that the use of an organic cosolvent as the majority cosolvent solvent and water as a minority cosolvent significantly increases the cycle lifetime of the MnHCMn anode.

EXAMPLE 8

A MnHCMn electrode was disposed in a half cell in the configuration described above and operated by galvanostatic cycling at a 1 C rate between −0.9 V and −0.5 V vs. S.H.E. In aqueous 1 M NaClO$_4$ containing no organic cosolvents, the MnHCMn electrode had an initial discharge capacity of about 40 mAh/g. In 1 M NaClO4 containing 90% solvent volume MeCN and 10% solvent volume water as a minority cosolvent, a specific discharge capacity of about 55 mAh/g was achieved. This demonstrates that the use of the organic primary cosolvent prevents the decomposition of MnHCMn that can result in significant, immediate capacity loss.

EXAMPLE 9

A MnHCMn electrode was disposed in a half cell in the configuration described above and operated by galvanostatic cycling at a 1 C rate between −0.95 V and −0.5 V vs. S.H.E. In aqueous 1 M NaClO$_4$ containing no organic cosolvents, the MnHCMn electrode had coulombic efficiency of less than 99% (FIG. 12). In 1.4 M NaClO$_4$ containing 95% solvent volume MeCN and 5% solvent volume water as a minority cosolvent, a coulombic efficiency of over 99.5% was achieved in three identical cells.

EXAMPLE 10

A CuHCF electrode was disposed in a half cell in the configuration described above and operated by galvanostatic cycling at a 1 C rate. CuHCF loses 4% of its initial capacity after 50 cycles at a 1 C rate in aqueous 1 M NaClO$_4$ (FIG. 13). In contrast, CuHCF is completely stable and shows zero capacity loss after 300 cycles when operated in an electrolyte of 1 M NaClO$_4$ containing 90% solvent volume MeCN as the primary cosolvent and 10% solvent volume water.

EXAMPLE 11

In this example, MnHCMn and CuHCF electrodes were disposed as anode and cathode, respectively, in a full cell also containing a reference electrode as described above. The electrolyte was 1 M NaClO$_4$ in 90% solvent volume MeCN and 10% solvent volume water. These full cells were operated such that the anode was controlled by the reference electrode as the working electrode. The cathode was oversized such that the capacity of the anode limited the capacity of the full cell. The MnHCMn anode was galvanostatically cycled at 1 C as the working electrode between −0.9 V and −0.5 V vs. SHE. Highly reversible cycling of the full cell is achieved in this primarily organic cosolvent electrolyte (FIG. 14). Negligible capacity loss of either the CuHCF cathode or the MnHCMn anode was observed for 30 cycles, as shown by the consistent duration of each cycle shown in FIG. 13. This full cell operates at an average voltage of 1.7 V, nearly double that of the 0.9 V cell achievable if the upper reaction of MnHCMn is used (FIG. 1, FIG. 7, and FIG. 15). As the electrode materials in these two cells are identical, and only their mode of operation is changed, the higher voltage cell offers nearly twice the energy at the same materials cost. On a basis of the masses and densities of two TMCCC electrodes, a 1.7 V cell will have a specific energy of 50 Wh/kg and an energy density of 90 Wh/L.

FIG. 16 illustrates a representative secondary electrochemical cell 1600 schematic having one or more TMCCC electrodes disposed in contact with a cosolvent electrolyte as described herein. Cell 1600 includes a negative electrode 1605, a positive electrode 1610 and an electrolyte 1615 electrically communicated to the electrodes. One or both of negative electrode 1605 and positive electrode 1610 include TMCCC as an electrochemically active material. A negative current collector 1620 including an electrically conductive material conducts electrons between negative electrode 1605 and a first cell terminal (not shown). A positive current collector 1625 including an electrically conductive material conducts electrons between positive electrode 1610 and a second cell terminal (not shown). These current collectors permit cell 1600 to provide electrical current to an external circuit or to receive electrical current/energy from an external circuit during recharging. In an actual implementation, all components of cell 1600 are appropriately enclosed, such as within a protective housing with current collectors externally accessible. There are many different options for the format and arrangement of the components across a wide range of actual implementations, including aggregation of multiple cells into a battery among other uses and applications.

Electrolyte 1615, depending upon implementation, includes a set of conditions that affect production of hydrogen and oxygen gas responsive to the operating voltages of the electrodes. In general, at a first electrode voltage V1 relative to a reference electrode, initiation of more than an incidental quantity of hydrogen gas will begin to be produced at a particular rate R1 that is consequential for the particular application. Pure water, under comparable conditions, begins the production of hydrogen gas at rate R1 using a second electrode voltage V2 that is greater than V1 (as shown in FIG. 1, this voltage is less negative). Cell 1600 may be operated at an electrode voltage less than V2 but greater than V1 to achieve a greater cell voltage between the electrodes while producing hydrogen gas at second rate R2 less than R1.

Additives

Electrolytes may contain not only solvents and salts, but additives as well. These additives may be included for many reasons, including but not limited to: to improve the calendar or cycle life of one or both of the electrodes, to change the coulombic efficiency of one or both of the electrodes, to change the rate of electrochemical oxidation or reduction of one or both of the electrodes, to prevent chemical or electrochemical decomposition of one or more other electrolyte components, to prevent chemical dissolution or other chemical reactions of one or both of the electrodes with the electrolyte or its components, to change the ionic conductivity, viscosity, or transference numbers of the electrolyte, to change the surface tension of the electrolyte, to change the wetting of at least one of the separator and electrodes, to change the flammability or volatility of the electrolyte, and to decrease the corrosion or degradation of at least one cell component including the separator, electrodes, current collectors, tabs, terminals, and packaging.

Electrolyte additives may be effective in concentrations as low as nanomolar, or at somewhat higher concentrations such as micromolar, or millimolar, up to concentrations of about 100 mM. Any particular electrolyte additive might be most effective at a particular concentration. Multiple additives might be added to the same electrolyte in different concentrations. The most effective concentrations of additives and combinations of additives might vary with the salts and cosolvents also present in the electrolyte.

Some electrolyte additives may be chemically active and undergo a reaction with another chemical species in the cell, such as with an electrolyte solvent, salt, or another additive, or such as an electrode component such as an electrochemically active electrode material, a binder, a conductive additive, another electrode additive, or a current collector.

Electrolyte additives may be electrochemically active and undergo electrochemical reactions in the cell. These electrochemical reactions may occur on, in, or near one or both electrodes. These reactions may be reversible or irreversible. They may result in the production of a new species that is soluble in the electrolyte, or in the production of an insoluble product on an electrode surface or elsewhere in the cell, or in the production of a gas. Additives may undergo an electrochemical reaction in which one or more other species of the electrolyte or at least one electrode are also reactants. These electrochemical reactions may occur within the normal operating electrochemical potential ranges of at least one of the electrodes, or they may occur outside of it during overdischarge or overcharge of the cell. They may also occur when the electrolyte is initially added to the cell and before the cell is charged or discharged for the first time. Finally, they may occur if the temperature of the cell exceeds its normal range, or if foreign substances such as air enter the cell.

Chemical or electrochemical reactions of an electrolyte additive may alter at least one of the composition, morphology, crystal structure, chemical or electrochemical activity, or other properties of at least one of the surface or bulk of one or more of the electrodes, separator, current collectors, or other cell components.

The additive or the chemical or electrochemical reaction products of the additive may change one or more of the chemical or physical properties of at least one other cell component such as the solubility, reactivity towards other species in the cell, thermal stability, thermal conductivity, ionic or electronic conductivity, transference numbers of the electrolyte salt species, viscosity, or other properties.

The chemical composition of an electrolyte additive is limited only by its ability to be dissolved, suspended, dispersed, or otherwise distributed in at least one region of the electrolyte.

An electrolyte additive may include an inorganic component such as a metal cation, including but not limited to alkali metal cations (lithium, sodium, potassium, rubidium, etc.), alkaline earth cations (beryllium, magnesium, calcium, etc.), aluminum, transition metal cations (scandium, titanium, chromium, vanadium, iron, manganese, nickel, cobalt, copper, zinc, zirconium, heavy metal cations (cerium, lead, bismuth, etc.), or intermetallics (gallium, tin, antimony, etc.). These metal cations may have a valence state of one or more of 1+, 2+, 3+, 4+, or 5+.

An electrolyte additive may include an inorganic component such as an anion, including but not limited to halogens (fluorine, chlorine, bromine, iodine, etc.), polyatomic anions containing oxygen including but not limited to sulfate, nitrate, perchlorate, carbonate, phosphate, and borate, polyatomic anions containing fluorine including but not limited to tetrafluoroborate, hexafluorophosphate, hexafluoroarsenate, or other inorganic anions. These anions may have a valence state of one or more of 1−, 2−, 3−, or a more negative valence state.

An electrolyte additive may include a cation containing nitrogen, including but not limited to ammonium, mono substituted ammoniums, disubstituted ammoniums, trisubstituted ammoniums, or tetrasubstituted ammonium. The substituted groups may include linear, branched, or ringed hydrocarbon groups, or groups containing alcohols, ketones, carboxylates, esters, nitriles, or other functional groups. For example, an electrolyte additive might include ethyl ammonium, or tert-butyl ammonium, or ethyl phenyl ammonium, or tetrabutyl ammonium.

An electrolyte additive may include a polyatomic anion such as a carboxylate (formate, acetate, oxalate, etc.), an alkoxide (ethoxide, isopropoxide, butoxide, etc.), a thiol (decanethiol, etc.), an amine (ethylenediamine, ethylenediaminetetraacetate)

An electrolyte additive may include a neutral organic species such as a quinone (benzoquinone, hydroquinone, etc.), a sulfone (dimethyl sulfone, ethyl methyl sulfone, etc.), a carbonate (propyl carbonate, pentyl carbonate, vinyl carbonate, etc.), ethers including crown ethers, ethylene glycol, polyethyleneglycol, polypropyleneglycol An electrolyte additive may include an organometallic species such as an organometallic anion including but not limited to hexacyanoferrate, pentacyanonitrosylferrate, hexacyanocobaltate, hexacyanochromate, or a neutral organometallic species including but not limited to ferrocene.

An electrolyte additive may include a surfactant such as a cationic surfactant including but not limited to octenidine dihydrochloride, cetrimonium bromide, cetylpyridinium chloride, benzalkonium chloride, benzethonium chloride, distearyl dimethyl ammonium chloride, dioctadecyldimethylammonium bromide, an anionic surfactant including but not limited ammonium lauryl sulfate, sodium dodecyl sulfate, sodium myreth sulfate, dioctyl sulfosuccinate, perfluorooctane sulfonate, perfluorobutanesulfonic acid, sodium dodecylbenzenesulfonate, or a zwitterionic surfactant including but not limited to sultaines (3-[(3-Cholamidopropyl)dimethylammonio]-1-propanesulfonate) and cocamidopropyl hydroxysultaine, betaines such as cocamidopropylbetaines and phosphatidylethanolamine, phosphatidylchloride and sphingomyelins An electrolyte additive may include a reducing agent such as an inorganic reducing agent including but not limited to sodium thiosulfate, sodium dithionite, sodium hydrosulfine, sodium borohydride, sodium cyanoborohydride, sodium triacetoxyborohydride, potassium borohydride, nickel borohydride, potassium tetrahydroborate, chromium (low valent), indium (low valent), titanium (low valent), iron, phosphorous acid, hydrogen, hydrazine and strontium or an organic reducing agent including but not limited to formic acid, acetic acid, oxalic acid, malic acid, citric acid, 3-mercaptopropionic acid, triphenylphosphite, triphenylphosphine, trimethyl phosphine, triethylphosphine, tributylstannane, tetramethyldisiloxane, sodium hydroxymethanesulfinate, polymethylhydrosiloxane and formaldehayde.

An electrolyte additive may also include an oxidizing agent such as an inorganic oxidizing agent including but not limited to iron(III), oxygen, oxone, ozone, osmium tetroxide, manganese (IV) oxide, iodine, hydrogen peroxide, chromium trioxide, chlorine, bleach, ammonium peroxydisulfate, ammonium cerium (IV) nitrate, sodium ferricyanide, potassium permanganate, potassium peroxydisulfate, selium oxide, sodium bromate, sodium nitrite, sulfur, or an organic oxidizing agent including but not limited to quinone, benzoquinone, benzaldehyde, benzyl peroxide, N-Bromosuccinimide, ter-butyl hydroperoxide, tert-butyl nitrite, tert-butyl hypochlorite, dimethylsulfoxide, peracetic acid, pyridine N-oxide. FIG. 17-FIG. 30 illustrate seven pairs of charts corresponding to Example A3-Example A9, each pair of charts including an electrodes potential chart and a full cell voltage chart.

EXAMPLE A1 Control with No Additives

An electrochemical cell was prepared containing two electrodes and an electrolyte. The first electrode contained a first TMCCC material having a high electrochemical potential, and the second electrode contained a second TMCCC material having a low electrochemical potential. For all additive examples (A1-A9), the first TMCCC material found in the first electrode had an approximate composition of Na1.7Fe0.3Mn0.7[Fe(CN)6], and the second TMCCC material found in the second electrode had an approximate composition of Na2Mn2(CN)6. The electrolyte contained 1 M sodium perchlorate in a solution of 75% sulfolane, 20% acetonitrile, and 5% water. The second electrode contained a larger quantity of electrochemically active material than did the first electrode. By applying constant positive or negative currents to the first electrode, the cell was repeatedly charged to a high voltage, and then discharged to a low voltage. Because the second electrode contained an excess of TMCCC material, it was not fully charged by the time the first electrode reached its full charge state. Then, during discharge of the cell, the second electrode was over-discharged because it had never reached its full charge state during the preceding charging of the cell.

EXAMPLE A2 Control with No Additives

An electrochemical cell was prepared containing two electrodes and an electrolyte. The first electrode contained a first TMCCC material having a high electrochemical potential, and the second electrode contained a second TMCCC material having a low electrochemical potential. The electrolyte contained 1 M sodium perchlorate in a solution of 75% sulfolane, 20% acetonitrile, and 5% water. The second electrode contained a smaller quantity of electrochemically active material than did the first electrode. By applying constant positive or negative currents to the first electrode, the cell was repeatedly charged to a high voltage, and then discharged to a low voltage. Because the first electrode contained an excess of TMCCC material, it was not fully charged by the time the second electrode reached its full charge state.

EXAMPLE A3 Cu(NO$_3$)$_2$ Additive

Figure 17:
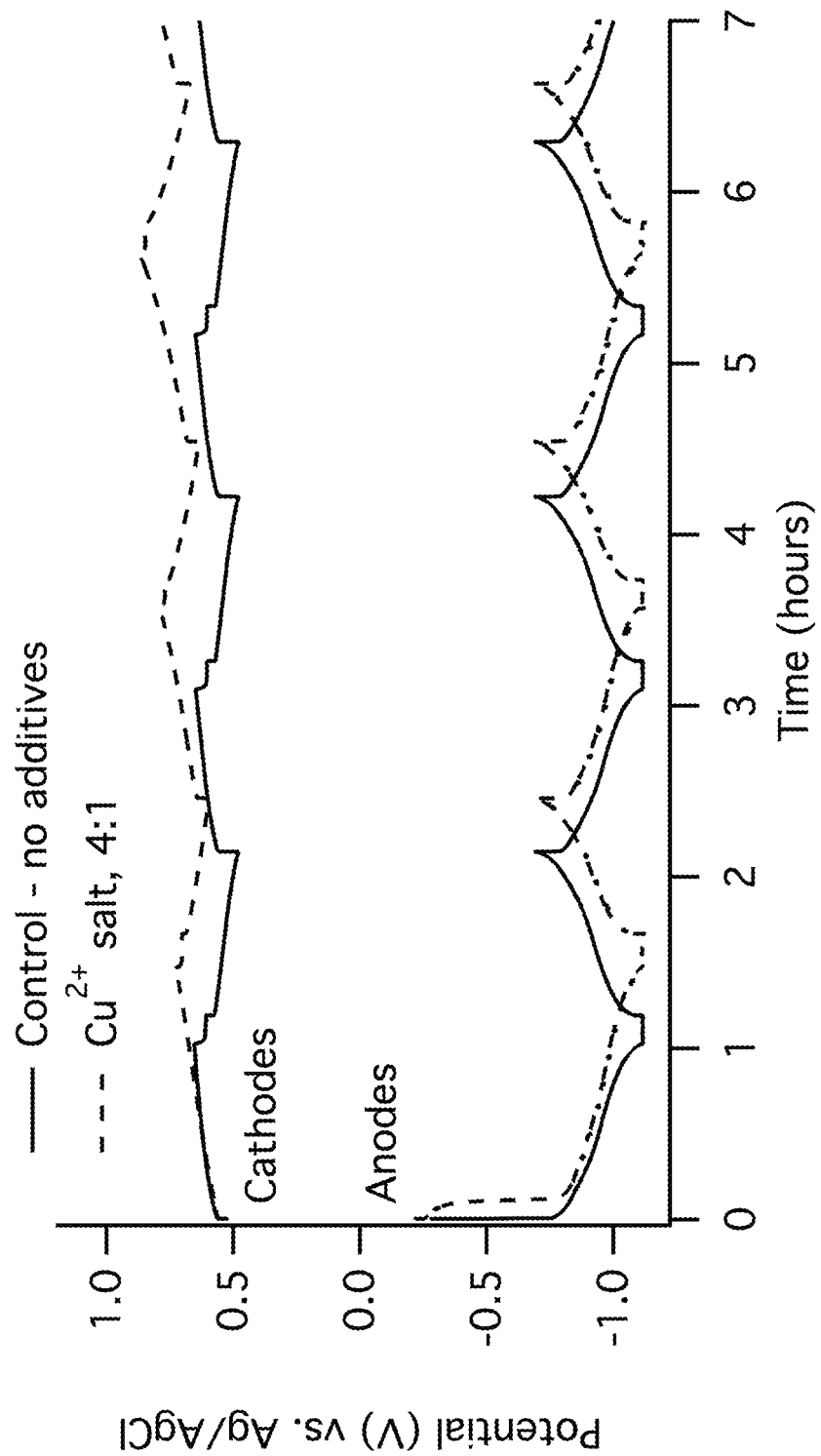
FIG. 17-FIG. 30 illustrate seven pairs of charts corresponding to Example A3-Example A9, each pair of charts including an electrodes potential chart and a full cell voltage chart.
Figure 18:
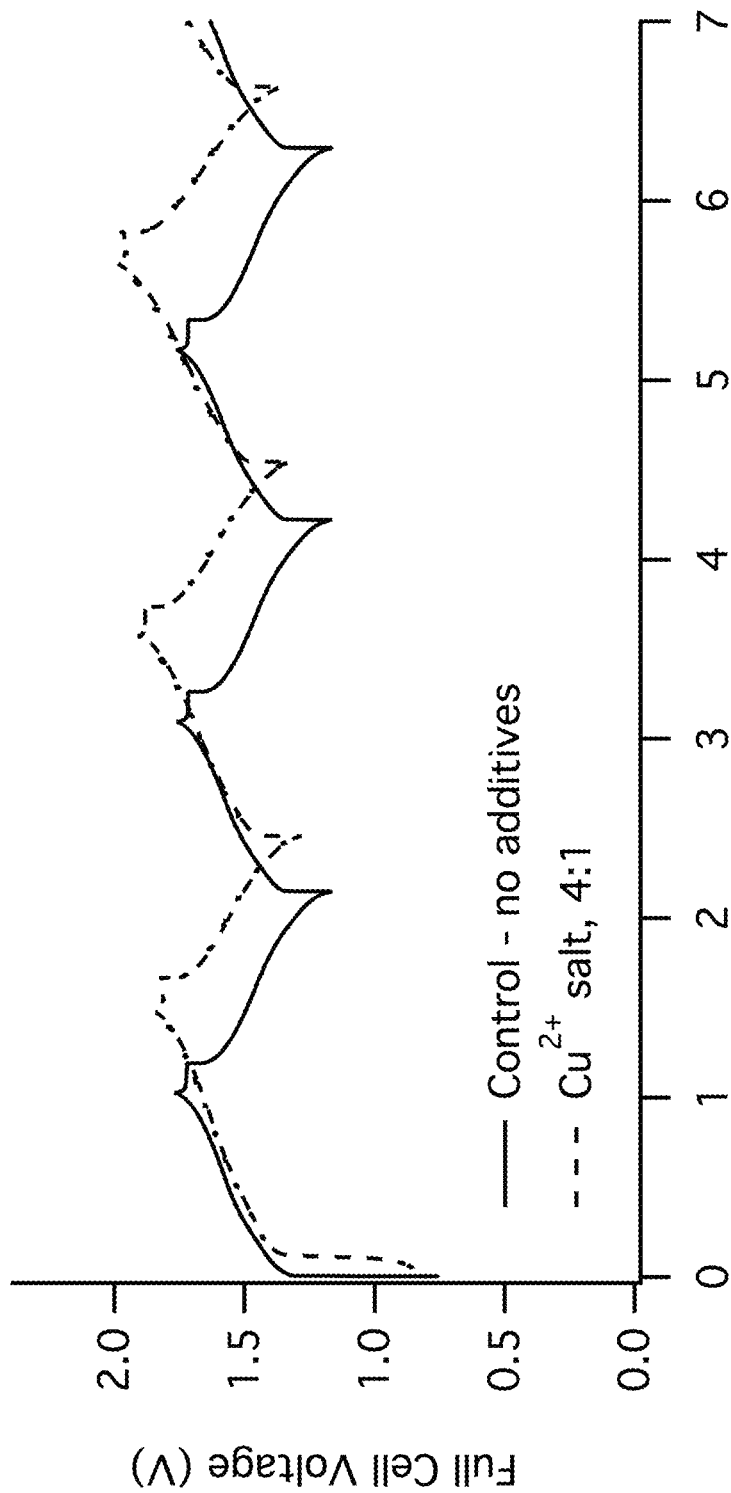

An electrochemical cell was prepared containing two electrodes and an electrolyte. The first electrode contained a first TMCCC material having a high electrochemical potential, and the second electrode contained a second TMCCC material having a low electrochemical potential. The electrolyte contained 1 M sodium perchlorate and a Cu(NO$_3$)$_2$ additive in a 4:1 molar ratio with respect to the second TMCCC material, in a solution of 75% sulfolane, 20% acetonitrile, and 5% water. The second electrode contained a smaller quantity of electrochemically active material than did the first electrode. By applying constant positive or negative currents to the first electrode, the cell was repeatedly charged to a high voltage, and then discharged to a low voltage. Reductive electroplating of the dissolved Cu2+ electrolyte additive to form metallic copper on the surface of the second electrode increased the electrochemical charge capacity of that electrode, which allowed the first electrode to be charged to a higher potential than as seen in Example A2. As a result, the voltage of the cell was increased, thereby increasing the energy of the cell. During subsequent charge-discharge cycling, the copper on the surface of the second electrode catalyzed the decomposition of water in the electrolyte, further increasing the effective charge capacity of the second electrode. This allowed the first electrode to be charged to higher voltages during successive charge-discharge cycles, resulting in further increases to the cell energy as charge-discharge cycling continued. FIG. 17-FIG. 18 illustrate a first pair of charts for Example A3 comparing a control (no additive) to a Cu(NO$_3$)$_2$ additive, FIG. 17 illustrates an electrode potentials chart for Example A3, and FIG. 18 illustrates a cell voltage chart for Example A3.

EXAMPLE A4 Benzoquinone Additive

Figure 19:
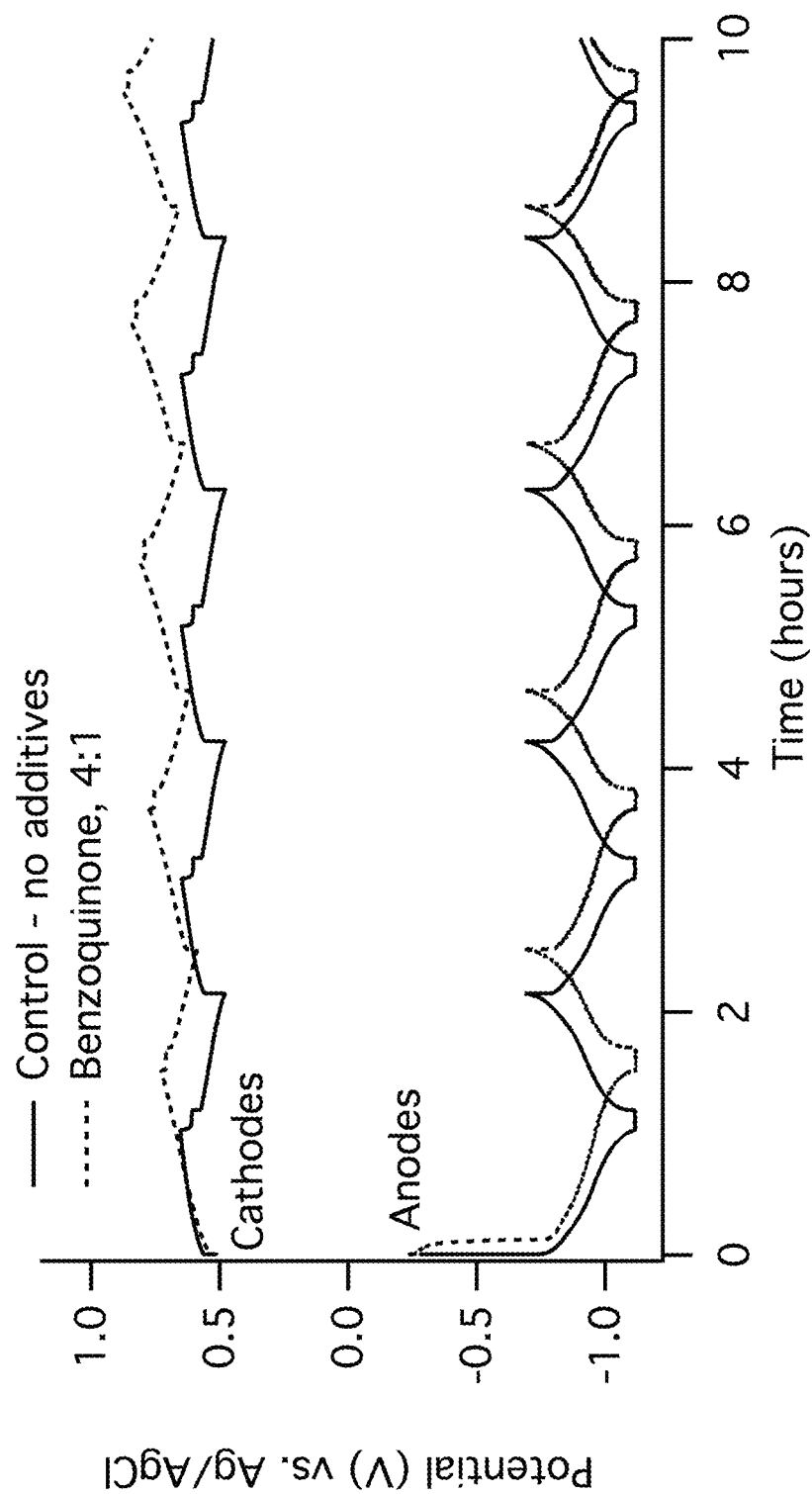
Figure 20:
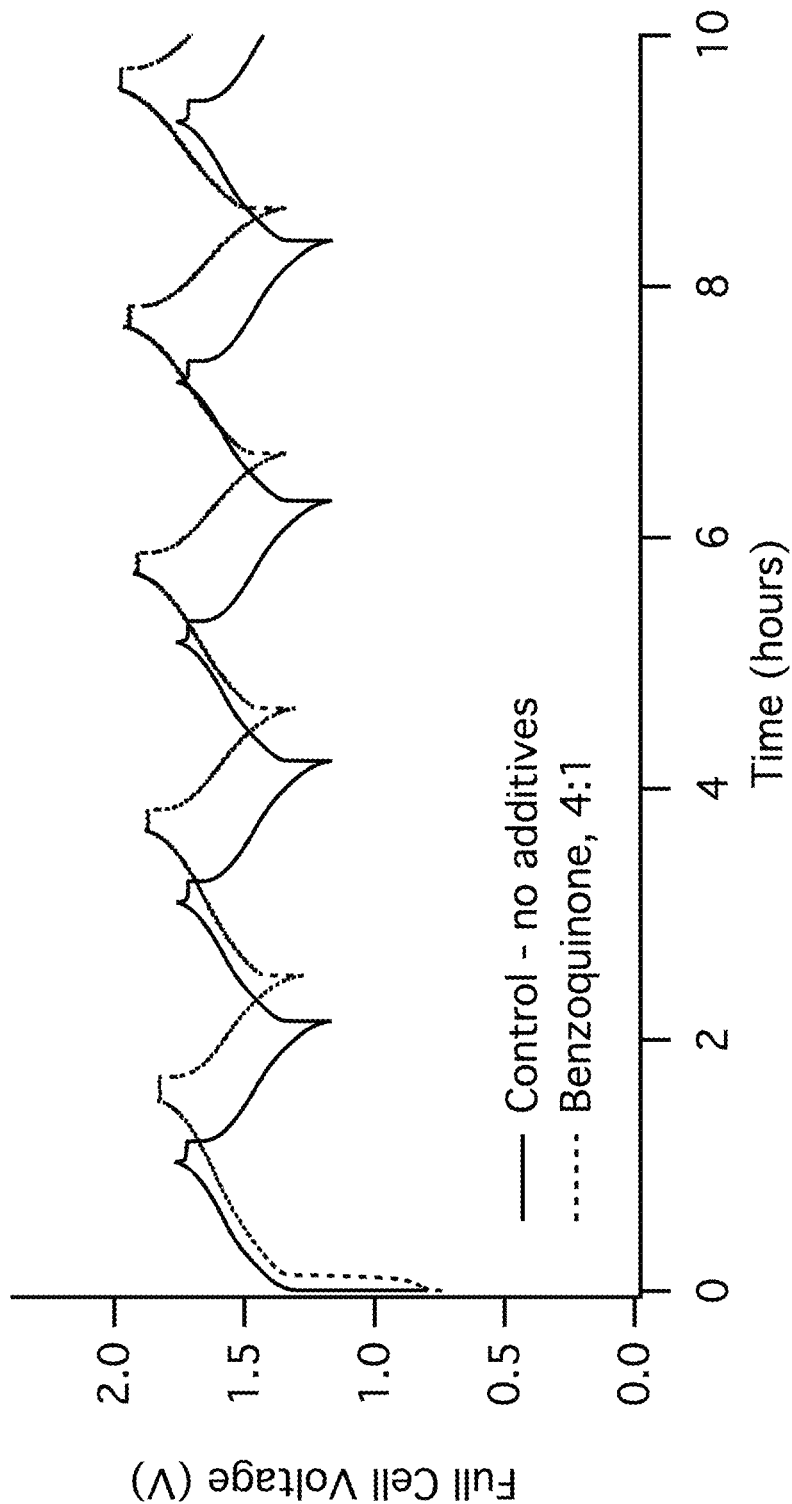

An electrochemical cell was prepared containing two electrodes and an electrolyte. The first electrode contained a first TMCCC material having a high electrochemical potential, and the second electrode contained a second TMCCC material having a low electrochemical potential. The electrolyte contained 1 M sodium perchlorate and a benzoquinone additive in a 4:1 molar ratio with respect to the second TMCCC material, in a solution of 75% sulfolane, 20% acetonitrile, and 5% water. The second electrode contained a smaller quantity of electrochemically active material than did the first electrode. By applying constant positive or negative currents to the first electrode, the cell was repeatedly charged to a high voltage, and then discharged to a low voltage. Reduction of the dissolved benzoquinone electrolyte additive by the second electrode to form hydroquinone increased the electrochemical charge capacity of that electrode, which allowed the first electrode to be charged to a higher potential than as seen in Example A2. As a result, the voltage of the cell was increased, thereby increasing the energy of the cell. During subsequent charge-discharge cycling, the second electrode continued to reduce the remaining benzoquinone, further increasing the effective charge capacity of the second electrode. This allowed the first electrode to be charged to higher voltages during successive charge-discharge cycles, resulting in further increases to the cell energy as charge-discharge cycling continued. FIG. 19-FIG. 20 illustrate a second pair of charts for Example A4 comparing a control (no additive) to a Benzoquinone additive, FIG. 19 illustrates an electrode potentials chart for Example A4, and FIG. 20 illustrates a cell voltage chart for Example A4.

EXAMPLE A5 Hydroquinone Additive

Figure 21:
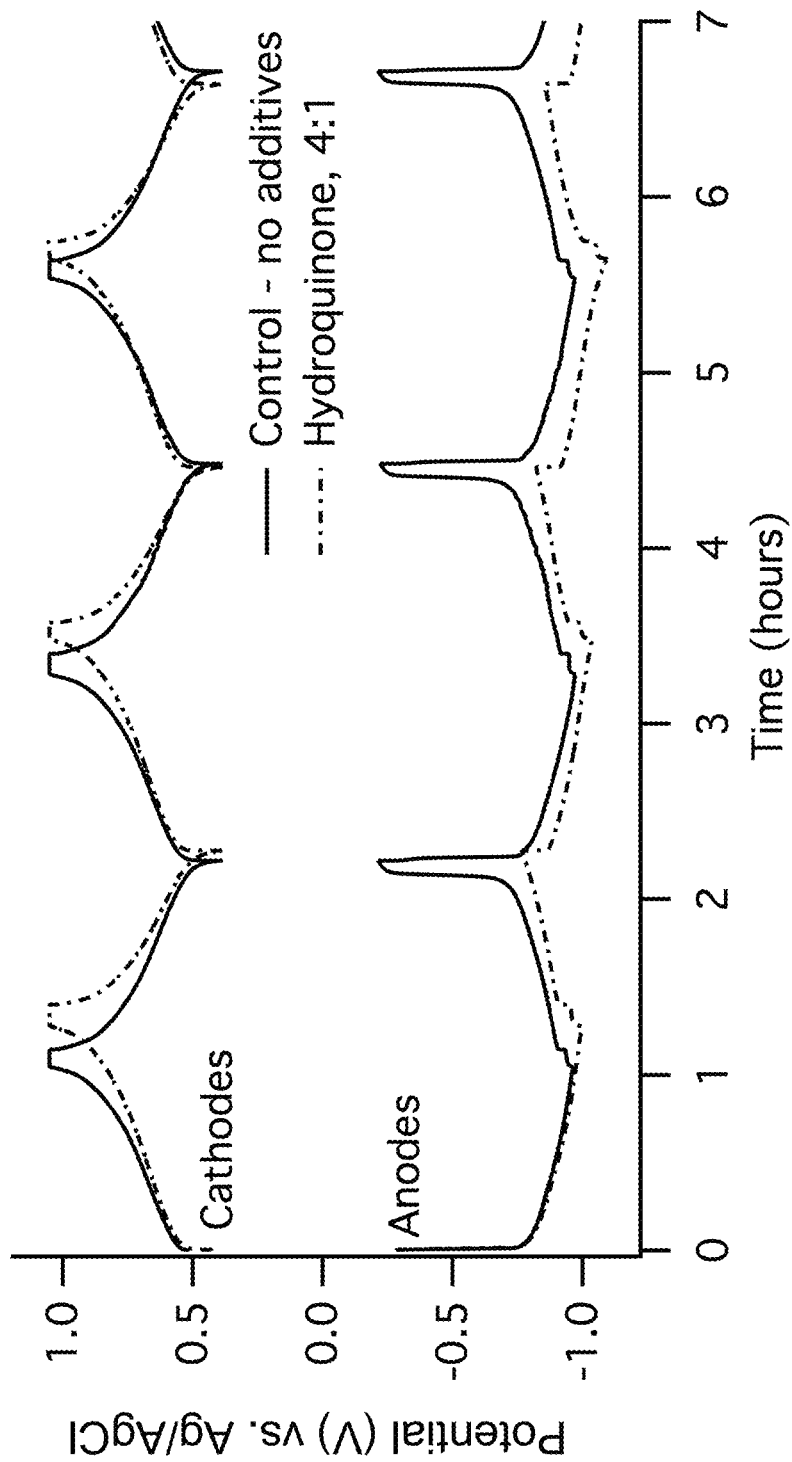
Figure 22:
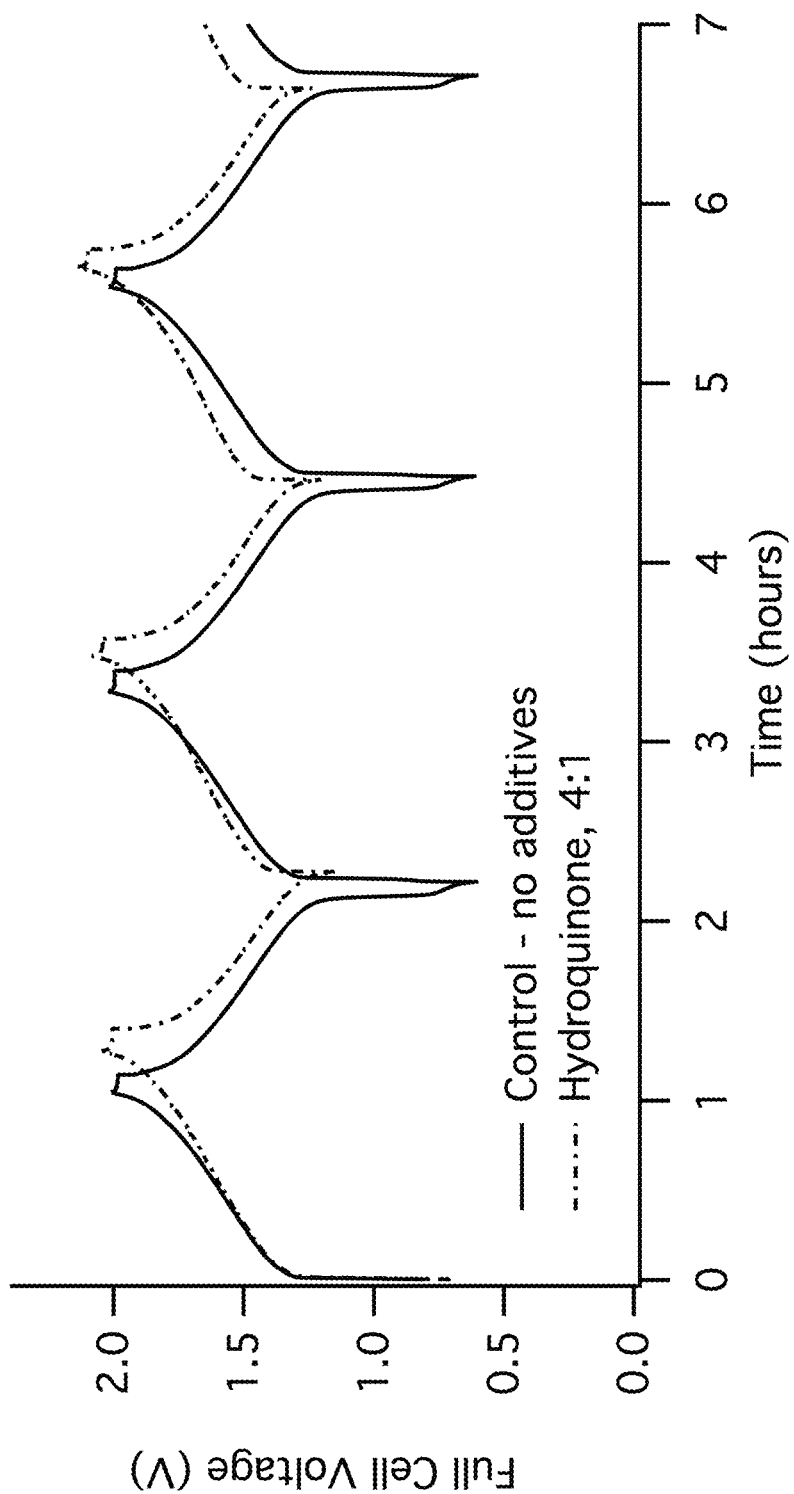

An electrochemical cell was prepared containing two electrodes and an electrolyte. The first electrode contained a first TMCCC material having a high electrochemical potential, and the second electrode contained a second TMCCC material having a low electrochemical potential. The electrolyte contained 1 M sodium perchlorate and a hydroquinone additive in a 4:1 molar ratio with respect to the first TMCCC material, in a solution of 75% sulfolane, 20% acetonitrile, and 5% water. The second electrode contained a larger quantity of electrochemically active material than did the first electrode. By applying constant positive or negative currents to the first electrode, the cell was repeatedly charged to a high voltage, and then discharged to a low voltage. Oxidation of the dissolved hydroquinone electrolyte additive by the first electrode to form benzoquinone increased the electrochemical charge capacity of that electrode, which allowed the second electrode to be charged to a lower potential than as seen in Example A1. As a result, the voltage of the cell was increased, thereby increasing the energy of the cell. During subsequent charge-discharge cycling, the first electrode continued to oxidize the remaining hydroquinone, further increasing the effective charge capacity of the first electrode. This allowed the second electrode to be charged to lower voltages during successive charge-discharge cycles, resulting in further increases to the cell energy as charge-discharge cycling continued. FIG. 21-FIG. 22 illustrate a third pair of charts for Example A5 comparing a control (no additive) to a Hydroquinone additive, FIG. 21 illustrates an electrode potentials chart for Example A5, and FIG. 22 illustrates a cell voltage chart for Example A5.

EXAMPLE A6 Ferrocene Additive

Figure 23:
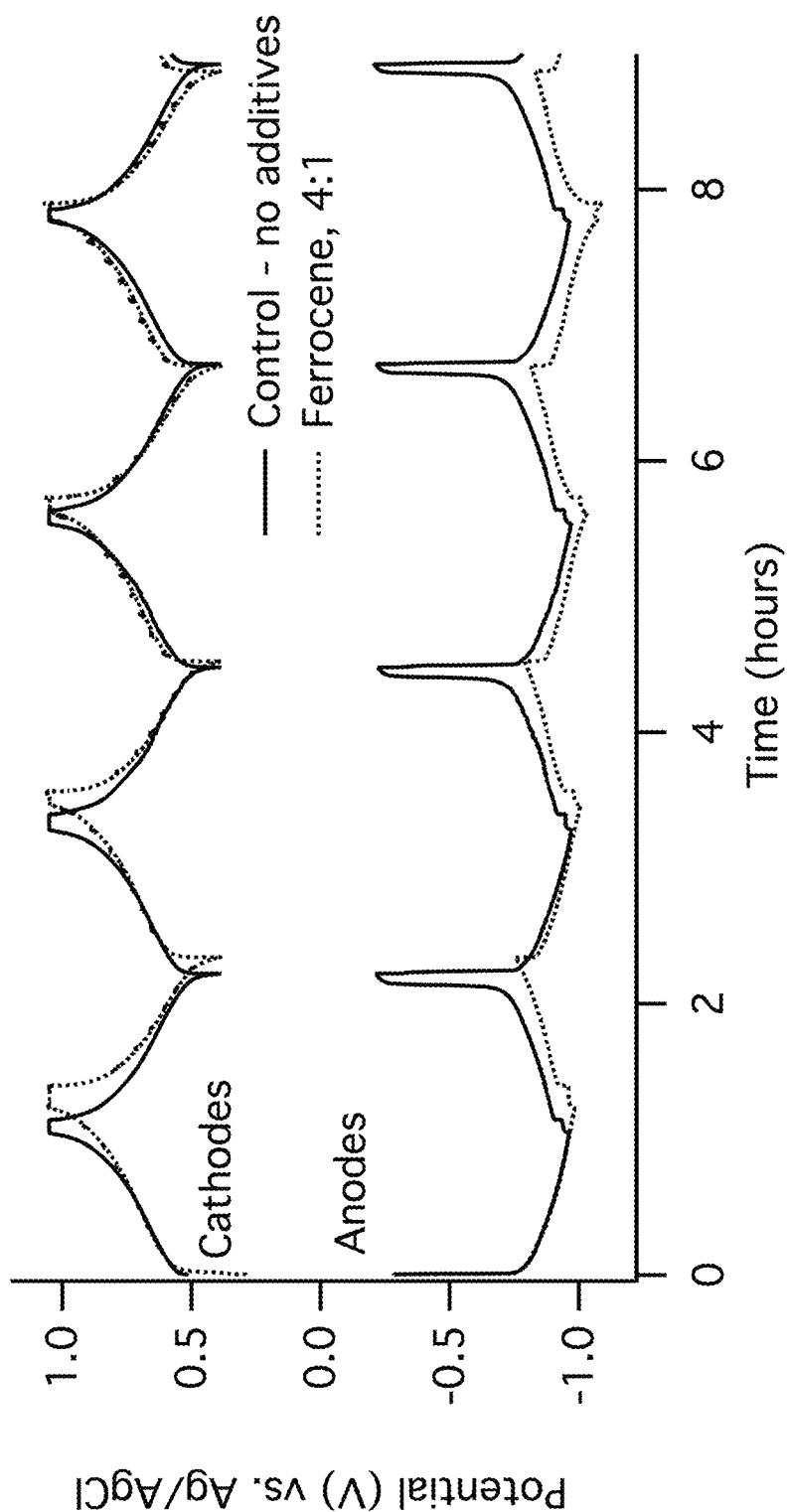
Figure 24:
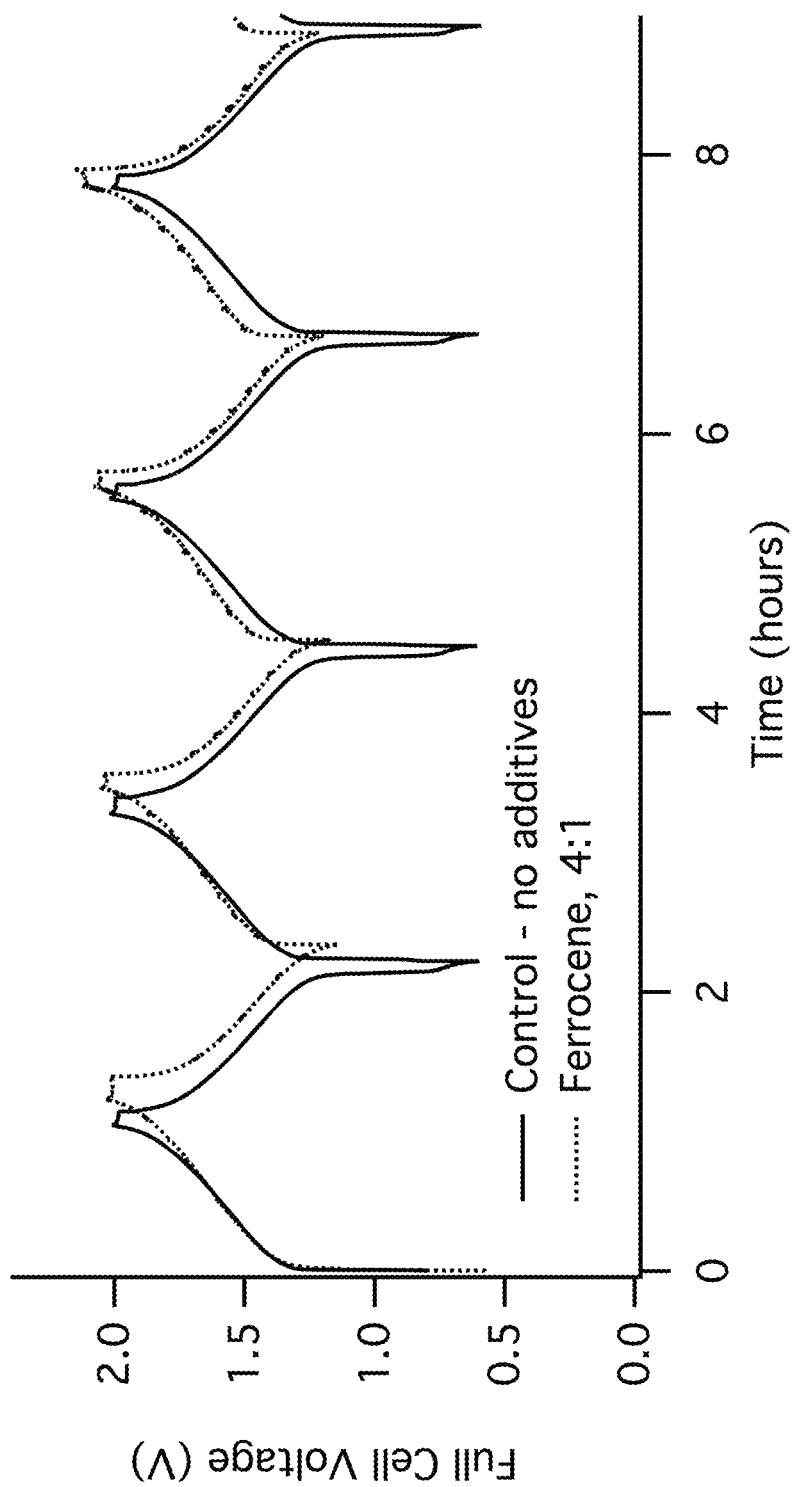

An electrochemical cell was prepared containing two electrodes and an electrolyte. The first electrode contained a first TMCCC material having a high electrochemical potential, and the second electrode contained a second TMCCC material having a low electrochemical potential. The electrolyte contained 1 M sodium perchlorate and a ferrocene additive in a 4:1 molar ratio with respect to the first TMCCC material, in a solution of 75% sulfolane, 20% acetonitrile, and 5% water. The second electrode contained a larger quantity of electrochemically active material than did the first electrode. By applying constant positive or negative currents to the first electrode, the cell was repeatedly charged to a high voltage, and then discharged to a low voltage. Oxidation of the dissolved ferrocene electrolyte additive by the first electrode to form ferrocenium increased the electrochemical charge capacity of that electrode, which allowed the second electrode to be charged to a lower potential than as seen in Example A1. As a result, the voltage of the cell was increased, thereby increasing the energy of the cell. During subsequent charge-discharge cycling, the first electrode continued to oxidize the remaining ferrocene, further increasing the effective charge capacity of the first electrode. This allowed the second electrode to be charged to lower voltages during successive charge-discharge cycles, resulting in further increases to the cell energy as charge-discharge cycling continued. FIG. 23-FIG. 24 illustrate a fourth pair of charts for Example A6 comparing a control (no additive) to a Ferrocene additive, FIG. 23 illustrates an electrode potentials chart for Example A6, and FIG. 24 illustrates a cell voltage chart for Example A6.

EXAMPLE A7 $Cu(NO_3)_2$ Additive

Figure 25:
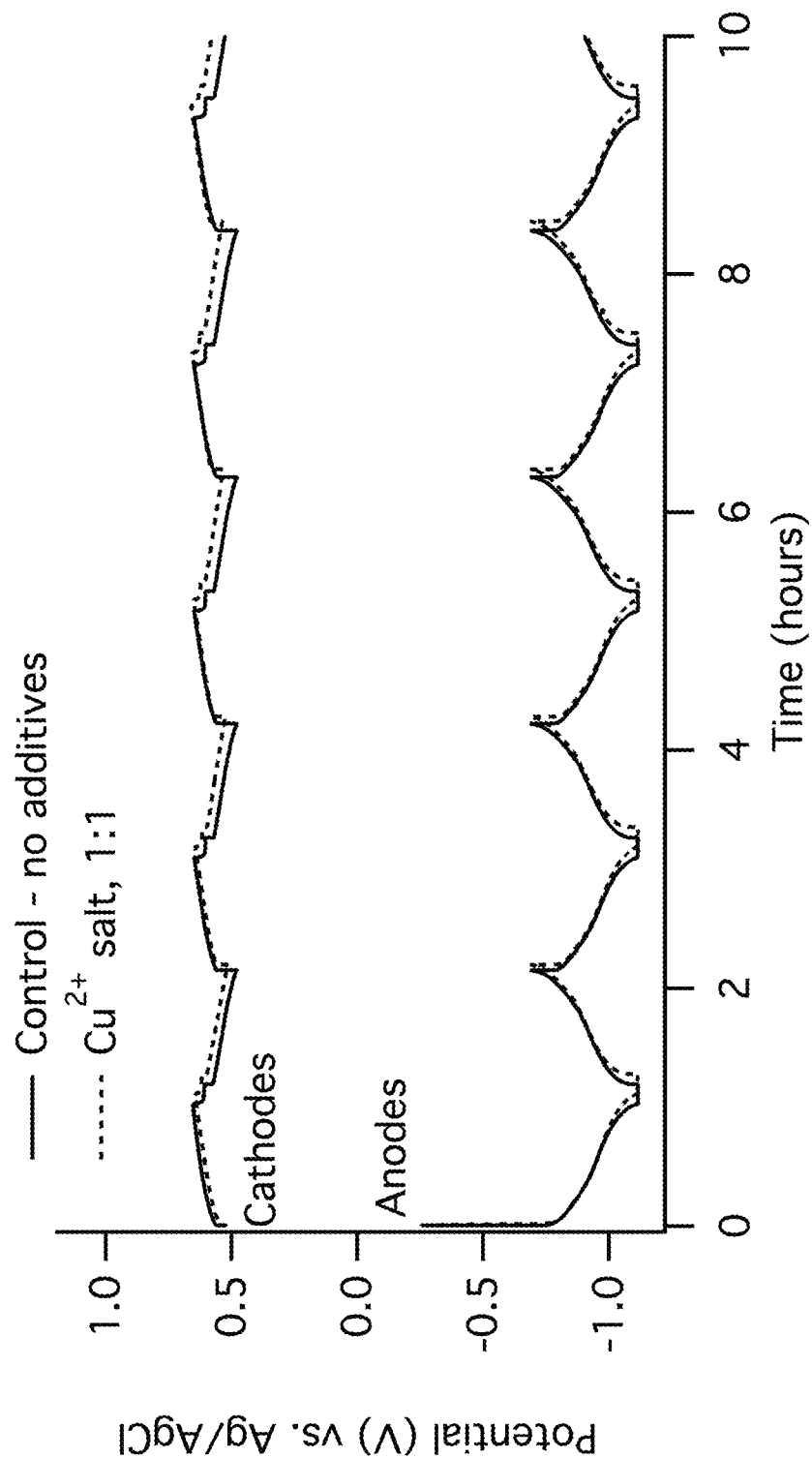
Figure 26:
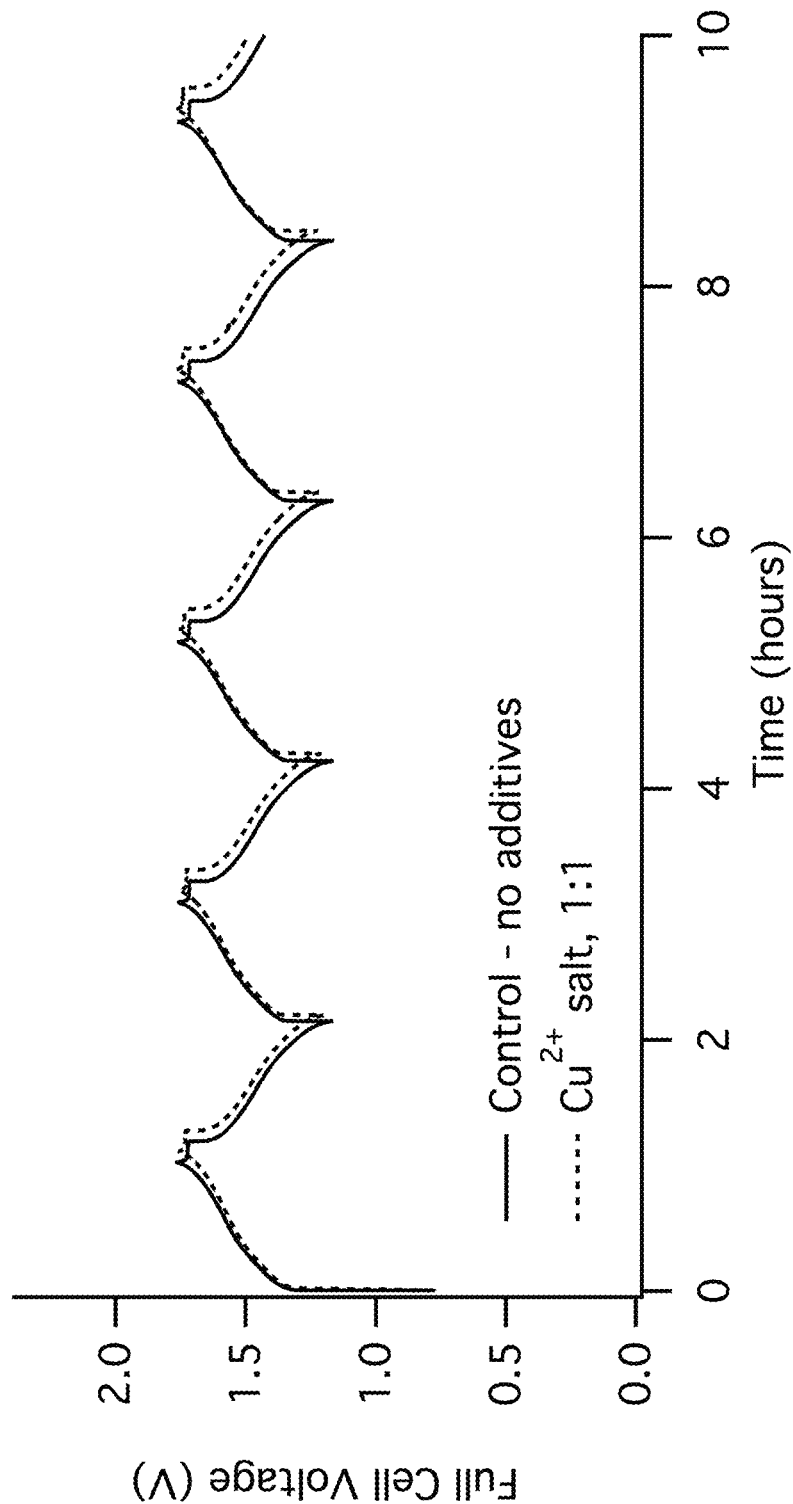

An electrochemical cell was prepared containing two electrodes and an electrolyte. The first electrode contained a first TMCCC material having a high electrochemical potential, and the second electrode contained a second TMCCC material having a low electrochemical potential. The electrolyte contained 1 M sodium perchlorate and a $Cu(NO_3)_2$ additive in a 1:1 molar ratio with respect to the second TMCCC material, in a solution of 75% sulfolane, 20% acetonitrile, and 5% water. The second electrode contained a smaller quantity of electrochemically active material than did the first electrode. By applying constant positive or negative currents to the first electrode, the cell was repeatedly charged to a high voltage, and then discharged to a low voltage. Reductive electroplating of the dissolved $Cu^{2+}$ electrolyte additive to form metallic copper on the surface of the second electrode increased the electrochemical charge capacity of that electrode, which allowed the first electrode to be charged to a higher potential than as seen in Example A2. As a result, the voltage of the cell was increased, thereby increasing the energy of the cell. During subsequent charge-discharge cycling, the copper on the surface of the second electrode catalyzed the decomposition of water in the electrolyte, further increasing the effective charge capacity of the second electrode. This allowed the first electrode to be charged to higher voltages during successive charge-discharge cycles, resulting in further increases to the cell energy as charge-discharge cycling continued. FIG. 25-FIG. 26 illustrate a fifth pair of charts for Example A7 comparing a control (no additive) to a $Cu(NO_3)_2$ additive, FIG. 25 illustrates an electrode potentials chart for Example A7, and FIG. 26 illustrates a cell voltage chart for Example A7.

EXAMPLE A8 Oxalic Acid Additive

Figure 27:
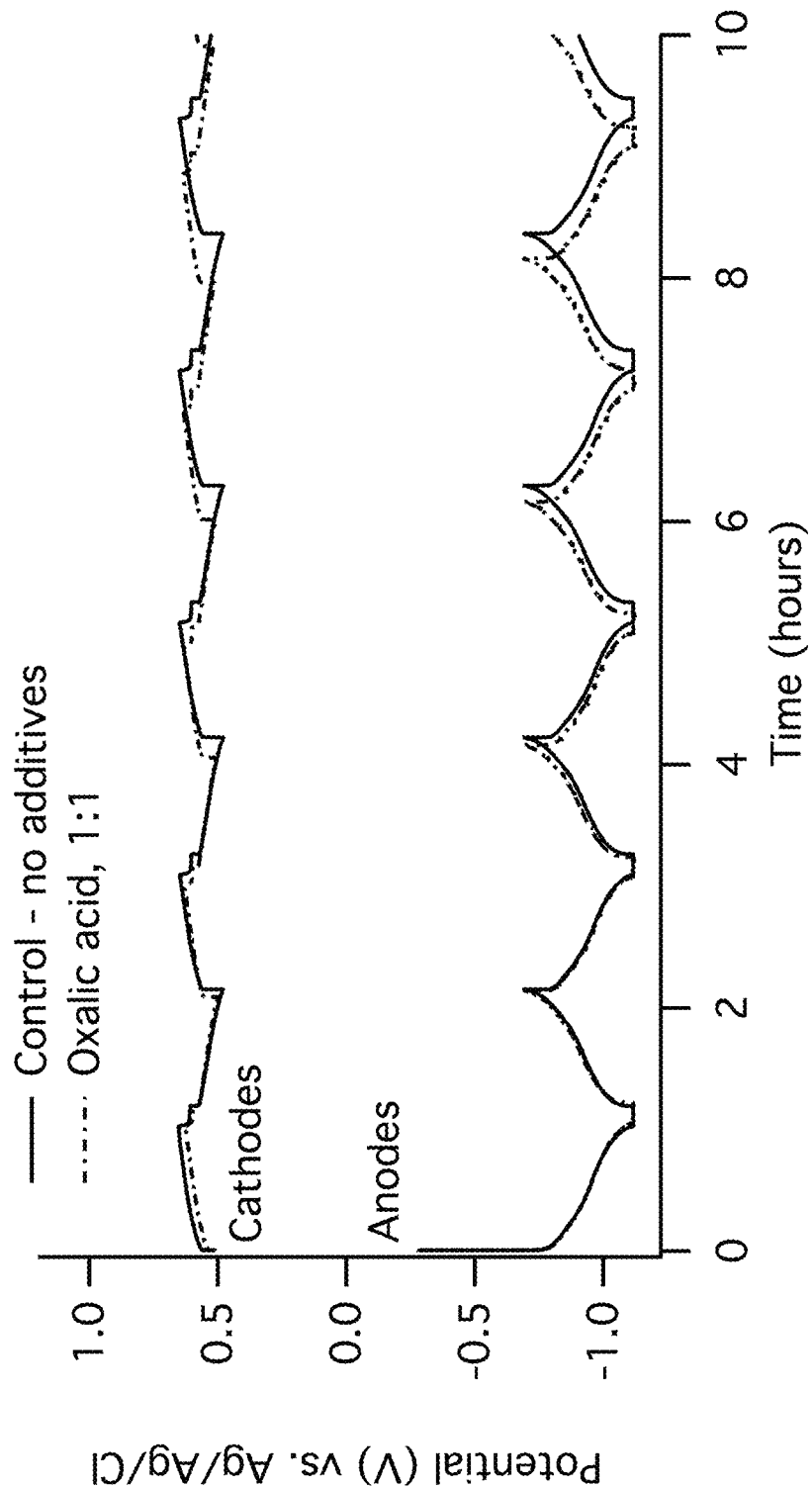
Figure 28:
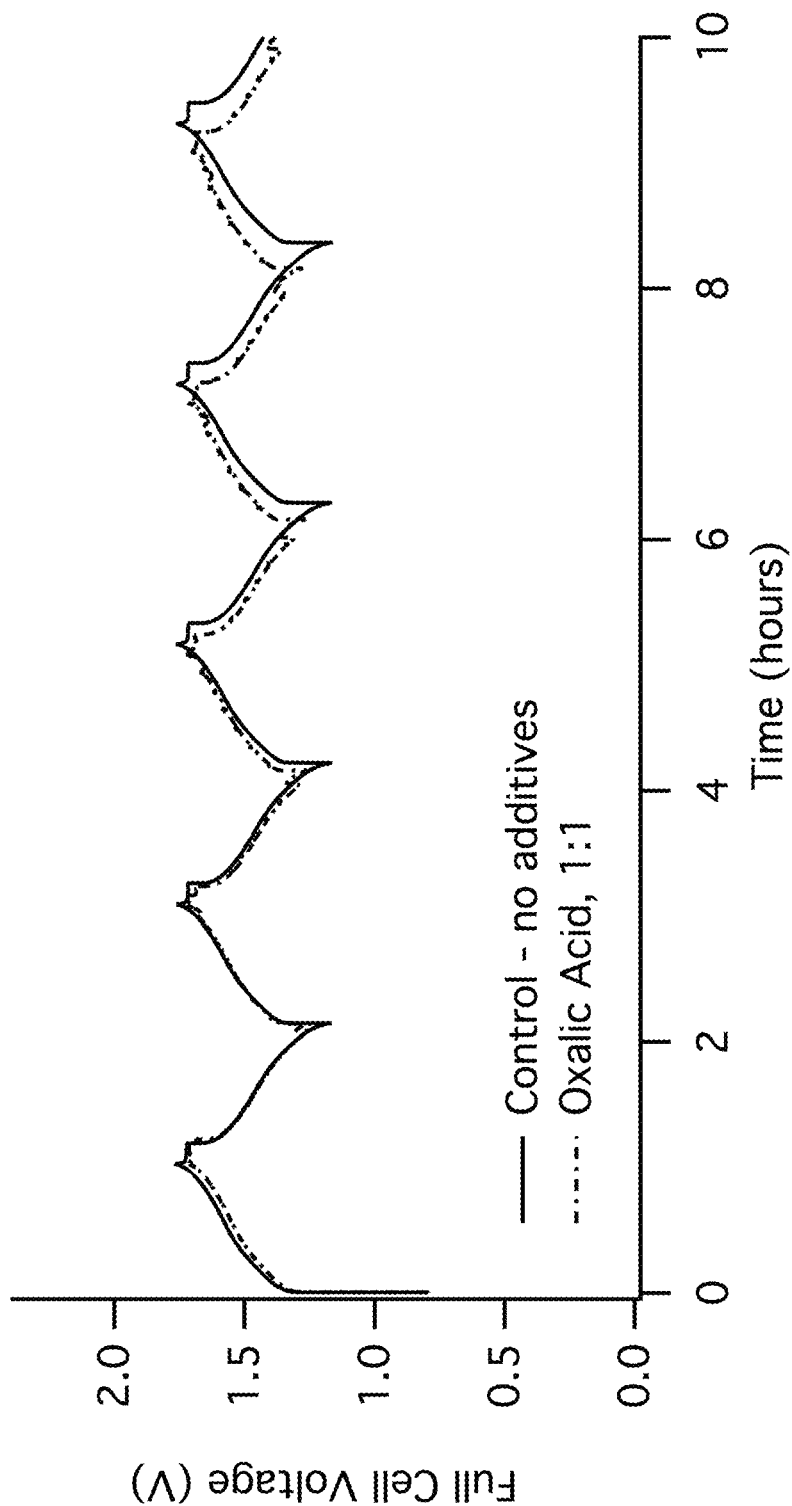

An electrochemical cell was prepared containing two electrodes and an electrolyte. The first electrode contained a first TMCCC material having a high electrochemical potential, and the second electrode contained a second TMCCC material having a low electrochemical potential. The electrolyte contained 1 M sodium perchlorate and an oxalic acid additive in a 1:1 molar ratio with respect to the second TMCCC material, in a solution of 75% sulfolane, 20% acetonitrile, and 5% water. The second electrode contained a smaller quantity of electrochemically active material than did the first electrode. By applying constant positive or negative currents to the first electrode, the cell was repeatedly charged to a high voltage, and then discharged to a low voltage. An electrochemical reaction of the dissolved oxalic acid electrolyte additive with the second electrode increased the electrochemical charge capacity of that electrode, which allowed the first electrode to be charged to a higher potential than as seen in Example A2. As a result, the voltage of the cell was increased, thereby increasing the energy of the cell. During subsequent charge-discharge cycling, the copper on the surface of the second electrode catalyzed the decomposition of water in the electrolyte, further increasing the effective charge capacity of the second electrode. This allowed the first electrode to be charged to higher voltages during successive charge-discharge cycles, resulting in further increases to the cell energy as charge-discharge cycling continued. FIG. 27-FIG. 28 illustrate a sixth pair of charts for Example A8 comparing a control (no additive) to an Oxalic acid additive, FIG. 27 illustrates an electrode potentials chart for Example A8, and FIG. 28 illustrates a cell voltage chart for Example A8.

EXAMPLE A9 Pyrrole Additive

Figure 29:
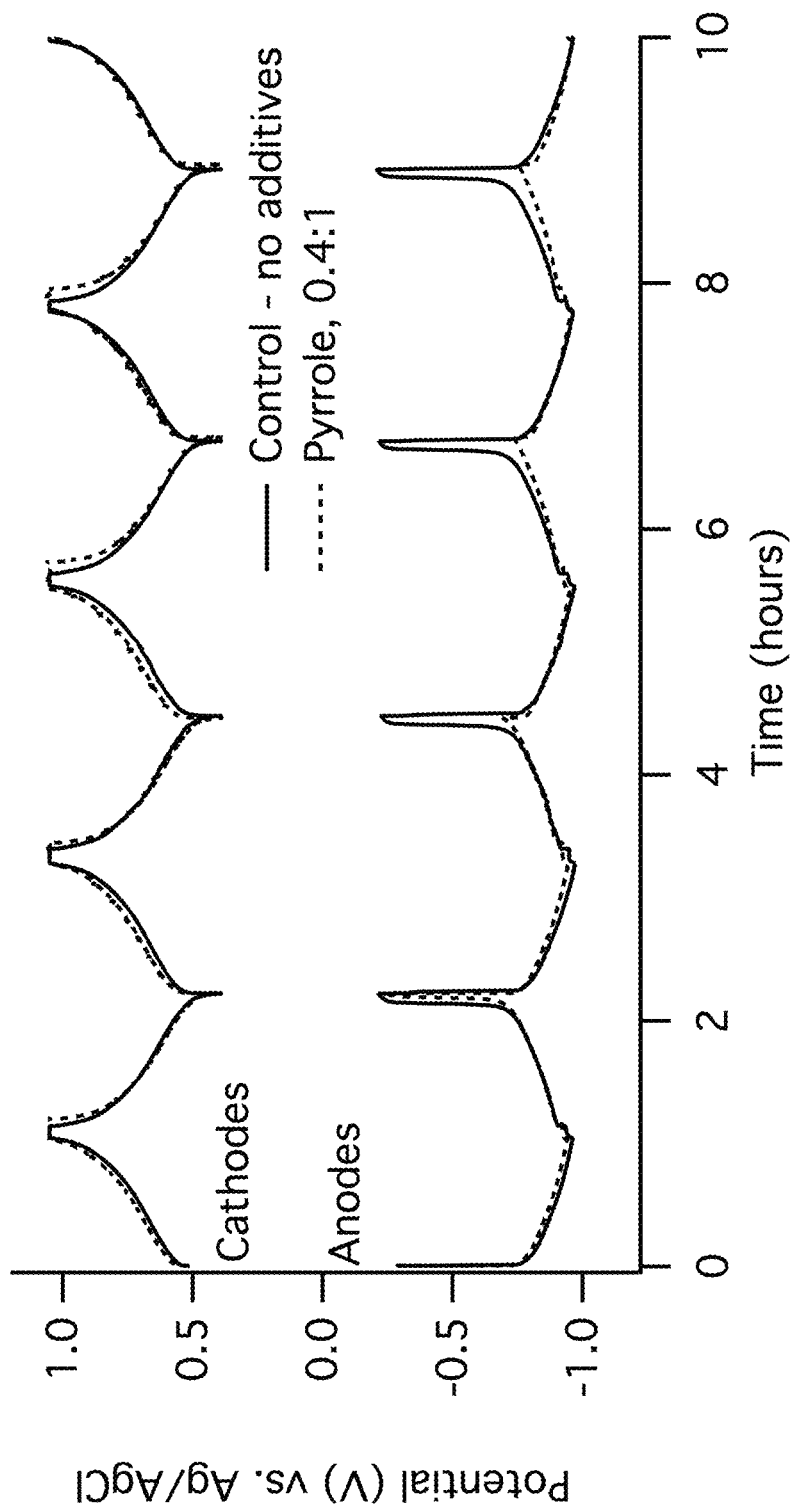
Figure 30:
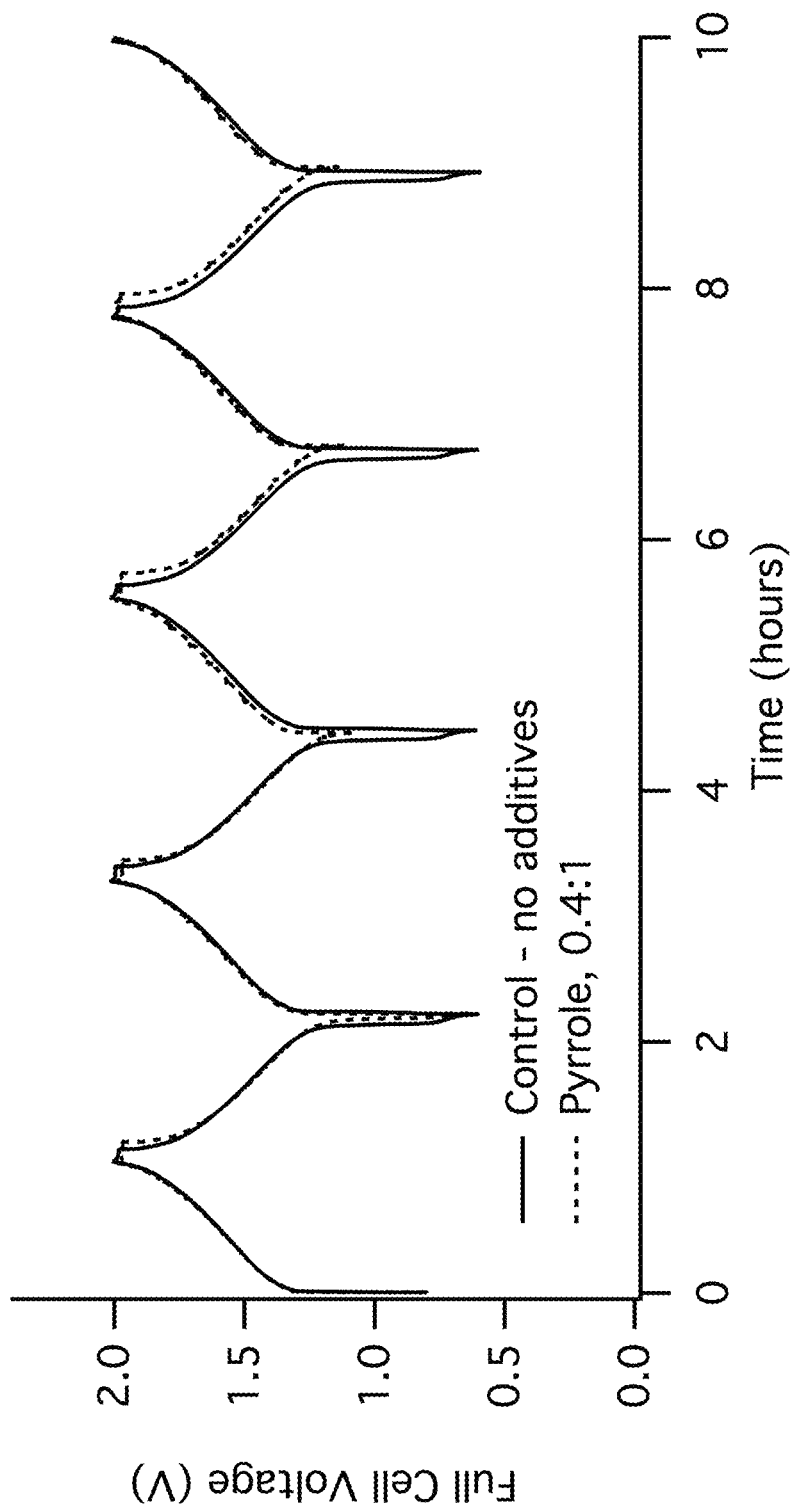

An electrochemical cell was prepared containing two electrodes and an electrolyte. The first electrode contained a first TMCCC material having a high electrochemical potential, and the second electrode contained a second TMCCC material having a low electrochemical potential. The electrolyte contained 1 M sodium perchlorate and a pyrrole additive in a 0.4:1 molar ratio with respect to the first TMCCC material, in a solution of 75% sulfolane, 20% acetonitrile, and 5% water. The second electrode contained a larger quantity of electrochemically active material than did the first electrode. By applying constant positive or negative currents to the first electrode, the cell was repeatedly charged to a high voltage, and then discharged to a low voltage. Oxidative polymerization of the pyrrole electrolyte additive at the surface of the first electrode increased the electrochemical charge capacity of that electrode, which allowed the first electrode to be charged to a higher potential than as seen in Example A2. As a result, the voltage of the cell was increased, thereby increasing the energy of the cell. During subsequent charge-discharge cycling, the copper on the surface of the second electrode catalyzed the decomposition of water in the electrolyte, further increasing the effective charge capacity of the second electrode. This allowed the first electrode to be charged to higher voltages during successive charge-discharge cycles, resulting in further increases to the cell energy as charge-discharge cycling continued. FIG. 29-FIG. 30 illustrate a seventh pair of charts for Example A9 comparing a control (no additive) to a Pyrrole additive, FIG. 29 illustrates an electrode potentials chart for Example A9, and FIG. 30 illustrates a cell voltage chart for Example A9.

As demonstrated in Examples A1-A9, more particularly in Examples A3-A9, one or more side-reactions exist with an additive-containing electrolyte and one or more electrodes coupled to the electrolyte. These side-reactions may decrease coulombic efficiency of charging an electrode (e.g., degrade it) and do not appear in these examples to completely suspend charging for a duration of the side-reaction. It may be the case that some embodiments include an ability to suspend charging for some period, such as a case where the side-reaction occurs with much greater efficiency than the actual charging of the electrode. The efficiency of the side-reaction may be increased or decreased as desired by increasing or decreasing a concentration of the additive in the electrolyte.

As noted herein, these side-reactions may be reversible or irreversible. Further, these additives may part of an electrode or electrode assembly. To be reversible, it may be necessary for the additive to dissolve or disassociate into the electrolyte, diffuse across the cell, and react with another electrode. In this fashion, it may be possible in some embodiments to reset to its initial redox state after consumption during the side-reaction.

These side-reactions may include chemical and electrochemical reactions. The additive could undergo a chemical reaction with one of the electrodes. For example, the additive could bond to the surface of the electrode, and then act as a catalyst for reactions with the electrolyte that decrease the charging efficiency.

The additive could also, or in lieu of, undergo an electrochemical reaction with one of the electrodes. For example, an embodiment may add $Cu^{2+}$ cations to the electrolyte, then the additive may be reduced electrochemically on the surface of an electrode to form copper metal: $Cu^{2+}+2e^-=Cu$.

In the case of an additive that undergoes reversible reactions, it may be more likely that these would be electrochemical. For example, should an embodiment add a ferrocene additive to the electrolyte, it could be stable at the anode, but it may oxidize at the cathode to ferrocinium. That ferrocinium would be stable at the cathode, but it would reduce back to ferrocene at the anode. Then, that newly reduced ferrocene could diffuse back to the cathode and be reoxidized to ferrocinium. This cyclic oxidation and reduction of ferrocene at the two electrodes may then continue for the entire duration of operation of the cell.

In some secondary storage systems, there may be a desire to improve coulombic efficiencies by suppressing undesired side-reactions. In contrast, the embodiments described herein intentionally add further inefficiencies in a manner that is beneficial to the operation of the system. For example, one discovered benefit is that in some embodiments it may be easier to balance inefficiencies of two electrodes when one or more of the inefficiencies are larger.

Regarding a duration of these side-reactions, as long as there is a quantity of unconsumed additive present during charging, the charging efficiency is degraded. In the cases of a reversible side-reaction having sufficient additive to last an entire period of charging, then each charging and discharging cycle may replenish the additive and allow consistent repeatable charging degradation for the entire operational life of the cell. Even in an embodiment that includes a very large quantity of an additive that is consumed by an irreversible reaction, it might take the entire first charge, or even a number of successive charge/discharge cycles to consume the additive fully. The additive may be periodically replenished based upon the quantity, rate of consumption, and operation of a device. In some designs for electrochemical devices, there may be a port through which more electrolyte is added to the cell. An embodiment of the present invention could implement or take advantage of such a feature by "topping off" the cell with more additive by adding an additive, an additive precursor, and/or an electrolyte having such additive or additive precursor into the device through the port.

While the mechanism for degrading charging efficiency described herein has focused primarily on chemical and electrochemical side-reactions, some embodiments may employ something else in addition, or as an alternative. That something else may include, for example, a case in which one electrode might burn off charge by reacting with the electrolyte itself at very high temperature. Or, it might undergo a spontaneous phase change at very high temperature. Thus, heating might be a substitute for an electrolyte additive. Other substitutes may also exist in some embodiments to replace or supplement an additive.

Figure 31:
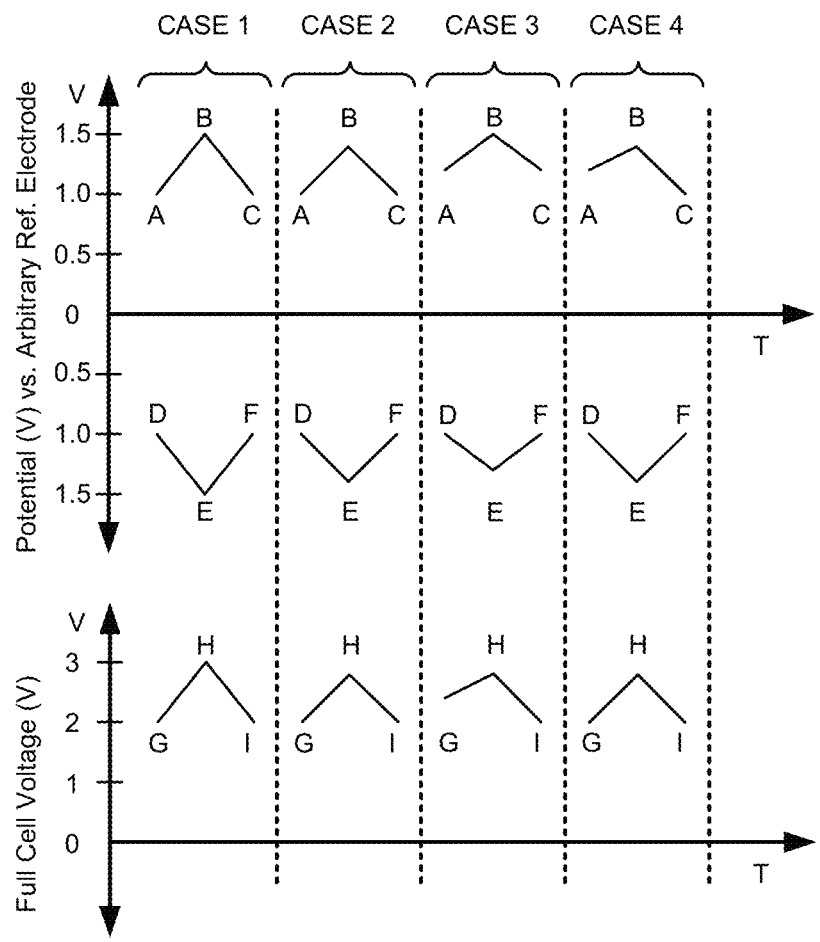
FIG. 31 illustrates a set of charts for charging and discharging under a set of different cases.

FIG. 31 illustrates a set of charts for charging and discharging under a set of different cases. In FIG. 31, there is a representation of Potential (V) vs. Arbitrary Reference Electrode as a function of time (T) and a representation of Full Cell Voltage (V) as a function time (T) for four different cases: case 1, case 2, case 3, and case 4. Each case includes an electrode charge phase (for a cathode and an anode) followed by an electrode discharge phase. The cathode charge phase includes an initial state-of-charge (A) charging to a maximum state-of-charge (B) with the cathode discharge phase including the SOC B discharging to a final state-of-charge (C). The anode charge phase includes an initial state-of-charge (D) charging to a maximum negative state-of-charge (E) with the anode discharge phase including the SOC E discharging to a final state-of-charge (F). The full cell voltage illustrates a full cell voltage at a beginning of the charge phase (G), completion of the charging and beginning of discharging (H), and a completion of the electrode discharge phase (I).

Case 1 represents an ideal case where the cell is able to fully charge and discharge. In case 1, an electrolyte (or other mechanism) does not limit cell charging. Both electrodes can fully charge and discharge between +1.0 V and +1.5 V and −1.0 and −1.0 V and −1.5 V, resulting in a full cell voltage that ranges between 2.0 V and 3.0 V with 100% capacity utilization. Case 2 represents a non-ideal case with both electrodes starting at the same initial state-of-charge and experiencing equal charge efficiencies. For example, an electrolyte stability range is 2.8 V (not 3.0 V as in case 1). When both electrodes start as the same SOC, then they reach maximum SOCs of 80% and the cell experiences 80% capacity utilization. 80% capacity utilization is optimum for this electrolyte with this set of conditions. Case 3 represents a non-ideal case with the electrodes starting at different SOCs and experiencing equal charge efficiencies. The electrolyte stability range is 2.8 V and the cathode starts at a higher SOC (40%) than the anode (0%). With this set of conditions, the anode reaches a maximum SOC of 60% when the cell is fully charged which reduces the capacity utilization to 60%, which is less than optimum for this cell (for example, compare to case 2). Case 4 represents a modification to case 3 by inclusion of an additive to the electrode that decreases a charging efficiency of the cathode by 50%. The boundary and initial conditions of case 4 are the same as case 3 except for the selective modification to the cathode charging efficiency (e.g., such as by use of a side-reaction as described herein). In this case 4, the cathode charges from 40% to 80% SOC while the anode charges from 0% to 80%, producing an optimum capacity utilization for the cell by the use of the additive. Table I below summarizes the specific case states-of-charge (SOC) and cell utilization:

TABLE I

SOC/Utilization by Case No.

| CASE | A (%) | B (%) | C (%) | D (%) | E (%) | F (%) | G (%) | H (%) | I (%) | Capacity Util (%) |
|---|---|---|---|---|---|---|---|---|---|---|
| 1 | 0 | 100 | 0 | 0 | 100 | 100 | 0 | 100 | 0 | 100 |
| 2 | 0 | 80 | 0 | 0 | 80 | 0 | 0 | 80 | 0 | 80 |
| 3 | 40 | 100 | 40 | 0 | 60 | 0 | 0 | 60 | 0 | 60 |
| 4 | 40 | 80 | 0 | 0 | 80 | 0 | 0 | 80 | 0 | 80 |

In case 1, the cell may reach a full charge at 3.0 volts, with the cathode reaching a potential of 1.5 volts at full charge and the anode reaching a potential of −1.5 volts at full charge, with respect to the reference electrode. During a discharge of this cell to 2.0 volts, the cathode may discharge fully to a potential of 1.0 volts and the anode may discharge fully to a potential of −1.0 volts with respect to the reference electrode.

In case 2 with a cell reaching only 2.8 volts, when both electrodes have the same initial state of charge and equal charge efficiencies, then the cathode may charge to 80% state of charge at 1.4 volts with respect to the reference electrode and the anode to 80% state of charge at −1.4 volts with respect to the reference electrode. During a subsequent discharge, the cell may discharge 80% of its theoretical capacity before either of the two electrodes reaches a state of charge of zero.

However, there instead may be an unbalanced charging that limits the discharge capacity of the cell (case 3). In case 3, the cathode may have an initial state of charge of 40% at 1.2 volts with respect to the reference electrode, while the anode may have an initial state of charge of zero at −1.0 volts with respect to the reference electrode. In this case, the full cell may reach its maximum voltage of 2.8 volts with the cathode fully charging to 100% state of charge 1.5 volts with respect to the reference electrode, and the anode partially charging to 60% at −1.3 volts with respect to the reference electrode (a relative state-of-charge imbalance of 40% between the electrodes). During a subsequent discharge, the cell may discharge only 60% of its theoretical capacity before the anode reaches a state of charge of zero. In case 3, the discharge capacity of the cell is not optimized for the boundary condition of an electrolyte having a 2.8 volt stability window because the anode has been charged to a lower state of charge than the cathode when the cell voltage reaches 2.8 volts, so there is less discharge capacity available.

The maximum discharge capacity is achieved only when the states of charge of the cathode and anode are equal at the maximum cell voltage. This may be achieved by use of a limited side-reaction in which the coulombic efficiency of at least one electrode is degraded. For example, consider case 4 in which the cathode has an initial state of charge of 40% at 1.2 volts with respect to the reference electrode, the anode has an initial state of charge of zero, at −1.0 volts with respect to the reference electrode, and in which an additive to the electrolyte degrades the coulombic efficiency of the charging of the cathode to 50% of the coulombic efficiency of the charging of the anode. In this case 4, during charging of the cell the state of charge of the cathode may increase from 40% to 80% while the state of charge of the anode may increase from zero to 80%, at which point the cell reaches a maximum voltage of 2.8 volts. During a subsequent discharge, the cell may discharge 80% of its theoretical capacity before either electrode reaches a state of charge of zero. In this case 4, the addition of an electrolyte additive to degrade the coulombic efficiency of charging of the cathode allowed the electrodes to reach a balanced state of charge when the cell reached its maximum voltage, which resulted in optimization of the discharge capacity of the cell.

Some embodiments relate to a class of electrode materials having stiff open framework structures into which hydrated cations can be reversibly and rapidly intercalated from aqueous (e.g., water-based) electrolytes or other types of electrolytes. In particular, open framework structures with the Prussian Blue-type crystal structure afford advantages including greater durability and faster kinetics when compared to other intercalation and displacement electrode materials. A general formula for a TMCCC/PBA class of materials is given by:

, where:

A is a monovalent cation such as $Na^+$, $K^+$, $Li^+$, or $NH_4^+$, or a divalent cation such as $Mg^{2+}$ or $Ca^{2+}$;

P is a transition metal cation such as $Ti^{3+}$, $Ti^{4+}$, $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ni^{2+}$, $Cu^+$, $Cu^{2+}$, or $Zn^{2+}$, or another metal cation such as $Al^{3+}$, $Sn^{2+}$, $In^{3+}$, or $Pb^{2+}$;

R is a transition metal cation such as $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, or $Pt^{3+}$;

L is a ligand that may be substituted in the place of a $CN^-$ ligand, including CO (carbonyl), NO (nitrosyl), or Cr;

$0 \leq x \leq 2$;

$0 < y \leq 4$;

$0 < z \leq 1$;

$0 \leq j \leq 6$; and $0 \leq n \leq 5$;

wherein j is typically zero but may have a non-integer value when the PBA material includes a mixture of multiple types of $R(CN)_{6-j}L_j$ groups, for example half $R(CN)_6$ and half $R(CN)_5L_1$, then the average in the whole material is a non-integer j.

Figure 32:
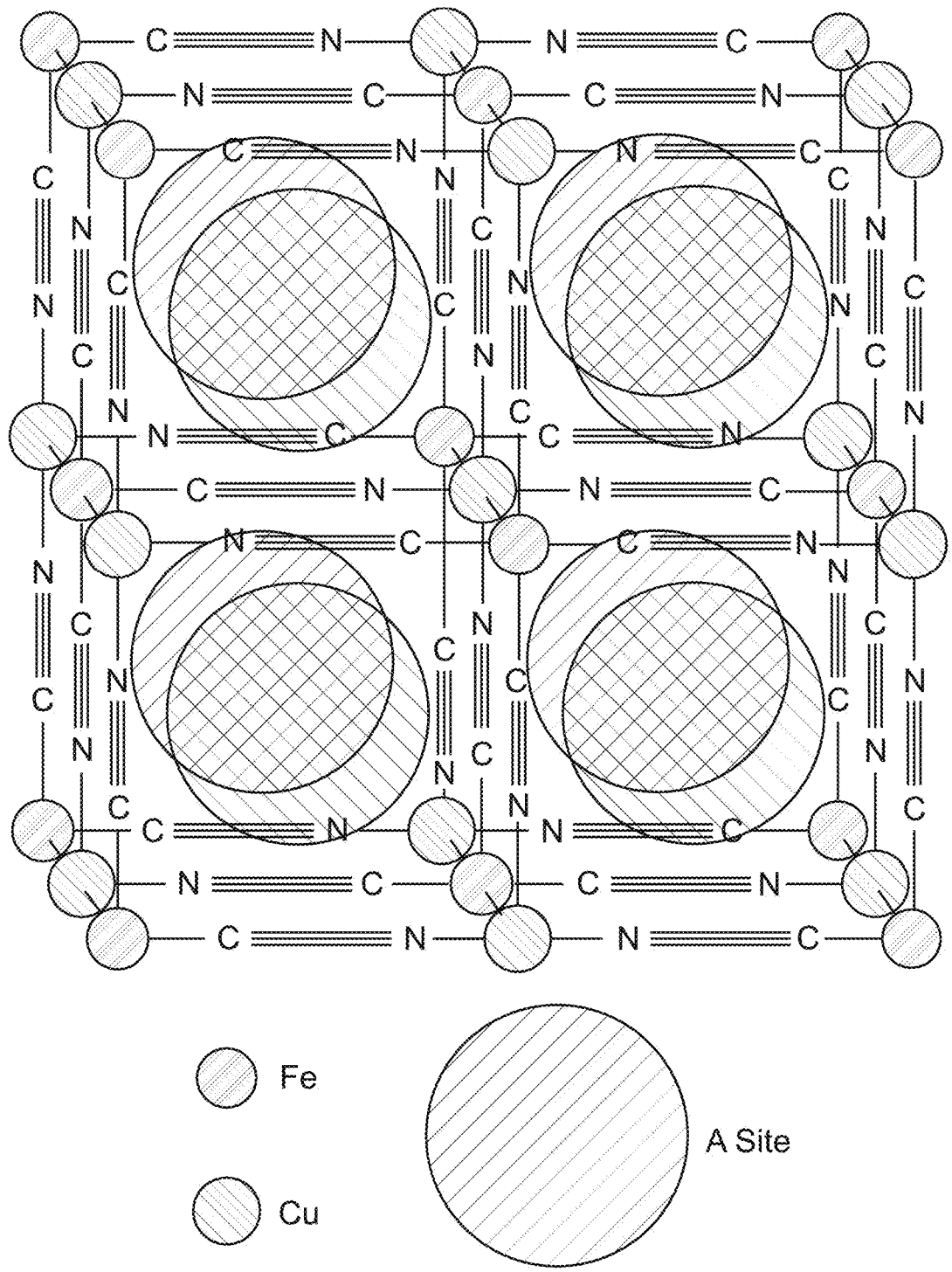
FIG. 32 illustrates a unit cell of the Prussian Blue crystal structure.

FIG. 32 illustrates a unit cell of the Prussian Blue crystal structure. The unit cell of copper hexacyanoferrate, a TMCCC. In this material and all other TMCCCs, transition metal cations are linked in a face centered cubic framework by cyanide bridging ligands. In this case, iron is six-fold carbon coordinated, while copper is six-fold nitrogen coordinated. Each unit cell contains eight smaller cubic subcells, at the center of which is a large interstitice designated as the "A Site". The A Sites contain zeolitic water and mobile alkali cations such as $Na^+$ or $K^+$ or $NH_4^+$. During the electrochemical cycling of a TMCCC, alkali cations are inserted or removed from the A Sites.

Figure 33:
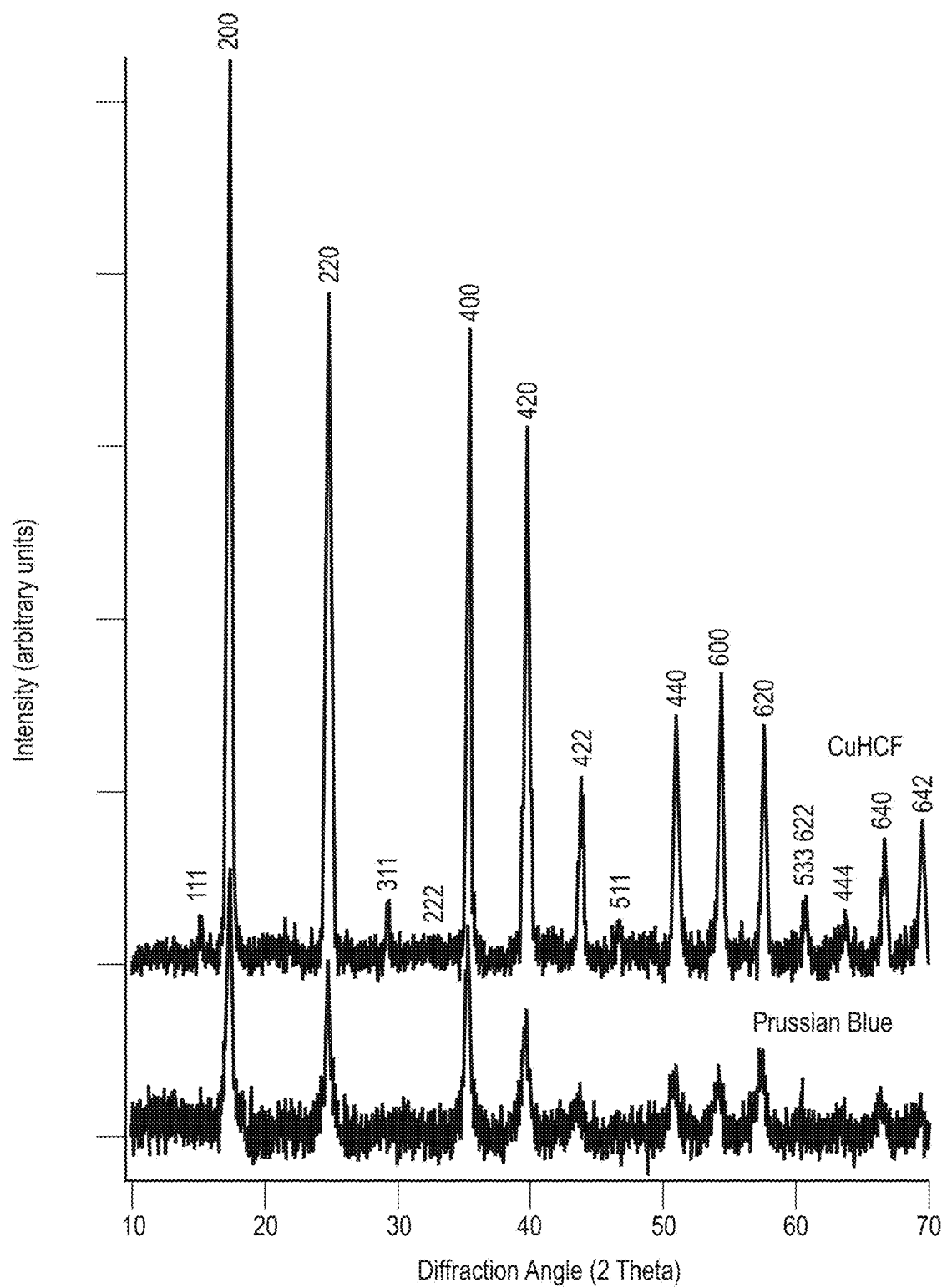
FIG. 33 illustrates an X-ray diffraction spectrum of CuHCF.

FIG. 33 illustrates an X-ray diffraction spectrum of CuHCF. The fully indexed powder X-ray diffraction spectra of copper hexacyanoferrate and Prussian Blue. Copper hexacyanoferrate has the well-known face-centered cubic open framework structure of Prussian Blue.

Figure 34:
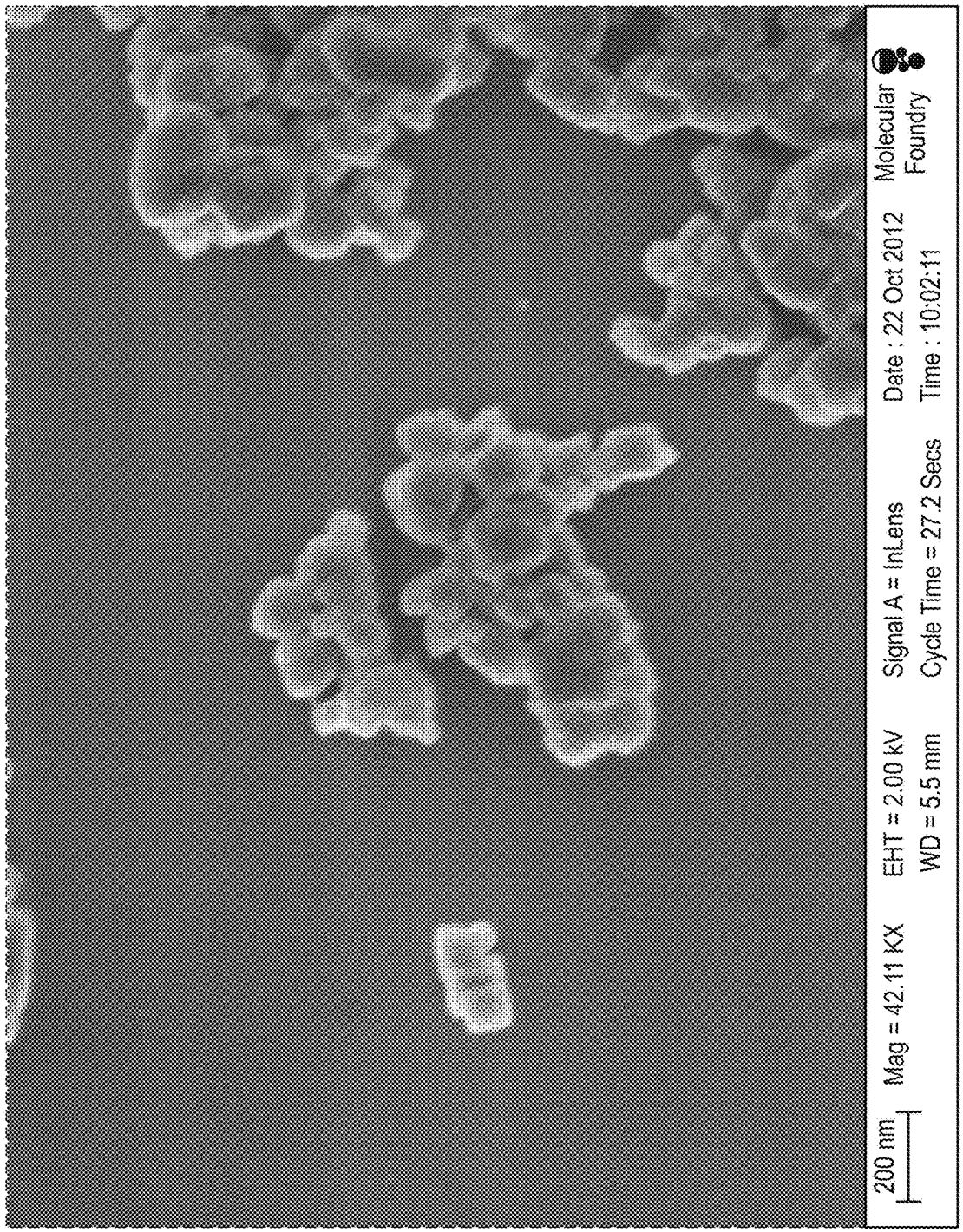
FIG. 34 illustrates a micrograph of CuHCF.

FIG. 34 illustrates a micrograph of CuHCF. Scanning electron microscopy of copper hexacyanoferrate shows that the material is composed of agglomerations of 20-50 nm grains. These agglomerations can be as large as several microns.

Figure 35:
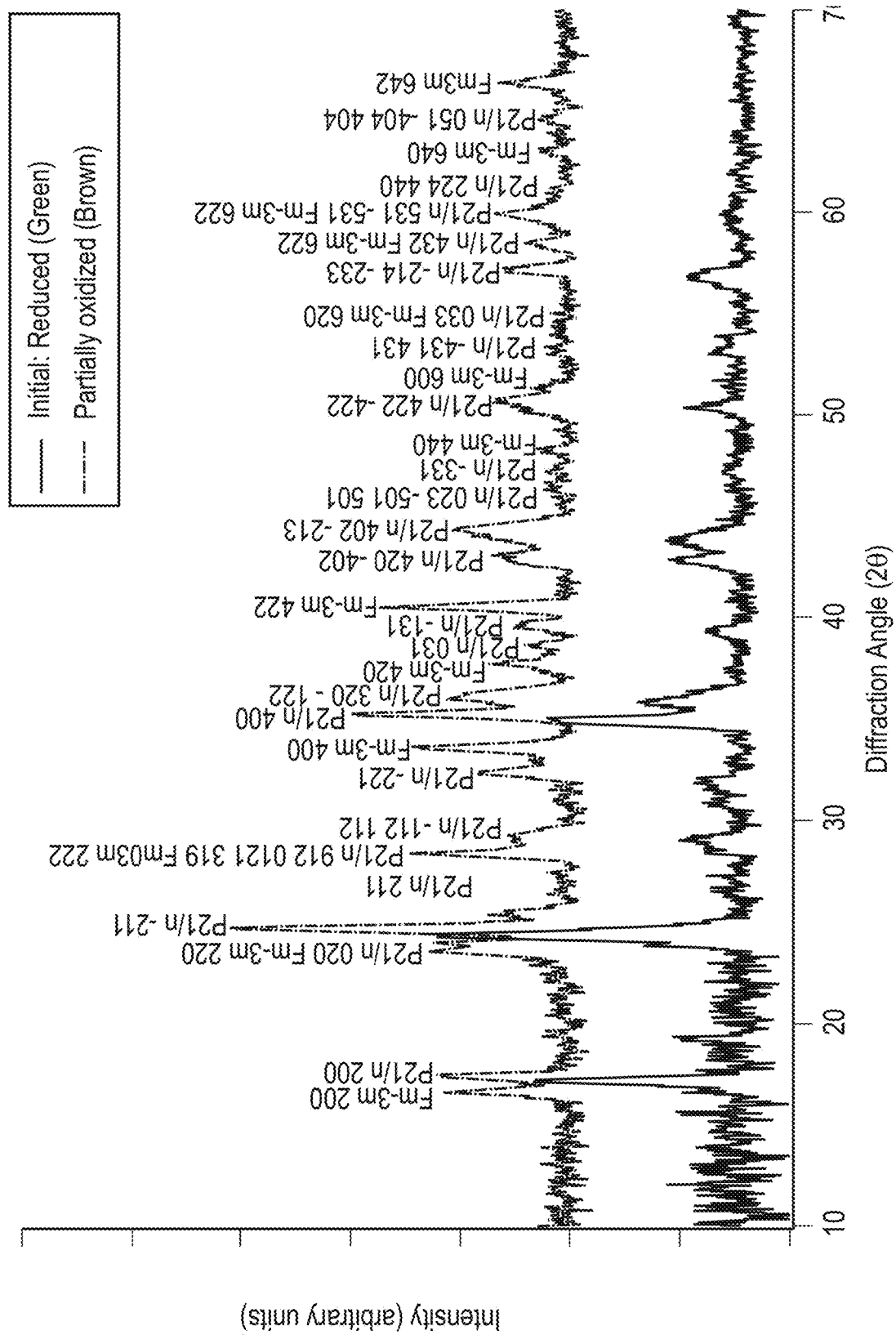
FIG. 35 illustrates X-ray diffraction spectra of MnHCMn.

FIG. 35 illustrates X-ray diffraction spectra of MnHCMn. The powder X-ray diffraction spectrum of freshly synthesized, fully reduced manganese(II) hexacyanomanganate (II), and of the same material after partial oxidation. In the latter case, a symmetry-breaking distortion in the framework structure is eliminated during oxidation, forming the more common face-centered cubic phase (as in FIG. 32 and FIG. 33).

Figure 36:
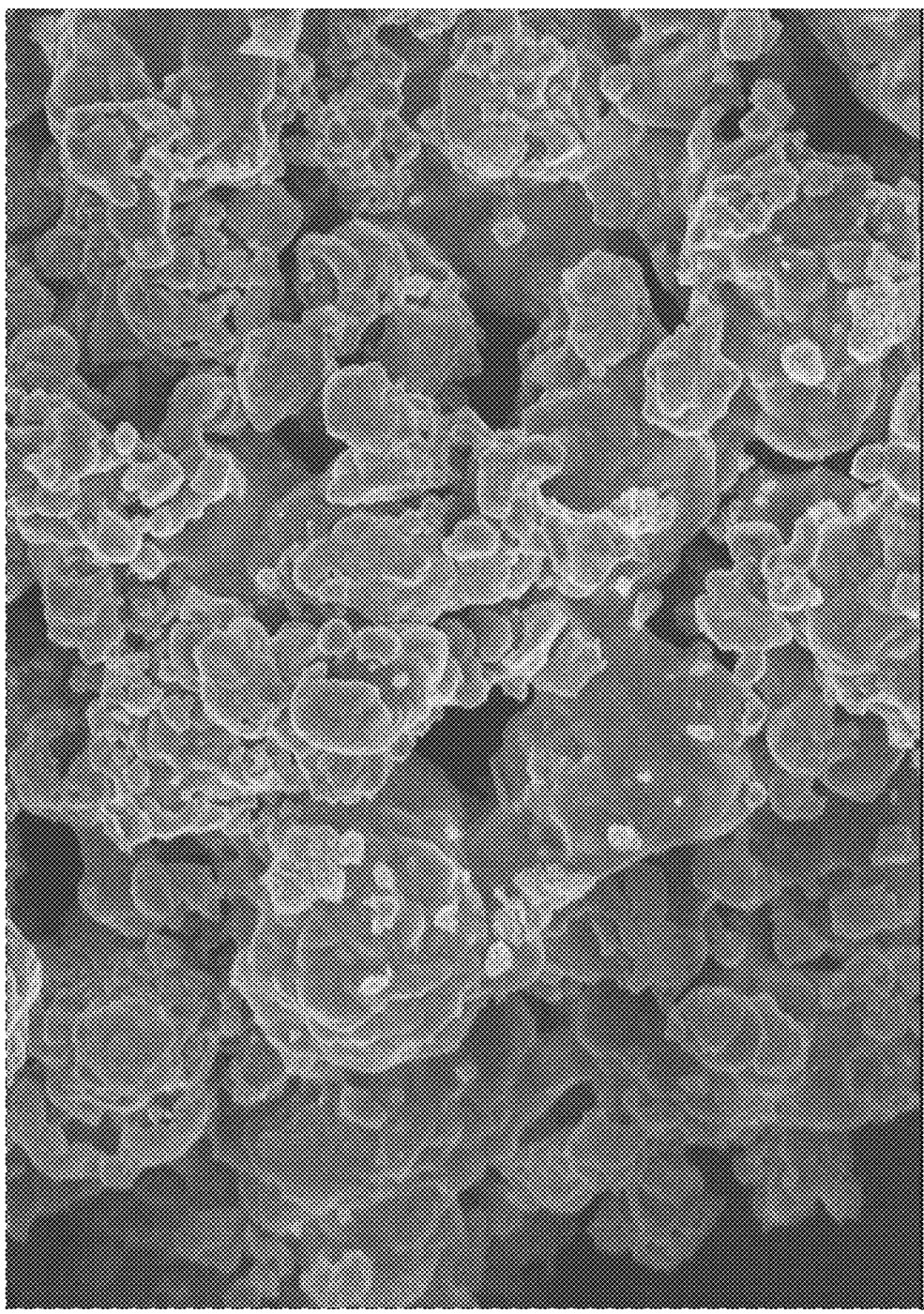
FIG. 36 illustrates a micrograph of MnHCMn.

FIG. 36 illustrates a micrograph of MnHCMn. Scanning electron microscopy of manganese hexacyanomanganate, as synthesized by a simple, one-step synthesis method.

Figure 37:
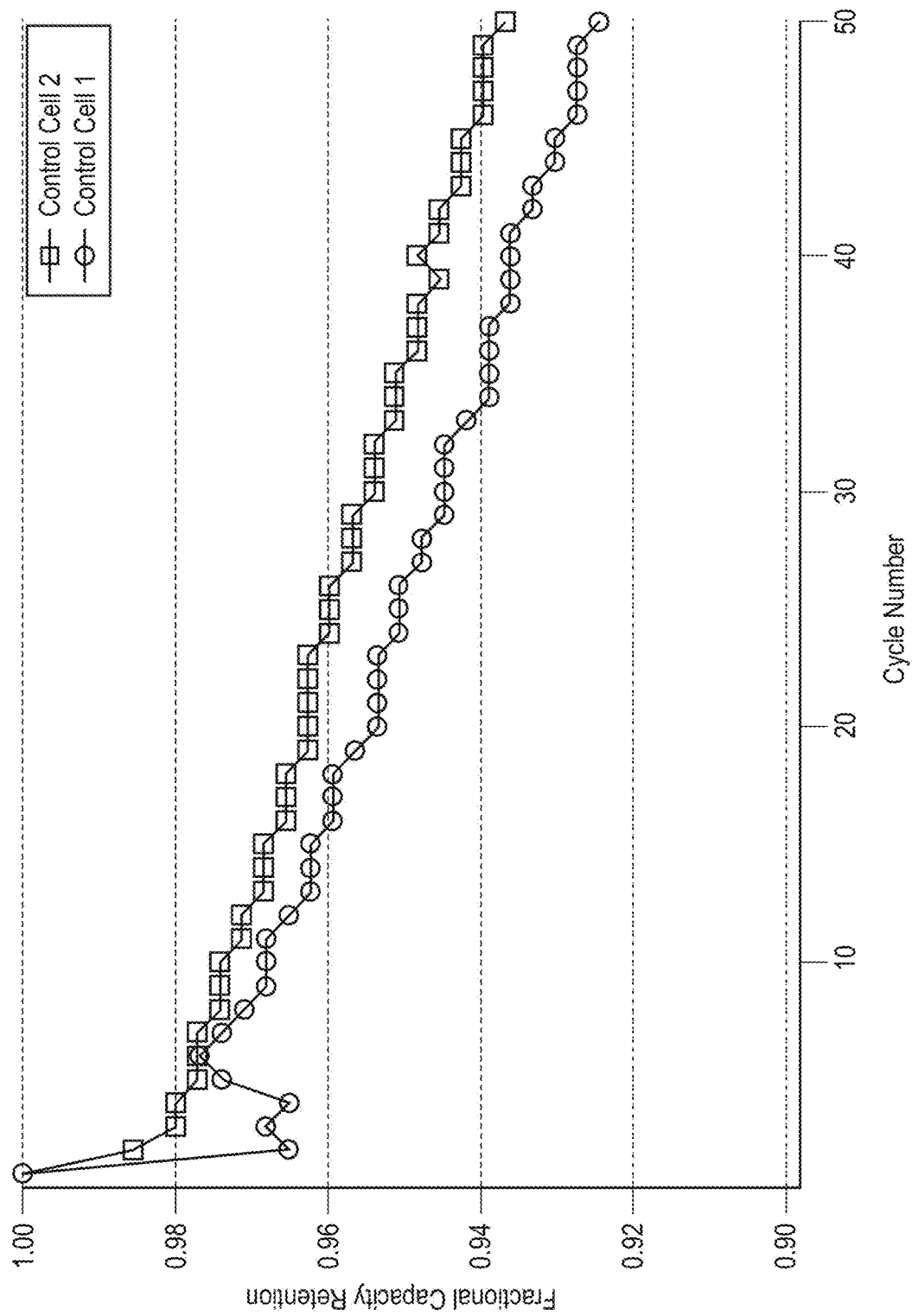
FIG. 37 illustrates baseline/control electrochemical cycling of CuHCF.

FIG. 37 illustrates baseline/control electrochemical cycling of CuHCF. The fractional capacity retention of copper hexacyanoferrate during galvanostatic cycling at a 1 C rate between 0.8 and 1.05 V vs. standard hydrogen electrode (SHE) in 1 M $KNO_3$ (pH=2) with a Ag/AgCl reference electrode and an activated charcoal counter electrode. These two cells represent a consistently observed loss of 7%/50 cycles under these conditions.

Figure 38:
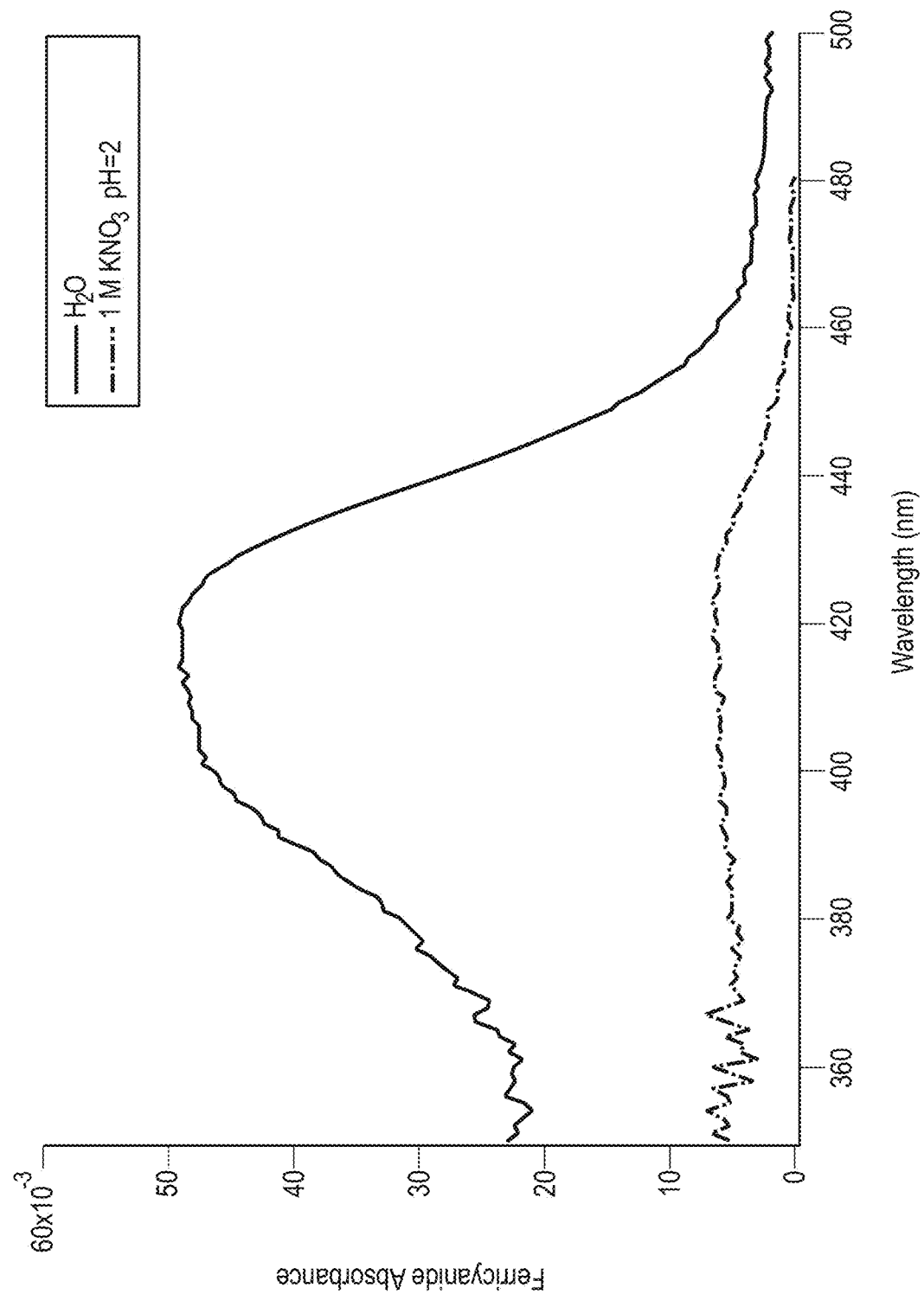
FIG. 38 illustrates a UV-visible spectrum of CuHCF in water and 1 M $KNO_3$ pH=2.

FIG. 38 illustrates a UV-visible spectrum of CuHCF in water and 1 M $KNO_3$ pH=2. Ultraviolet-visible absorbance spectroscopy of aqueous solutions that had contained 1 mg CuHCF electrode per 1 g of solution for 24 hours. The presence of concentrated K+ drastically reduces the soluble ferricyanide signal (peak at 420 nm).

Figure 39:
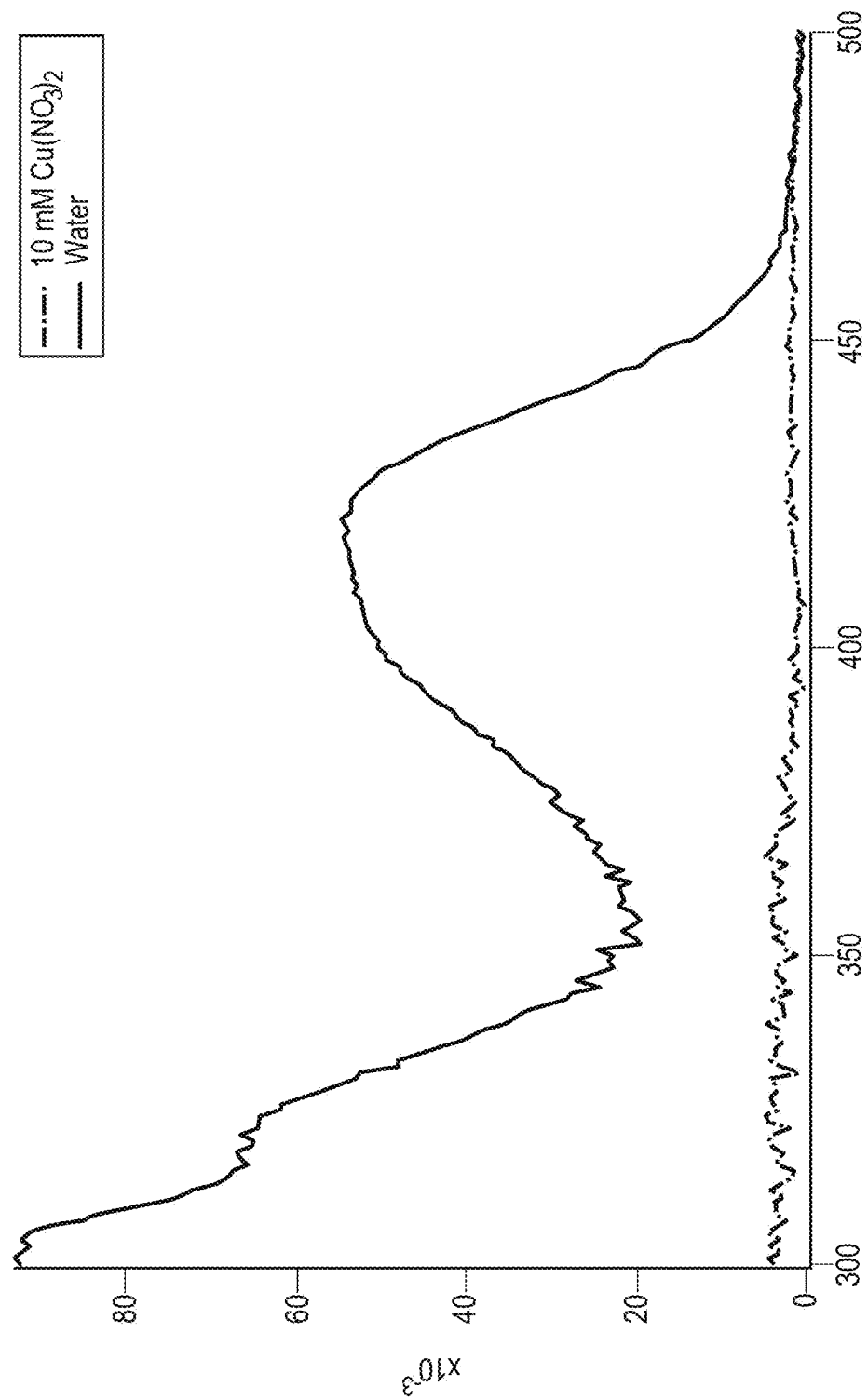
FIG. 39 illustrates an ultraviolet-visible absorbance spectrum of CuHCF in water and 10 mM $Cu^{2+}$.

FIG. 39 illustrates an ultraviolet-visible absorbance spectrum of CuHCF in water and 10 mM $Cu^{2+}$. The ultraviolet-visible absorbance spectra of solutions that had contained 1 mg CuHCF electrode per 1 g of solution for 24 hours. The addition of dilute (10 mM) copper nitrate results in a near-total elimination of the absorbance peak due to soluble ferricyanide. This demonstrates that $P^{m+}$ electrolyte additives slow or prevent the dissolution of $APR(CN)_6$ TMC-CCs.

Figure 40:
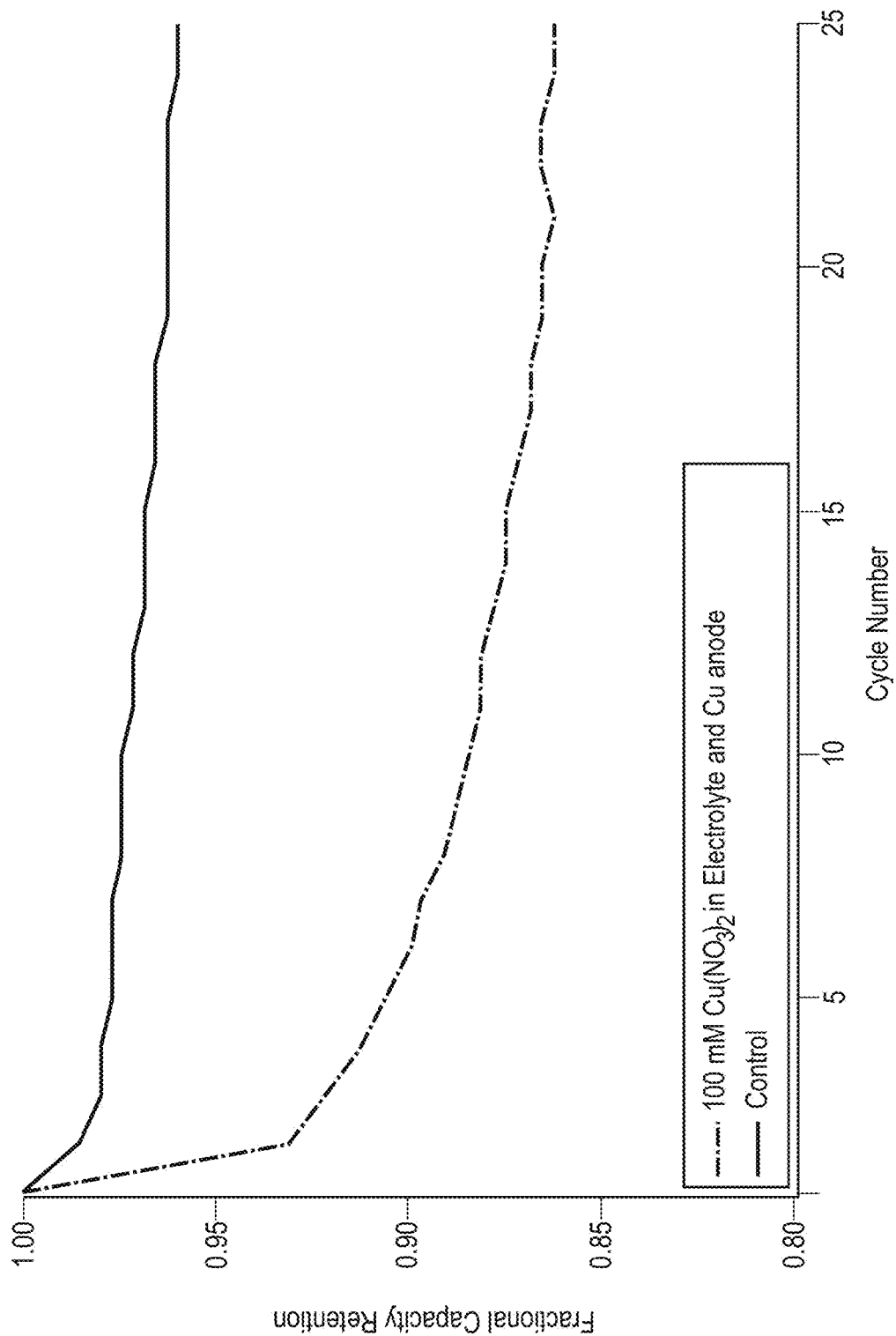
FIG. 40 illustrates the cycle life of CuHCF in 1 M $KNO_3$ pH=2 with and without $Cu^{2+}$ added.

FIG. 40 illustrates the cycle life of CuHCF in 1 M $KNO_3$ pH=2 with and without $Cu^{2+}$ added. Galvanostatic cycling of copper hexacyanoferrate against a metallic copper anode in 1 M $KNO_3$/0.1 M $Cu(NO_3)_2$ (pH=2) at a 1 C rate results in a steep initial capacity loss, followed by stabilization of the electrode, with zero capacity loss between cycle 20 and cycle 25. In contrast, the rate capacity loss observed in a control cell containing an activated charcoal anode and no $Cu(NO_3)_2$ in the electrolyte is constant. After 20 cycles, the rate of the continuing capacity loss is greater in the control cell than in the cell containing the $Cu(NO_3)_2$ electrolyte additive and the Cu metal anode.

Figure 41A:
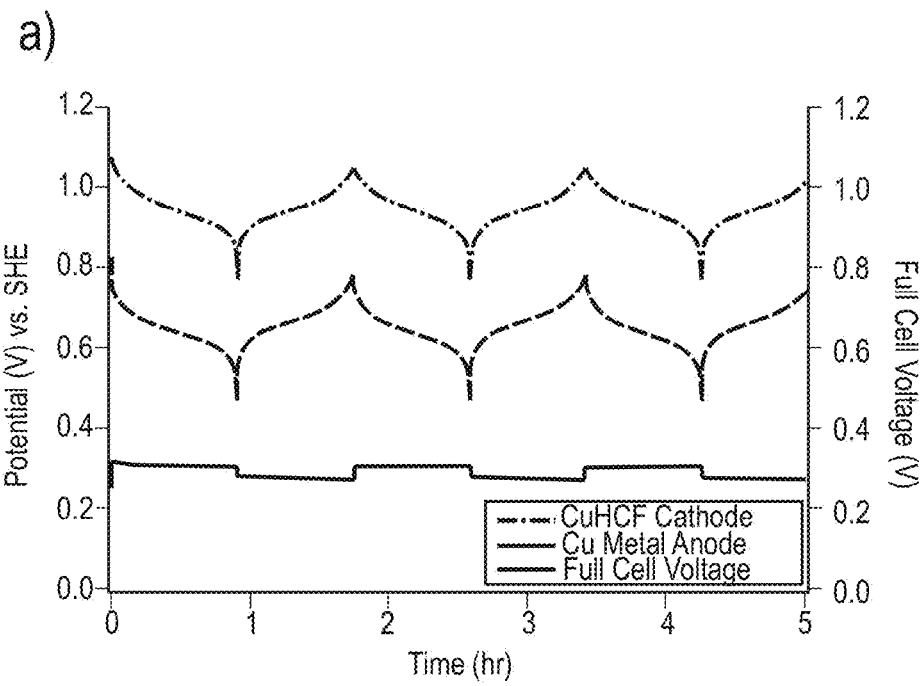
FIG. 41a illustrates potential profiles of the copper hexacyanoferrate cathode and the copper anode, and the full cell voltage, during galvanostatic cycling at a 1 C rate in 1 M $KNO_3$.
Figure 41B:
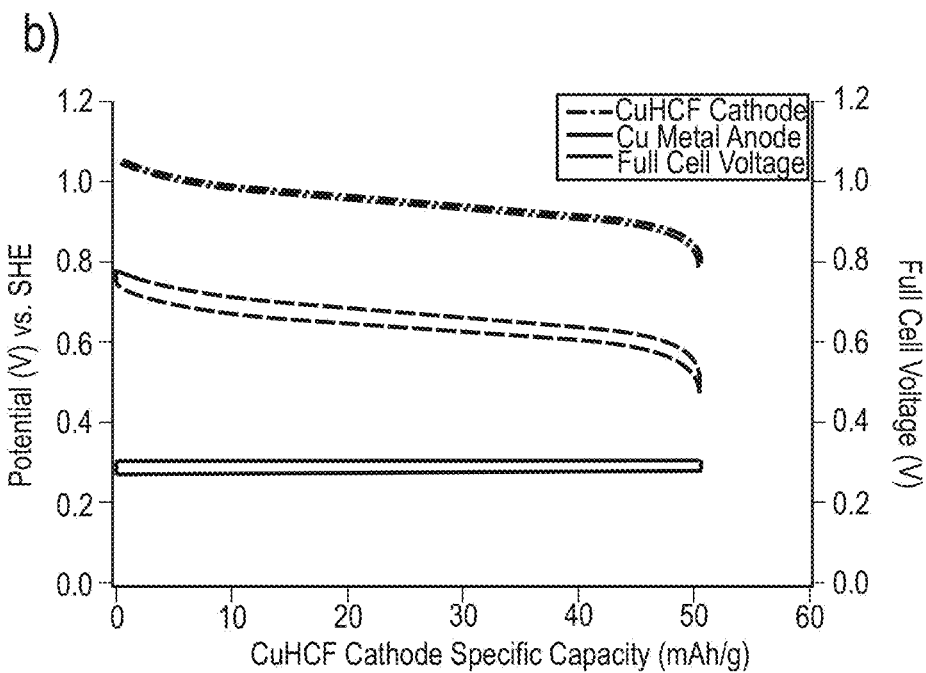
FIG. 41b illustrates the same data, plotted as a function of the specific capacity of the copper hexacyanoferrate cathode.

FIG. 41 illustrates galvanostatic cycling of $CuHCF/Cu^{2+}$/Cumetal in 2 sub-figures. FIG. 41a): The potential profiles of the copper hexacyanoferrate cathode and the copper anode, and the full cell voltage, during galvanostatic cycling at a 1 C rate in 1 M $KNO_3$ (pH=2) with 0.1 M $Cu(NO_3)_3$ added. FIG. 41b) The same data, plotted as a function of the specific capacity of the copper hexacyanoferrate cathode. Cycling is highly reversible.

Figure 42:
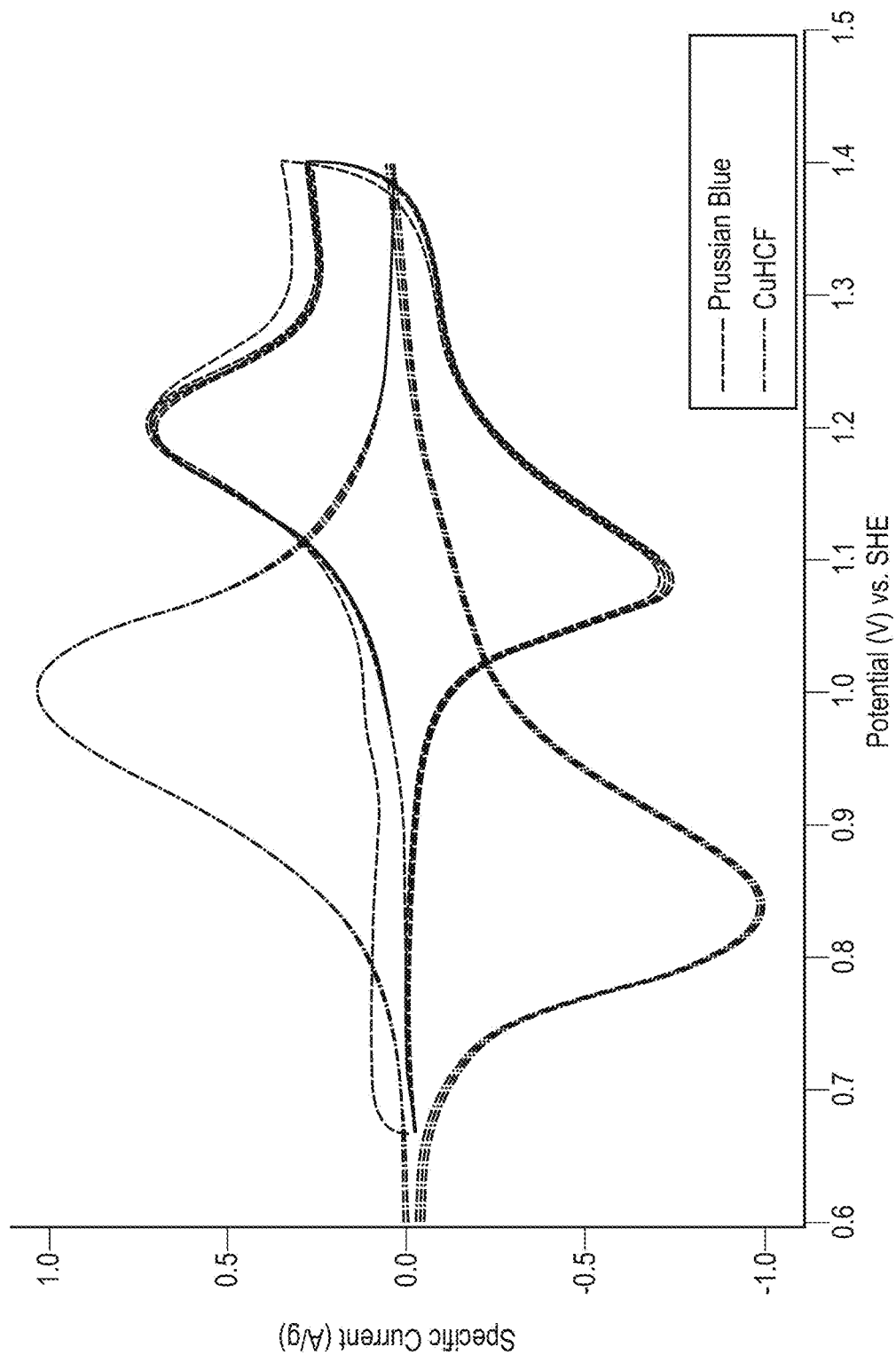
FIG. 42 illustrates cyclic voltammetry of CuHCF and PB/BG.

FIG. 42 illustrates cyclic voltammetry of CuHCF and PB/BG. Cyclic voltammetry (scan rate 1 mV/s) of copper hexacyanoferrate and Prussian Blue electrodes in 1 M $KNO_3$ (pH=2) electrolyte. The reaction potential of copper hexacyanoferrate is centered at 0.95 V, while the oxidation of Prussian Blue to Berlin Green is centered at nearly 1.2 V. This means that copper hexacyanoferrate can be fully oxidized before appreciable oxidation of the Prussian Blue occurs. In the case of a Prussian Blue coating on a copper hexacyanoferrate electrode, the electrode can be charged and discharged without oxidizing the coating.

Figure 43:
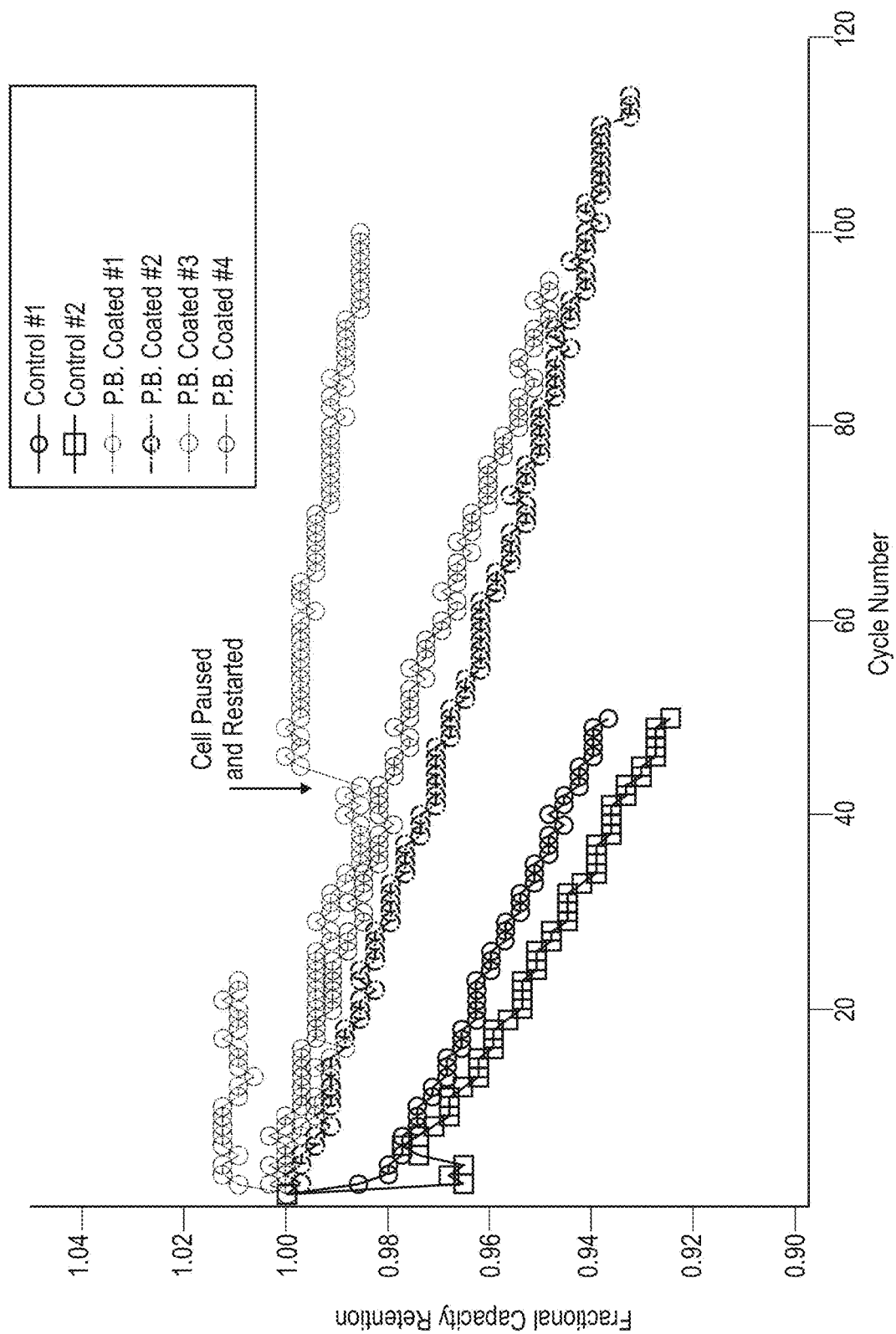
FIG. 43 illustrates capacity retention of PB/CuHCF and CuHCF.

FIG. 43 illustrates capacity retention of PB/CuHCF and CuHCF. Copper hexacyanoferrate electrodes that have been coated by a thin film of Prussian Blue have improved capacity retention in comparison to uncoated electrodes.

Figure 44:
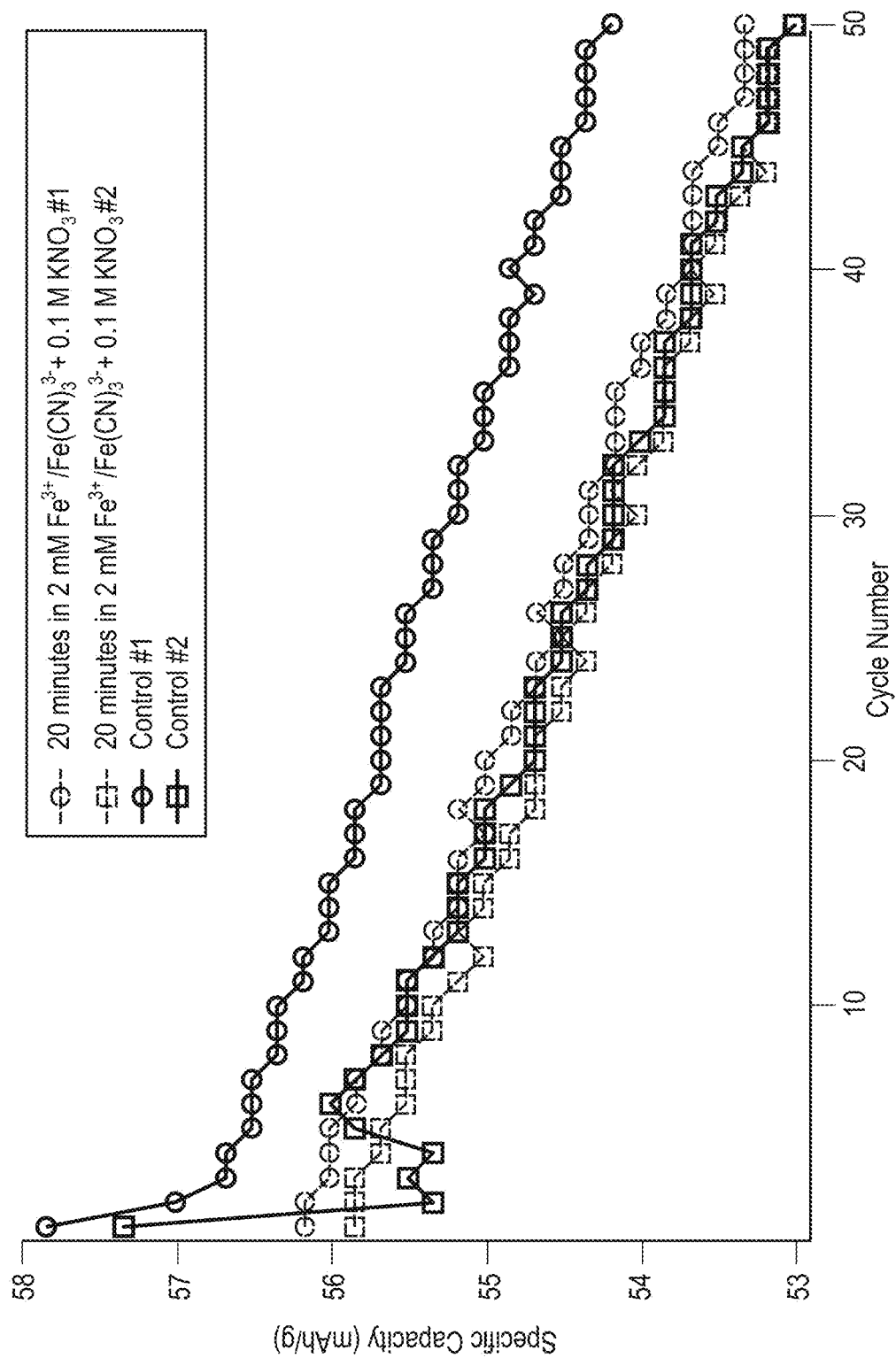
FIG. 44 illustrates capacity retention of CuHCF w/$K^+$ in PB dep solution.

FIG. 44 illustrates capacity retention of CuHCF w/$K^+$ in PB dep solution. The capacity retention of copper hexacyanoferrate does not improve if the electrodes are exposed to a solution containing both Prussian Blue precursors and a more concentrated potassium salt.

Figure 45:
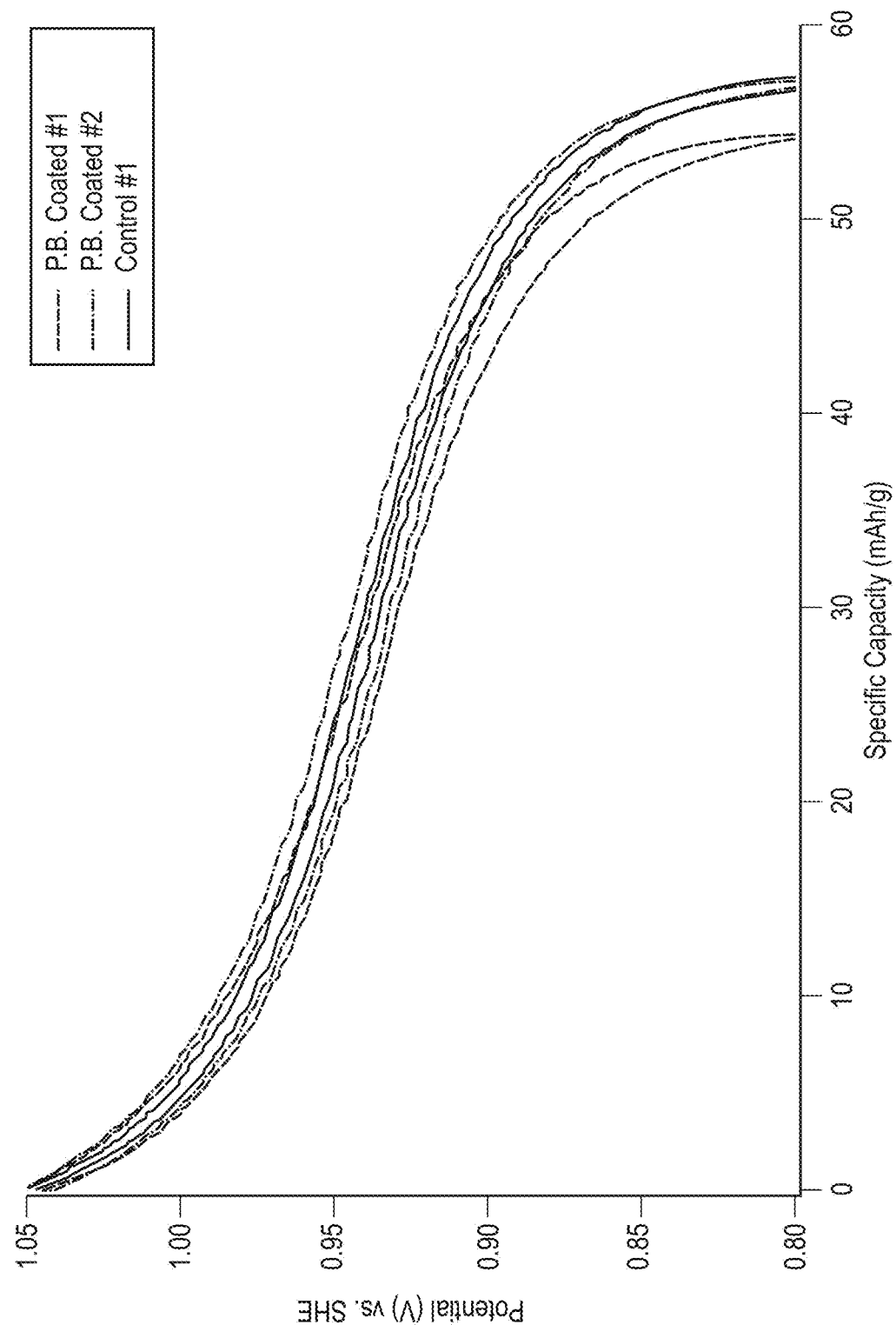
FIG. 45 illustrates potential profiles of CuHCF and Prussian Blue-coated CuHCF electrodes.

FIG. 45 illustrates potential profiles of CuHCF and Prussian Blue-coated CuHCF electrodes. The potential profiles of bare and Prussian Blue-coated copper hexacyanoferrate electrodes. The coating does not have an appreciable effect on the electrochemical behavior of the electrode.

Figure 46:
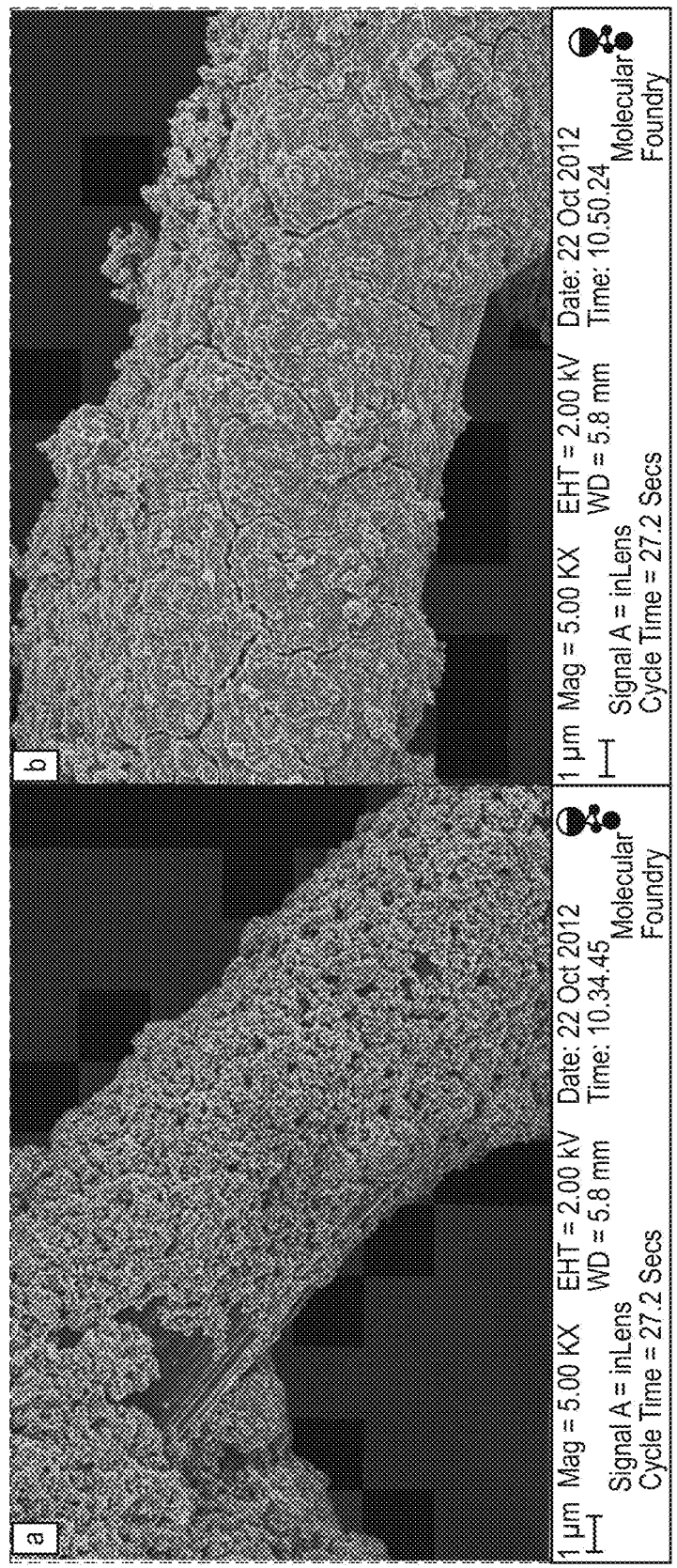
FIG. 46 illustrates morphologies of bare and Prussian Blue-coated CuHCF electrodes in two sub-figures, including FIG. 46a and FIG. 46b.

FIG. 46 illustrates morphologies of bare and Prussian Blue-coated CuHCF electrodes in two sub-figures: FIG. 46a) illustrates scanning electron microscopy of a freshly deposited slurry electrode of copper hexacyanoferrate (80%), carbon black (10%), and polyvinylidene difluoride (10%) on a carbon cloth substrate and FIG. 46b) illustrates the same sample, after electrochemical reduction, followed by 40 minutes of exposure to a 2 mM aqueous solution of $Fe(CN)_3$ and $K_3Fe(CN)_6$. A film of Prussian Blue has clearly precipitated on the surface of the sample, as the grains at the surface are larger and form a more continuous surface than seen in FIG. 46a).

Figure 47:
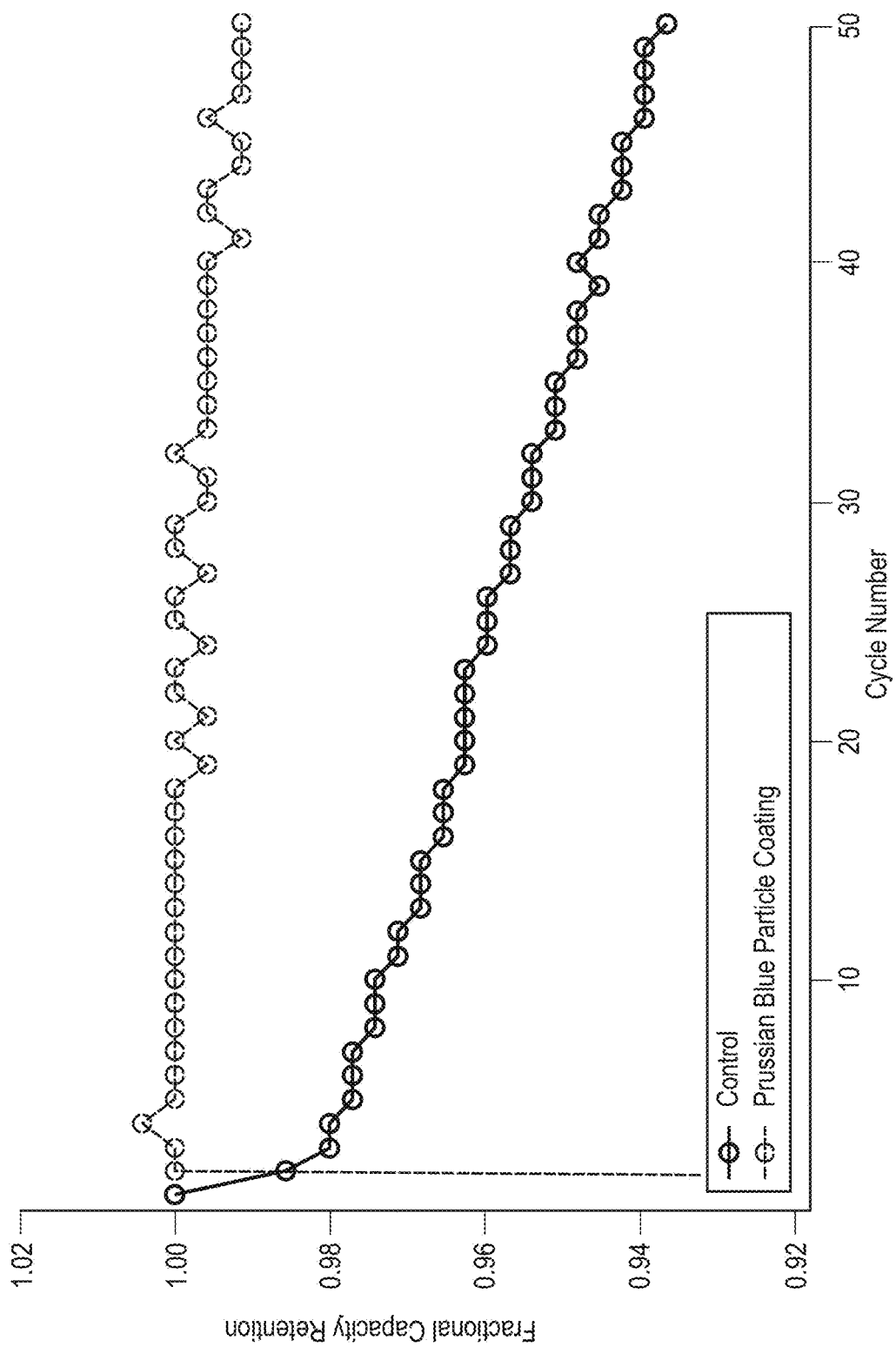
FIG. 47 illustrates cycle life of CuHCF with PB coating on the particles.

FIG. 47 illustrates cycle life of CuHCF with PB coating on the particles. Fractional capacity retention of a standard copper hexacyanoferrate electrode, and an electrode containing Prussian Blue-coated copper hexacyanoferrate during galvanostatic cycling at a 1 C rate in 1 M $KNO_3$ (pH=2). The use of a Prussian Blue coating stabilizes the individual copper hexacyanoferrate particles against dissolution.

Figure 48B:
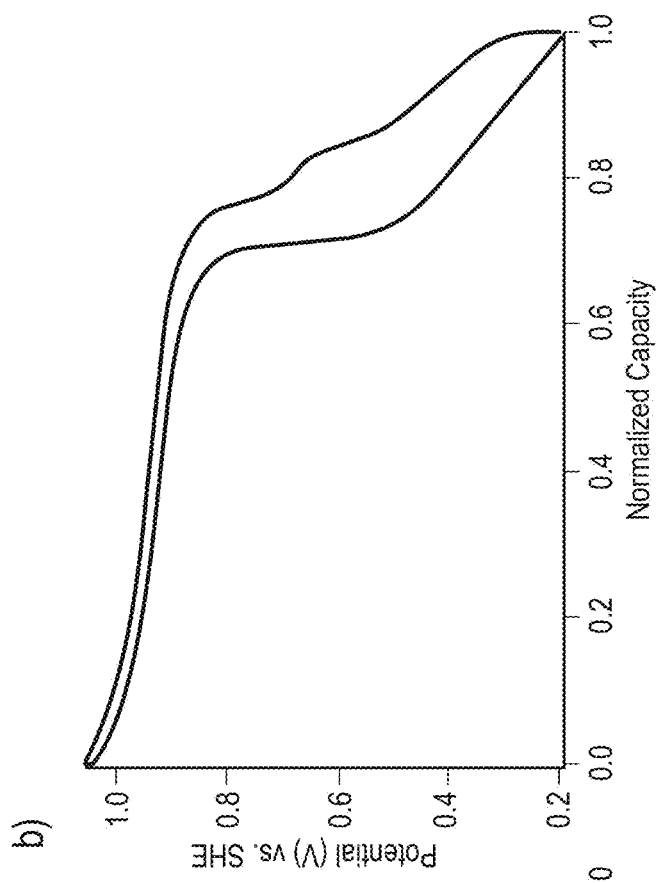
FIG. 48b illustrates Galvanostatic cycling of an electrode containing Prussian-Blue coated copper hexacyanoferrate nanoparticles over a wider potential range.
Figure 48A:
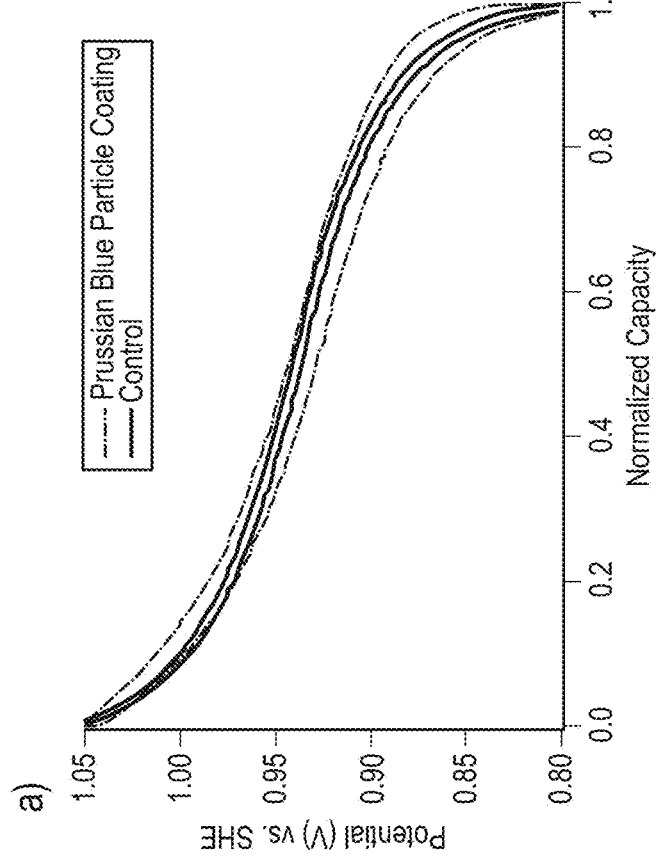
FIG. 48a illustrates the potential profiles of electrodes containing untreated copper hexacyanoferrate, and copper hexacyanoferrate nanoparticles coated with Prussian Blue, during galvanostatic cycling at a 1 C rate in 1 M $KNO_3$ (pH=2)

FIG. 48 illustrates potential profiles of CuHCF with PB coating on the particles in two sub-figures: FIG. 48*a* illustrates the potential profiles of electrodes containing untreated copper hexacyanoferrate, and copper hexacyanoferrate nanoparticles coated with Prussian Blue, during galvanostatic cycling at a 1 C rate in 1 M $KNO_3$ (pH=2) and FIG. 48*b* illustrates Galvanostatic cycling of an electrode containing Prussian-Blue coated copper hexacyanoferrate nanoparticles over a wider potential range. Prussian Blue is electrochemically active at 0.4 V vs. SHE. About 20% of the total capacity of the electrode occurs at low potential, indicating a ratio of copper hexacyanoferrate to Prussian Blue of about 4:1. This is in agreement with the 4:1 ratio of copper hexacyanoferrate to Prussian Blue precursors added during the coating treatment procedure.

Figure 49:
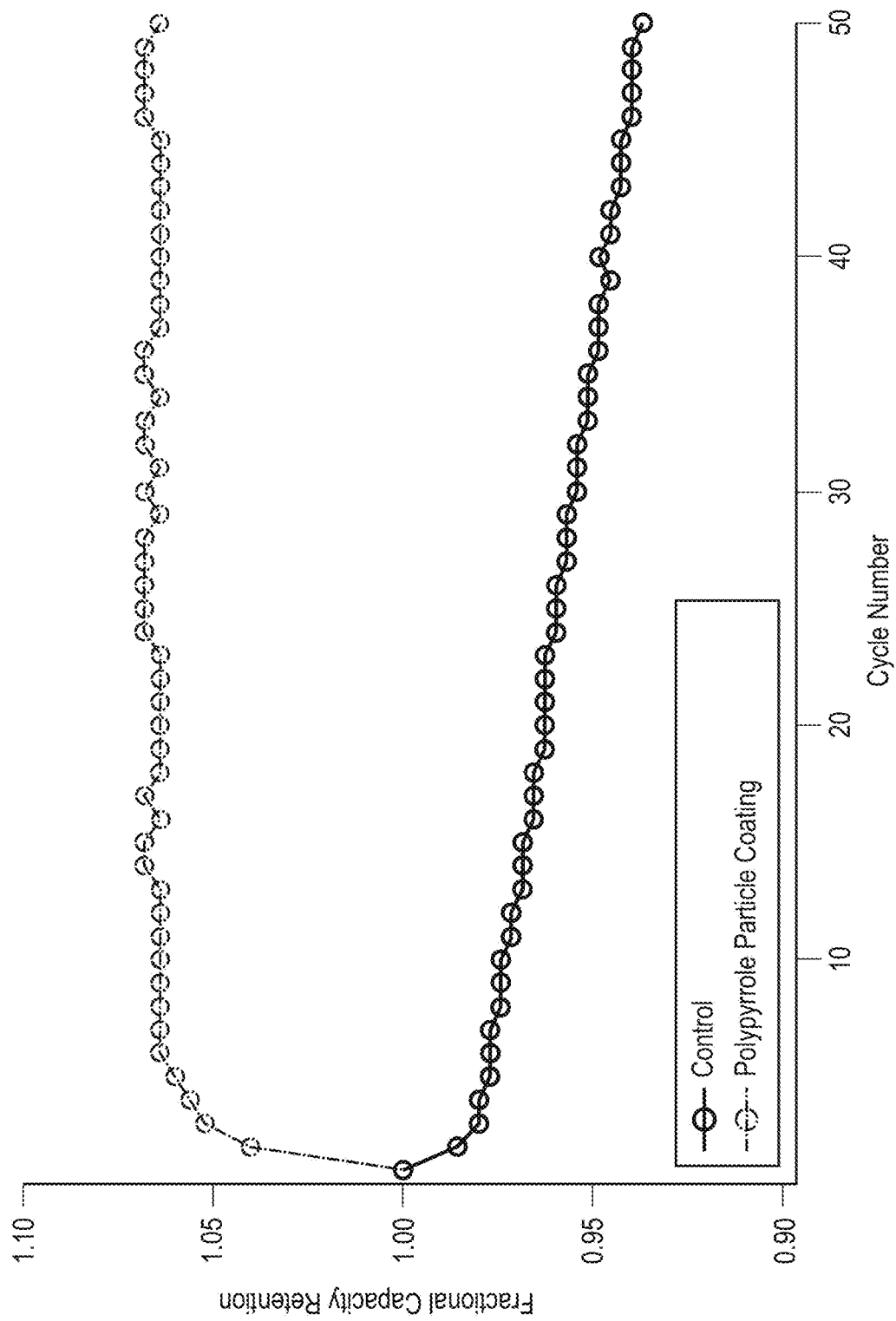
FIG. 49 illustrates cycle life of CuHCF with PPy coating on the particles.

FIG. 49 illustrates the cycle life of CuHCF with PPy coating on the particles. An electrode containing polypyrrole-coated copper hexacyanoferrate shows a completely stable capacity for at least 50 cycles at a 1 C rate in 1 M $KNO_3$ (pH=2). In comparison, a control sample containing uncoated copper hexacyanoferrate loses about 7% of its capacity after the same duration of cycling.

Figure 50:
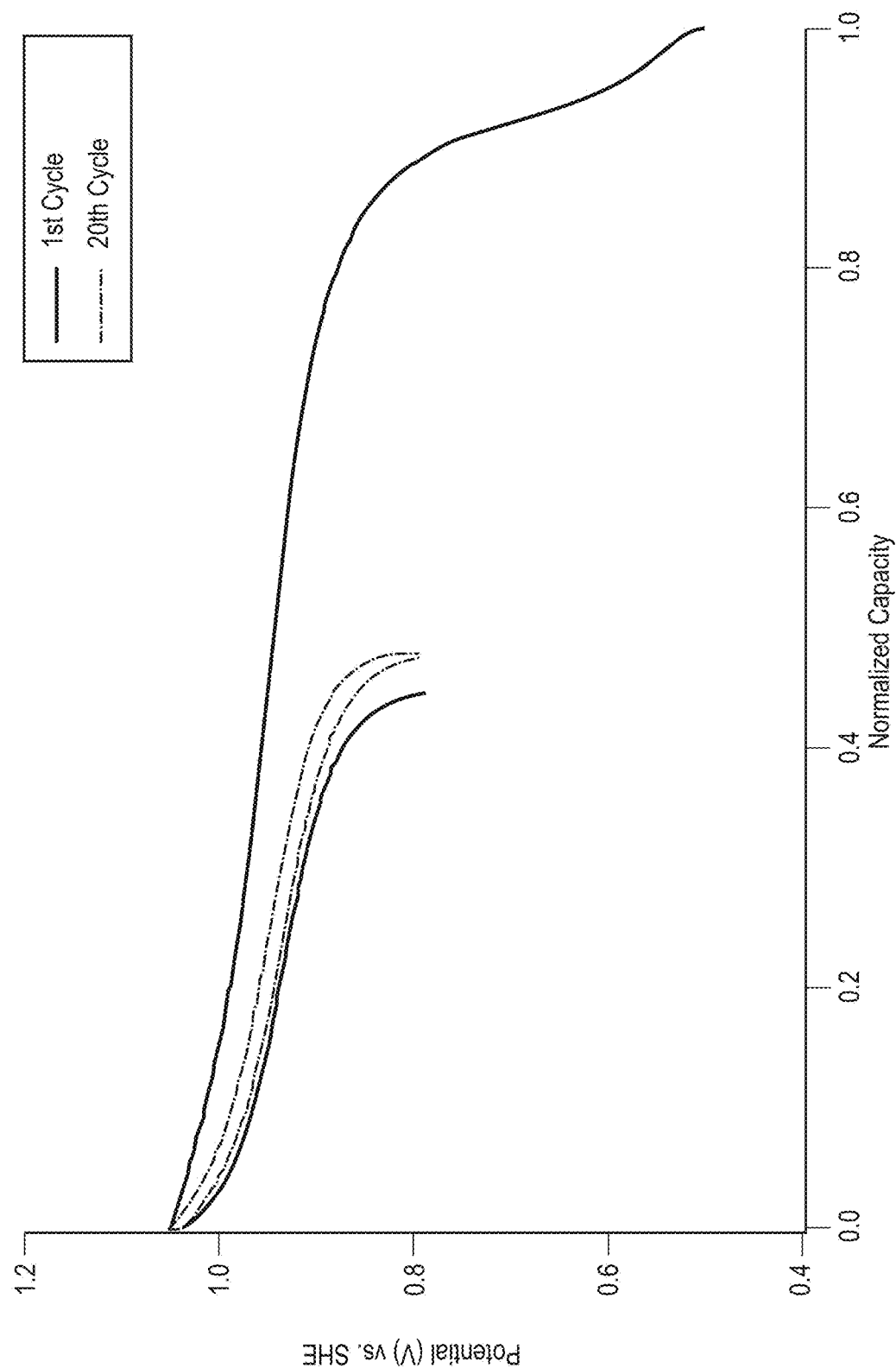
FIG. 50 illustrates potential profiles of CuHCF with PPy coating on the particles.

FIG. 50 illustrates potential profiles of CuHCF with PPy coating on the particles. A large, irreversible charge capacity is observed during the first charge of polypyrrole-coated copper hexacyanoferrate. Cycling after the first charge is extremely reversible. The reversible reaction centered at 0.95 V vs. SHE is consistent with the one observed for uncoated copper hexacyanoferrate, showing that the polypyrrole coating is inactive in this potential range.

A battery (or cell) comprises an anode, a cathode, and an electrolyte that is in contact with both the anode and the cathode. Both the cathode and the anode contain electrochemically active material that may undergo a change in valence state, accompanied by the acceptance or release of cations and electrons. For example, during discharge of a battery, electrons are extracted from the anode to an external circuit, while cations are removed from the anode into the electrolyte. Simultaneously, electrons from the external circuit enter the cathode, as do cations from the electrolyte. The difference in the electrochemical potentials of the cathode and anode results in a full cell voltage. This voltage difference allows energy to be extracted from the battery during discharge, or stored in the battery during charge.

Prussian Blue is a well-known material phase of iron cyanide hydrate of the chemical formula $K_xFeIII[FeII(CN)_6]_z \cdot nH_2O$ ($0 \le x$, $0 < z \le 1$; $n \approx 4$). This material has been produced industrially for centuries for use as a pigment and dyestuff. It is also a well-known electrochromic material, and has been studied for use as a cathode in electrochromic displays. FIG. 32 illustrates Prussian Blue as having a face-centered cubic crystal structure. In this structure, cyanide bridging ligands link transition metal cations in a spacious open framework. The structure contains large interstitial sites commonly called the "A Sites." Each unit cell contains eight A Sites, each of which may contain zeolitic water, interstitial alkali cations, or both.

For example, copper hexacyanoferrate (CuHCF) is a TMCCC recently demonstrated to be a high performance battery electrode. In the open framework structure of CuHCF, iron is six-fold, octahedrally coordinated to the carbon ends of the cyanide branching ligands, while copper is octahedrally nitrogen-coordinated as shown in FIG. 32. Depending on the method of synthesis, the A sites in CuHCF may contain potassium or another alkali cation such as sodium or lithium, or another type of cation such as ammonium. More generally, for a TMCCC of the general chemical formula $A_xP_y[R(CN)_6]_z \cdot nH_2O$, alkali cations $A^+$ and water occupy the interstitial A Sites, transition metal P cations are six-fold nitrogen coordinated, and transition metal R cations are six-fold carbon coordinated.

Herein the electrochemical cells used to test electrode properties contained a TMCCC working electrode, a counter electrode, an electrolyte in contact with both the anode and cathode, and a Ag/AgCl reference electrode used to independently measure the potentials of the anode and cathode during charge and discharge of the cell. When the electrode of interest was a cathode material, then the working electrode was the cathode, and the counter electrode was the anode. When the electrode of interest was an anode material, then the working electrode was the anode, and the counter electrode was the anode. In the case that the cell did not contain both a TMCCC cathode and a TMCCC anode, a capacitive activated charcoal counter electrode was used to complete the circuit while allowing the study of a single TMCCC electrode.

Several measurement and characterization techniques were used to examine the materials and electrodes described here. Physical characterization of TMCCC materials was performed using X-ray diffraction (XRD) and scanning electron microscopy (SEM). Electrochemical characterization of electrodes was performed using galvanostatic cycling with potential limitation (GCPL). During the GCPL technique a constant current is applied to the cell until the working electrode reaches a maximum or minimum potential; upon reaching this extreme potential, the sign of the current is reversed.

In the application, sometimes a shorthand reference is made to a "standard" method for materials synthesis. Those references include this following discussion, sometimes the context includes a modification or adjustment of a portion of this synthesis. CuHCF was synthesized using existing techniques, such disclosed in Wessells, C. D., et al. Copper hexacyanoferrate battery electrodes with long cycle life and high power. *Nature Comm.*, 2, 550 (2011). An aqueous solution of $Cu(NO_3)_2$, and a second aqueous solution of $K_3Fe(CN)_6$ were added to water by simultaneous, dropwise addition while stirring. The final concentrations of the precursors were 40 mM $Cu(NO_3)_2$ and 20 mM $K_3Fe(CN)_6$. A solid, brown precipitate formed immediately. It was filtered or centrifuged, washed, and dried. In a prior study, CuHCF synthesized by this method was found to have the composition $K_{0.7}Cu[Fe(CN)_6]_{0.7} \cdot 2.8H_2O$. FIG. 33 illustrates that CuHCF was found to have the cubic Prussian Blue open framework crystal structure using XRD. The CuHCF was composed of nanoparticles about 50 nm in size, as verified by SEM as shown in FIG. 34.

Manganese hexacyanomanganate (MnHCMn) was synthesized using a single-step procedure such as disclosed in Her, J. H., et al. Anomalous Non-Prussian Blue Structures and Magnetic Ordering of $K_2MnII[MnII(CN)_6]$ and $Rb_2MnII[MnII(CN)_6]$. *Inorg. Chem.*, 49, 1524 (2010). A 10 mL aqueous solution containing 0.5 g KCN was slowly added to a 10 mL aqueous solution containing 0.5 g of $MnCl_2$ in a $N_2$ atmosphere. A dark green precipitate slowly formed. This precipitate was centrifuged, washed, and dried with no exposure to air or oxygen. X-ray diffraction of the freshly synthesized material revealed a monoclinic structure indicative of a slight distortion to the standard Prussian Blue open framework structure as shown in FIG. 35. After partial oxidation, the cubic phase was found to form. This result indicates an approximate chemical formula $K_2MnII[MnII(CN)_6]\cdot nH_2O$. SEM of FIG. 36 illustrates that the MnHCMn was composed of 1-5 μm agglomerations of 200-1000 nm particles.

Aqueous electrolytes were prepared from reagent-grade salts such as $KNO_3$ or $NaClO_4$ and de-ionized water. These alkali salt electrolytes are typically pH-neutral. For cases in which the electrolytes were acidified, the pH was lowered using $HNO_3$.

Electrodes containing the freshly synthesized TMCCCs were prepared using various techniques known in the art. The electrochemically active material, carbon black, and polyvinylidene difluoride (PVDF) binder were ground by hand until homogeneous, and then stirred in 1-methyl-2-pyrrolidinone (NMP) solvent for several hours. This slurry was deposited on electronically conductive substrates such as aluminum foil or carbon cloth using a doctor blade or spatula. These electrodes were dried in vacuum or a $N_2$ atmosphere at 60° C.

Activated charcoal counter electrodes were prepared by grinding the charcoal with PVDF before stirring in NMP for several hours, followed by deposition and drying on conductive substrates following the same procedure as in the case of electrodes containing a TMCCC.

As a control test, CuHCF electrodes (5 mg CuHCF) were cycled at a 1 C rate (one hour charge or discharge) by GCPL between 0.8 and 1.05 V with respect to the standard hydrogen electrode (SHE) in a cell that also contained a Ag/AgCl reference electrode, an activated charcoal counter electrode, and 15 mL of aqueous 1 M $KNO_3$ (pH=2) electrolyte. FIG. 37 illustrates that about 7% capacity loss is observed after 50 cycles.

Electrode Life Extension Method 1: P Electrolyte Additives

The dissolution of a TMCCC occurs by the following general process: $APR(CN)_6 \rightarrow A^+ + P^{m+} + R(CN)_6^{n-}$ where A is an alkali cation, P and R are transition metal cations, and $n = -1\cdot(m+1)$. The dissolution process will continue until the saturation limit of the dissolution products is reached. At this chemical equilibrium, the thermodynamic driving force for further dissolution is zero.

The thermodynamic driving force for a chemical process occurring at constant temperature and pressure is the change in the Gibbs Free Energy (ΔG). It is related to the equilibrium constant (Keq) of a reaction by the following expression: $\Delta G = T\cdot \ln(Keq)$, where R is the ideal gas constant and T is the absolute temperature. The equilibrium constant for the dissolution of a TMCCC is the product of the chemical activities of the dissolution products, divided by the chemical activity of solid TMCCC: $Keq = (aA\cdot aP\cdot aR(CN)_6)/aAPR(CN)_6$ where $a_i$ is the chemical activity of the $i^{th}$ species. As ΔG=0 and R and T are nonzero constants, Keq=1, and therefore, $(aA\cdot aP\cdot aR(CN)_6)/aAPR(CN)_6=1$ as well. In most conditions, the chemical activity of a species can be approximated by the concentration of that species, so $cA\cdot cP\cdot cR(CN)_6/cAPR(CN)_6=1$, where $c_i$ is the concentration of the $i^{th}$ species.

As $cA\cdot cP\cdot cR(CN)_6/cAPR(CN)_6=1$, the introduction of an additional quantity of one or more species $A^+$, $P^{m+}$ or $R(CN)_6^{n-}$ to the system must result in the precipitation of $APR(CN)_6$ from dissolved $A^+$, $P^{m+}$, or $R(CN)_6^{n-}$ until the equilibrium constant $Keq = cA\cdot cP\cdot cR(CN)_6/cAPR(CN)_6$ is again equal to one. For example, the dissolution of the CuHCF cathode is described by the following expression: $KCuFe(CN)_6 = K^+ + Cu^{2+} + Fe(CN)_6^{3-}$, and the corresponding equilibrium constant is $Keq=(cK\cdot cCu\cdot cFe(CN)_6)/cCuHCF=1$. Therefore, CuHCF will be less soluble in a concentrated $K^+$ electrolyte than in pure water, as a higher cK must result in lower equilibrium cCu and $cFe(CN)_6$. FIG. 38 illustrates confirmation of this result by measurement of the dissolved ferricyanide concentration ($cFe(CN)_6$) in either pure water or 1 M $KNO_3$ (pH=2) by ultraviolet-visible (UV-vis) absorption spectroscopy.

Following the same principle, the addition of either $P^{m+}$ or $R(CN)_6^{n-}$ to the electrolyte will also shift the chemical equilibrium to favor less dissolution of the solid $APR(CN)_6$ phase. In the case of the CuHCF cathode with a $Cu^{2+}$ electrolyte additive, this result has been confirmed by both UV-vis spectroscopy and by electrochemical testing of electrodes as illustrated in FIG. 39 and FIG. 40.

The same principles are valid for the case of the MnHCMn anode. This material hydrolyzes rapidly in pure water or dilute alkali salt solutions. However, it is much more stable, and therefore capable of reversible electrochemical cycling, in concentrated alkali salt solutions such as saturated sodium perchlorate. Furthermore, enhanced stability is observed upon the addition of $Mn^{2+}$ to the electrolyte. A similar effect can also be achieved by the addition of $CN^-$ anions to the electrolyte, as their presence shifts the equilibrium towards MnHCMn, and away from a hydrolyzed product and dissolved $CN^-$ anions. These results for the stabilization of the MnHCMn anode, in combination with those for the CuHCF cathode demonstrate that the general concept of a $P^{2+}$ electrolyte additive to enhance the stability of a TMCCC applies to both anodes and cathodes.

Electrode Life Extension Method 2: Combination of $P^{2+}$ Electrolyte Additive with P Metal Anode In most previous studies of TMCCC battery electrodes, another TMCCC or a capacitive carbon counter electrode was chosen. In a 1983 patent, Itaya et al briefly describe the use of a TMCCC cathode in combination with a metallic zinc anode in an aqueous $NH_4Cl$ electrolyte. Metallic anodes operate by dissolution during oxidation (discharge) and by electroplating of the metal from cations in solution during reduction (charge).

The choice of a metallic anode P for use in an electrolyte containing a $P^{m+}$ additive and a TMCCC cathode of the general formula $APR(CN)_6$ is advantageous for at least two reasons. First, the presence of $P^{m+}$ in the electrolyte stabilizes the TMCCC cathode against dissolution. Second, the initial presence of $P^{m+}$ in the electrolyte allows the battery to start in a discharged state. Without the addition of $P^{m+}$ to the electrolyte, no electrodeposition can occur at the anode.

FIG. 41 illustrates GCPL of the CuHCF cathode against a metallic Cu anode in an electrolyte containing 100 mM $Cu(NO_3)_2$. Analogous systems include, but are not limited to nickel hexacyanoferrate/$Ni^{2+}$/Ni and zinc hexacyanoferrate/$Zn^{2+}$/Zn. Furthermore, the $P^{m+}$/P anode system need not match the transition metal cation found in the TMCCC cathode. For example, the CuHCF cathode could be operated in an electrolyte containing $Zn^{2+}$ and a Zn metal anode.

Electrode Life Extension Method 3: Electroless Deposition of TMCCC Coatings

A method for the stabilization of TMCCC electrodes against dissolution is the use of a conformal coating that limits their contact with water. However, for an electrode with a coating layer to be useful, the coating must be conductive to alkali cations such as $Na^+$ and $K^+$, or it will prevent the charge and discharge of the TMCCC. Few materials systems are capable of rapid $Na^+$ or $K^+$ conduction at room temperature.

Regular Prussian Blue is much less soluble than many of its analogues. Also, reduced Prussian Blue analogues/TMCCCs have been observed to be less soluble than oxidized ones. In addition, electrochemical oxidation of mixed-valent $KFeIIIFeII(CN)_6$ to Berlin Green $(FeIIIFeIII(CN)_6)$ occurs at a higher potential than the analogous oxidation of TMCCC cathodes such as CuHCF. Therefore, if a CuHCF electrode is coated with a thin, conformal film of reduced, insoluble Prussian Blue, the CuHCF electrode may undergo electrochemical cycling as usual. If the Prussian Blue coating is continuous and conformal, the CuHCF electrode will not dissolve; however, the high ionic conductivity of Prussian Blue allows the electrode to still operate at high rates.

Because the oxidation potential of Prussian Blue to Berlin Green is higher than the oxidation potential of CuHCF, a film of Prussian Blue can be easily deposited onto CuHCF by an electroless reductive precipitation method.

The reduction of Berlin Green to Prussian Blue is analogous to the reduction of the CuHCF cathode, as in each case, carbon-coordinated iron in the framework crystal structure is reduced from $Fe^{3+}$ to $Fe^{2+}$. Unlike Prussian Blue, fully oxidized Berlin Green is sparingly soluble, so dilute solutions of $Fe^{3+}$ and $Fe(CN)_6^{3-}$ can be readily prepared. Electroless deposition of Prussian Blue onto a low-potential electrode (such as CuHCF) will occur from a dilute solution containing $Fe^{3+}$ and $Fe(CN)_6^{3-}$ if that electrode has a potential below that of the reduction of $Fe^{3+}$ to $Fe^{2+}$ (V0=0.771 V vs. SHE). In the case of a CuHCF electrode, this occurs by the following two-step mechanism:

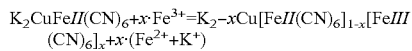

$K_2CuFeII(CN)_6 + x \cdot Fe^{3+} = K_{2-x}Cu[FeII(CN)_6]_{1-x}[FeIII(CN)_6]_x + x \cdot (Fe^{2+} + K^+)$

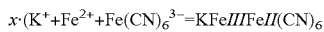

$x \cdot (K^+ + Fe^{2+} + Fe(CN)_6^{3-}) = KFeIIIFeII(CN)_6$

It is reasonable to expect that the reduction of $Fe^{3+}$ results in the formation of a thin film of Prussian Blue on the surface of the CuHCF electrode, as there is widespread precedent for the electrodeposition of Prussian Blue films by the same mechanism: reduction of iron cations, and subsequent Prussian Blue precipitation, from a dilute aqueous solution of $Fe^{3+}$ and $Fe(CN)_6^{3+}$.

The oxidation of Prussian Blue to Berlin Green occurs at a higher potential than the reaction potential of CuHCF (FIG. 42). This means that CuHCF electrodes in electrical contact with Prussian Blue can be cycled without oxidizing the Prussian Blue to the more soluble Berlin Green. Therefore, a conformal coating of insoluble Prussian Blue prevents the slow dissolution of CuHCF electrodes.

This technique offers several advantages: electroless deposition of Prussian Blue is fast and inexpensive; alkali ion transport in Prussian Blue is extremely rapid; and the same technique could be used to stabilize TMCCC anodes (in fact, it could be used on any electrode family).

Methods:

1 $cm^2$ slurry electrodes containing 5 mg of CuHCF were prepared using the standard methods described herein.

An aqueous deposition solution of 2 mM $Fe(NO_3)_3$ and 2 mM $K_3Fe(CN)_6$ was prepared.

As-synthesized CuHCF has an open circuit potential near 1.05 V vs. SHE, too high for electroless deposition of Prussian Blue from $Fe^{3+}$ and $Fe(CN)_6^{3-}$. Thus, a preparative electrochemical reduction to 0.7 V was performed by galvanostatic discharge at a 1 C rate in 1 M $KNO_3$ (pH=2).

The discharged CuHCF electrodes were washed, dried, and then placed in 10 mL of the deposition solution for 30 minutes. They were then washed, dried, and inserted into batteries for testing.

Though the fresh electrodes were black (due to the carbon in the slurry), after exposure to the deposition, the electrodes appeared slightly bluish.

The CuHCF electrodes were cycled at 1 C between 0.8 and 1.05 V against a Ag/AgCl reference electrode and an activated charcoal counter electrode in 15 mL of 1 M $KNO_3$ (pH=2).

Before exposure to the deposition solution, CuHCF electrodes were discharged to 0.7 V vs. SHE. After deposition of the Prussian Blue coating for 30 minutes, their open circuit potential was found to be 0.85 V vs. SHE. From the previously reported galvanostatic potential profile of CuHCF (FIG. 33) this corresponds to a charge fraction of about 5% for the CuHCF, or 3 mAh/g based on its specific capacity of 60 mAh/g. As each sample contained 5 mg CuHCF, the total charge expended during Prussian Blue deposition was 15 μAh. From the 10.16 Å lattice parameter of Prussian Blue and the planar geometric area of the electrode, this total charge corresponds to the deposition of a film with a thickness of 1.1 μm. However, as the electrode is extremely rough with a larger true surface area than its planar one, a true Prussian Blue coating thickness of ~500 nm is reasonable.

The deposition of a Prussian Blue coating consistently improved the capacity retention of the CuHCF electrode. The fractional capacity retention of two control samples and four samples with Prussian Blue coatings is shown in FIG. 43. The improvement of CuHCF capacity retention is reproducibly achieved using the Prussian Blue coating step. Improving the completeness of the coverage of the conformal Prussian Blue coating through optimization of the coating procedure will further improve the magnitude and reliability of the stabilizing effect of the coating layer.

In some publications in which thin films of Prussian Blue are electrodeposited, a supporting electrolyte such as 0.1 M KCl or $K_2SO_4$ is used. This aids electrodeposition, as the ionic conductivity of the solution is much higher in the presence of a more concentrated salt. To determine whether or not a supporting electrolyte enhances the electroless deposition of Prussian Blue coatings on CuHCF electrodes, the coating step was performed in the same 2 mM $Fe^{3+}/Fe(CN)_6^{3-}$ solution, with 0.1 M $KNO_3$ added. At the end of the coating step, the electrodes were washed and dried. Their color remained black, and did not show evidence of a bluish tint. As shown in FIG. 34, there is no improvement in the capacity retention.

FIG. 44 illustrates that the presence of excess $K^+$ in the deposition solution prevents the rapid growth of the Prussian Blue film on CuHCF. This result can be qualitatively explained be the presence of $K^+$ on the right side of the first step of the deposition mechanism. The presence of excess $K^+$ shifts the equilibrium to the left side, so the CuHCF would have to be reduced to a lower open circuit potential to reduce $Fe^{3+}$ to $Fe^{2+}$ in the presence of excess $K^+$.

Finally, the effect of the Prussian Blue coating step on the potential profile of the CuHCF electrode was examined. As shown in FIG. 45, there is no discernible difference between the shapes of potential profiles of samples treated with the deposition solution and fresh control samples.

The morphologies of bare and Prussian Blue-coated CuHCF electrodes were examined using SEM (FIG. 46).

The fresh sample is composed of easily distinguished individual nanoparticles. However, the coated sample is composed of nanoparticles that are bound together in a continuous coating layer. Exposure of the CuHCF electrode to the deposition solution results in the formation of a conformal thin film of Prussian Blue. This film is directly responsible for improved electrode lifetime during battery operation because it acts as a barrier to CuHCF dissolution.

Electrode Life Extension Method 4: Combination of TMCCC Coating with $P^{2+}$ Electrolyte Additives The method for electrode stabilization described in electroless deposition of TMCCC Coatings is now generalized. Other analogues besides Prussian Blue itself may be used as a protective coating against dissolution for another TMCCC, and a protective coating of the formula $APR(CN)_6$ may be used in combination with a $P^{m+}$ electrolyte additives and a P metal anode.

When the reduction potential of the $APR(CN)_6$ coating is higher than the oxidation potential of the TMCCC to be protected, then the same electroless deposition procedure as in the case of a Prussian Blue coating can be used. For example, nickel hexacyanoferrate (NiHCF) has a lower reaction potential than zinc hexacyanoferrate (ZnHCF). Electroless deposition of a conformal film of ZnHCF onto a NiHCF electrode will occur spontaneously if that electrode is placed in a solution containing $Zn^{2+}$ and $Fe(CN)_6^{3-}$:

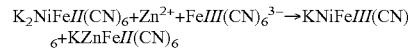
$K_2NiFeII(CN)_6+Zn^{2+}+FeIII(CN)_6^{3-}\rightarrow KNiFeIII(CN)_6+KZnFeII(CN)_6$ Or, in the case of materials not containing excess potassium in the A sites in their structures:

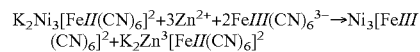
$K_2Ni_3[FeII(CN)_6]^2+3Zn^{2+}+2FeIII(CN)_6^{3-}\rightarrow Ni_3[FeIII(CN)_6]^2+K_2Zn^3[FeII(CN)_6]^2$ This reaction occurs spontaneously because ZnHCF and other TMCCCs are less soluble when reduced than when oxidized. Therefore, for this reaction to yield a conformal thin film on the electrode, but not the additional spontaneous precipitation of oxidized ZnHCF particles, the concentrations of the $Zn^{2+}$ and $FeIII(CN)_6^{3-}$ precursors must be greater than the saturation limit of reduced ZnHCF, but lower than the saturation limit of oxidized ZnHCF. Or, more generally, the spontaneous precipitation of a $A1+xPR(CN)_6$ film with a high reduction potential onto a TMCCC electrode with a lower reduction potential will occur if the precursors $P^{m+}$ and $R(CN)_6^{n-}$ are present in concentrations greater than the saturation limit of reduced $A1+xPR(CN)_6$, but lower than the saturation limit of oxidized $A_xPR(CN)_6$.

The use of a Prussian Blue coating can be used in combination with a Fe electrolyte additive, but it is by the reduction potential of aqueous $Fe^{3+}$ to $Fe^{2+}$ at 0.771 V. To avoid reversibly oxidizing and reducing the Fe in the electrolyte, the potentials of the cathode and anode must both remain below 0.771 V. For TMCCC cathodes with reaction potentials higher than this, a different coating must be chosen. For example, a coating of ZnHCF can be combined with a $Zn^{2+}$ electrolyte additive because $Zn^{2+}$ cannot be oxidized further in aqueous solutions. Furthermore, as the $Zn^{2+}$ electrolyte additive can be paired with a metallic Zn anode, a general cell of the following form can also be constructed: A TMCCC cathode of the general formula $APR(CN)_6$, coated by another TMCCC of the general chemical formula $AP'R'(CN)_6$, with an electrolyte additive $P'^{m+}$ and a metallic anode P'. Combinations include a ZnHCF coating/$Zn^{2+}$ electrolyte additive/Zn metal anode and a NiHCF coating/$Ni^{2+}$ electrolyte additive/Ni metal anode. Furthermore, a ZnHCF cathode or ZnHCF-coated cathode could be paired with a $Zn^{2+}$ electrolyte additive and a galvanized steel anode, as the zinc in the galvanized surface layer would provide an adequate charge capacity.

Electrode Life Extension Method 5: Coating of Individual TMCCC Particles with a TMCCC Shell A protective coating of insoluble Prussian Blue or a TMCCC can be applied not only to entire electrodes, but to the individual particles that compose the electrode. In one prior case, unrelated to the use of TMCCCs as battery electrodes, nanoparticles of a TMCCC were coated with a conformal shell of another TMCCC. The advantage of this method of electrode stabilization is that if performed correctly, every particle of electrochemically active material has a conformal shell that prevents its dissolution. However, a larger total mass of protective layer is needed because of the larger surface area.

Copper hexacyanoferrate was synthesized as described herein. Sodium thiosulfate ($Na_2S_2O_3$), a reducing agent, was added by dropwise to the solution containing the CuHCF nanoparticles 15 minutes after their initial precipitation. The $Na_2S_2O_3$ was added in a 0.8:1 molar ratio to the potassium hexacyanoferrate precursor used to make the CuHCF. During this process, the color of the solution changed from brown to purple. The low oxidation potential of $Na_2S_2O_3$ results in the reduction of the CuHCF nanoparticles. After this chemical reduction step, the electrochemical potential of the CuHCF was below 0.771 V, low enough to spontaneously reduce $Fe^{3+}$ to $Fe^{2+}$.

The chemically reduced CuHCF was centrifuged and washed with water to remove excess $Cu^{2+}$ left over from its precipitation. It was then redispersed in pure water by sonication. Finally, by dropwise addition, a Prussian Blue deposition solution of 10 mM $Fe(NO_3)_3$ and 10 mM $K_3Fe(CN)_6$ was added to the solution of reduced CuHCF particles. This solution was slowly added until the molar ratio of the $Fe(NO_3)_3$ and $K_3Fe(CN)_6$ to the hexacyanoferrate in the CuHCF reached 1:4. The solution changed color from purple to dark blue, indicating that the $Fe^{3+}$ was reduced to $Fe^{2+}$, and that the $Fe^{2+}$ then reacted with the $Fe(CN)_6^{3-}$ to form Prussian Blue. This process is analogous to the reduction of iron that occurs during the exposure of electrodes containing CuHCF to the Prussian Blue deposition solution described herein. The rest of the electrode preparation method was the same as described above.

The reduction by thiosulfate is necessary only because the CuHCF was synthesized in a fully oxidized state, and its potential was too high to reduce the $Fe^{3+}$ to $Fe^{2+}$. In the case that some other TMCCC is chosen to be the coating layer (for example, to be paired with a $P^{2+}$ electrolyte additive and a P metal anode), then the chemical reduction step of the electrode nanoparticles may not be necessary, as described in the discussion of a combination of TMCCC coating with $P^{2+}$ electrolyte additives for the case of a NiHCF electrode and a ZnHCF coating.

As shown in FIG. 47, an electrode containing CuHCF particles coated with Prussian Blue lost less than 1% of its capacity after 50 galvanostatic cycles at a 1 C rate. In comparison, an electrode containing uncoated CuHCF particles lost about 7% of its capacity after the same duration of cycling. This result conclusively demonstrates that the coating of individual particles with Prussian Blue results protects them from dissolution in the battery electrolyte.

The performance of the CuHCF electrode is similar with and without a conformal Prussian Blue coating of the individual particles. As shown in FIG. 48, the potential profiles of electrodes containing bare and coated particles are similar (FIG. 48a).

Prussian Blue can be electrochemically reduced near 0.4 V vs. SHE. The Prussian Blue coating is electrochemically active at low potential (FIG. 17b), confirming that the coating treatment indeed resulted in the successful deposition of Prussian Blue coating. The ratio of the observed capacities of CuHCF to Prussian Blue is about 4:1 between 0.2 and 1.05 V vs. SHE. This is consistent with the 4:1 molar ratio of CuHCF to Prussian Blue precursors present during the coating procedure.

Electrode Life Extension Method 6: Coating of TMCCC Particles with Polymer Coatings by Redox Deposition Other coatings besides TMCCCs may be used to protect a TMCCC battery electrode (or its constituent particles) from dissolution. Such a coating material must be conductive to cations such as $Na^+$ or $K^+$ so that the electrode can be charged and discharged, and it should not be significantly soluble in aqueous electrolytes. If it has non-negligible solubility in aqueous electrolytes, then its dissolution products must be electrochemically inactive in the potential window of the anode and cathode of the battery.

A variety of mixed conducting polymers including polypyrroles and polythiophenes are known to intercalate cations such as $Na^+$. They are insoluble in aqueous electrolytes. Therefore, a conformal polymer coating can protect a TMCCC electrode from dissolution.

For example, CuHCF was synthesized by the standard method described herein. Pyrrole was then added by slow, dropwise addition to the solution in a 1:2 mass ratio with respect to the CuHCF already present. The solution immediately turned black, as the pyrrole was oxidized to polypyrrole upon contact with the CuHCF nanoparticles. The rest of the electrode preparation method was the same as the standard method.

The use of a polypyrrole coating stabilizes the CuHCF against dissolution in the battery electrolyte. As shown in FIG. 49, the capacity of an electrode containing polypyrrole-coated CuHCF nanoparticles is completely stable for 50 galvanostatic cycles at a 1 C rate in 1 M $KNO_3$ (pH=2). In comparison, a control electrode containing untreated CuHCF loses about 7% of its capacity during cycling under the same conditions.

The initial charge of polypyrrole-coated CuHCF shows a large, irreversible capacity. However, the electrode is completely stable in charge and discharge after the first few cycles. Little difference is observed between the first discharge and the charge and discharge during the 20th cycle as illustrated in FIG. 50.

In some embodiments having a specific chemical formula for the PBA material, e.g., copper hexacyanoferrate or manganese hexacyanomangate, depositing a coating may include polymerization of polythiophene.

Other Stabilization Methods

Below are described several additional methods for the stabilization of TMCCCs against dissolution, and therefore, the extension of the operational life of TMCCC electrodes.

Complexation with amines: a variety of amines have been shown to form strong complexes with hexacyanoferrate, and therefore, can coordinate strongly to the surface of a TMCCC particle to form a protective layer. These include simple diamines such as ethylene diamine, and larger aromatic amines such as Nile Blue. Furthermore, oxides of cyclic amines such as pyridine-n-oxide can be used to coat TMCCC particles. Addition of one or more of these amines during the synthesis of the TMCCC, or as an electrolyte additive, will result in a conformal surface coating layer that stabilizes the TMCCC against dissolution.

Anions of insoluble $P2^+$ salts: soluble or trace-soluble alkali cation salts such as sodium fluoride, carbonate, or oxalate can be added during the synthesis of a TMCCC, or as an electrolyte additive. During the dissolution of a TMCCC, the $Pm^+$ cation hydrates and leaves the surface of the particle to enter the aqueous solution. Transition metal salts of anions such as fluoride, carbonate, oxalate, and others are insoluble, and therefore, will react with the Pm+ at the surface of the TMCCC particle to form an insoluble coating layer.

Thin films of insoluble transition metal sulfides such as CdS, $Cu_2S$, MnS, and ZnS are commonly fabricated for semiconductor devices including photodiodes. Deposition of these films from aqueous solution can be easily accomplished by reaction of a transition metal cation $Pm^+$ with a sulfide precursor such as thiourea, thiosulfate, or sodium sulfide. Many transition metal sulfides are good sodium ion conductors, so a metal sulfide coating of a TMCCC will protect it against dissolution while still allowing it to react electrochemically. These metal sulfides are unstable against hydrolysis at high potentials, and are most fit for use on TMCCC anodes with reaction potentials near or below SHE.

Similarly, small molecules containing thiol groups can coordinate to the transition metal cations Pm+ on the surface of a TMCCC particle. Examples include simple thiols such as decanethiol, and more complicated molecules such as cysteine.

Additionally, extremely thin (5-10 nm) conformal layers of metal oxides such as $Al_2O_3$, $SiO_2$, and $TiO_2$ can be readily grown on the surfaces of TMCCC nanoparticles using a sol-gel decomposition process from organometallic precursors. For example, in the case of $SiO_2$, the slow addition of dilute tetraethyl orthosilicate (silicon tetraethoxide) to the aqueous solution containing newly synthesized TMCCC particles will result in the hydrolysis as polymerization of $SiO_2$ nanoparticles, which form a thin, continuous film on the surface of the TMCCC particle. These oxides are completely insoluble in water, so they provide a robust barrier to dissolution of the TMCCC. In addition, as they are extremely thin, and in some cases (such as $Al_2O_3$) have good Na+ conductivity, they do not strongly limit the transport of alkali cations in and out of the TMCCC during electrochemical cycling.

In the discussion regarding additives and coatings, there are descriptions of situations in which an additive to the electrolyte "sticks" bonds, or otherwise attaches to a surface of an electrode material and thereby form a coating. Additives are described as situations in which soluble chemical components of the electrode are added to the electrolyte which does not result in a coating but does reduce/prevent dissolution. There are also complex situations in which a Prussian Blue coating is applied to an electrode and then components of the coating are added to the electrolyte to stabilize and resist dissolution which slows/eliminates a rate of capacity loss. A coating of an electrode may occur after an electrode is completely formed, or constituent materials that will be used to form the electrode are coated before the electrode is formed. The material(s) added to the electrolyte that is/are used to form a coating (distinguished from additives as a class of substances added to the electrolyte that directly stabilize the electrode) are not referred to herein as additives. These coating-forming material(s) bond to the surface of the electrode to form the stabilizing coating.

In some situations, for example Pyridine-N-oxide and the thiols and organic molecules that stick to a surface of an electrode. These materials are classified herein as coatings and not polymers as they do not bond together (polymerize) into big polymer strands. A hybrid solution includes attachment of small molecules onto a surface of the electrode, or electrode constituents, and then polymerizing these small molecules all together into a single polymer coating for the electrode.

When coating a PBA electrode with a conformal coating layer of a PBA coating material, the disclosed embodiments preferably use a different PBA for the coating than is used for the electrode. The coating material is selected to be more stable than the electrode material, and/or the coating material allows a use of A, P, or $R(CN)_6$ electrolyte additives in way that is better (e.g., less expensive, more stable, or the like). In these conformal coatings, the "P" transition metal cations of the electrode and of the coating may be the same or different cations, and when the same the coating PBA has a different A and/or $R(CN)_6$ material.

In the case of additives, some embodiments provide for electrodes having multiple P transition metal cations (e.g., P1 and P2). The electrolyte may be presaturated with a P1 additive, a P2 additive, or both a P1 additive and a P2 additive. For more than 2 P transition metal cations in the electrode, all the different permutations of one or more corresponding additive may be employed. In some cases the electrolyte additive may be of a P transition metal cation that is not present in an electrode of the system.

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A rechargeable electrochemical device, comprising:
a first electrode;
a second electrode;
an electrolyte coupled with said electrodes; and
a first additive in communication with said electrolyte;
wherein a first particular one electrode of said electrodes includes a first variable potential material having a first electrochemical potential V0 with said first electrochemical potential V0 having a potential range of V1 at full charge to V2 at full discharge;
wherein a second particular one electrode different from said first particular one electrode includes a second material having a second electrochemical potential V3; and
wherein said first additive is configured to participate in a first electrochemical reaction at an electrochemical potential V4 with said first particular one electrode degrading a charging efficiency of said first particular one electrode; and wherein said reaction electrochemical potential V4 has a value between said first electrochemical potential V0 and said second electrochemical potential V3.

2. The rechargeable electrochemical device of claim 1 wherein a charging of said electrodes produces a relative state-of-charge imbalance between said electrodes, wherein said electrochemical reaction includes a duration, and wherein said duration is preconfigured to reduce said relative state-of-charge imbalance between said electrodes.

3. The rechargeable electrochemical device of claim 1 wherein said first particular one electrode includes a first transition metal cyanide coordination compound (TMCCC).

4. The rechargeable electrochemical device of claim 1 further comprising a second additive in communication with said electrolyte wherein a second particular one electrode of said electrodes, different from said first particular one electrode of said electrodes, includes a second variable potential material; and wherein said second additive participates in a second predetermined side-reaction with a second single one of said electrodes.

5. The rechargeable electrochemical device of claim 4 wherein said second particular one electrode includes a second transition metal cyanide coordination compound (TMCCC).

6. The rechargeable electrochemical device of claim 3 wherein said TMCCC material includes a composition having the general chemical formula $A_xM_y[R(CN)_{6-j}L_j]_z \cdot nH_2O$, wherein:

A includes one or more cations;
M includes one or more metal cations;
R includes one or more transition metal cations; and
L is a ligand substituted in the place of a $CN^-$ ligand; where $0 \leq x \leq 2$;

$0 < y \leq 4$;

$0 < z \leq 1$;

$0 \leq j < 6$; and $0 \leq n \leq 5$.

7. The rechargeable electrochemical device of claim 1 wherein a concentration of said additive is included within a range of 10 to 10,000 parts per million.

8. The rechargeable electrochemical device of claim 1 wherein said additive includes one or more organic molecules.

9. The rechargeable electrochemical device of claim 8 wherein said one or more organic molecules are configured to participate in a reversible electrochemical redox reaction at one or more of said electrodes during an application of charging energy to said electrodes.

10. The rechargeable electrochemical device of claim 8 wherein said one or more organic molecules are configured to participate in an irreversible electrochemical redox reaction at one or more of said electrodes during an application of charging energy to said electrodes.

11. The rechargeable electrochemical device of claim 10 wherein said irreversible electrochemical redox reaction results in a polymerization of said one or more organic molecules.

12. The rechargeable electrochemical device of claim 1 wherein said additive includes a transition metal salt.

13. The rechargeable electrochemical device of claim 12 wherein said salt is configured to participate in a reversible electrochemical redox reaction at one or more of said electrodes during an application of charging energy to said electrodes.

14. The rechargeable electrochemical device of claim 12 wherein said salt is configured to participate in an irreversible reaction at one or more of said electrodes during an application of charging energy to said electrodes.

15. The rechargeable electrochemical device of claim 12 wherein said salt includes a transition metal cation.

16. The rechargeable electrochemical device of claim 12 wherein said salt includes a transition metal polyanion.

17. The rechargeable electrochemical device of claim 1 wherein said additive includes an organometallic molecule.

18. The rechargeable electrochemical device of claim 17 wherein said first electrochemical reaction is reversible and wherein said organometallic molecule is configured to participate in said first electrochemical reaction.

19. The rechargeable electrochemical device of claim 17 wherein said organometallic molecule includes a metallocene.

20. A method for reducing a relative state-of-charge imbalance of a set of electrodes of a rechargeable electrochemical device during a charging process, the set of electrodes coupled to an electrolyte including a first additive and wherein a first one electrode of the set of electrodes includes a first variable potential material, comprising:

a) performing the charging process which charges the set of electrodes at different relative rates producing a relative state-of-charge imbalance for the set of electrodes; and b) decreasing said relative state-of-charge imbalance responsive to an interference with a charging efficiency of at least one electrode of the set of electrodes.

21. The rechargeable electrochemical device of claim 1 wherein said first additive is initially in an oxidized state, wherein said first electrochemical reaction includes a reaction in which said additive is reduced, and wherein said reaction electrochemical potential V4 is greater than or equal to said first electrochemical potential V0.

22. The rechargeable electrochemical device of claim 21 wherein a charging of said electrodes produces a relative state-of-charge imbalance between said electrodes, wherein said first electrochemical potential V0 is initially greater than said reaction electrochemical potential V4, wherein said first electrochemical potential V0 is responsive to said charging to decrease towards V1, wherein said reaction in which said additive is reduced is configured to begin decreasing said relative state-of-charge imbalance when said first electrochemical potential V0, responsive to said charging, is less than said reaction electrochemical potential V4.

23. The rechargeable electrochemical device of claim 1 wherein said first additive is initially in a reduced state, wherein said first electrochemical reaction includes a reaction in which said additive is oxidized, and wherein said reaction electrochemical potential V4 is less than or equal to said first electrochemical potential V0.

24. The rechargeable electrochemical device of claim 23 wherein a charging of said electrodes produces a relative state-of-charge imbalance between said electrodes, wherein said first electrochemical potential V0 is initially lesser than said reaction electrochemical potential V4, wherein said first electrochemical potential V0 is responsive to said charging to increase towards V1, wherein said reaction in which said additive is oxidized is configured to begin decreasing said relative state-of-charge imbalance when said first electrochemical potential V0, responsive to said charging, is greater than said reaction electrochemical potential V4.

25. The method of claim 20 wherein the first variable potential material includes a first electrochemical potential V0 with said first electrochemical potential V0 having a potential range of V1 at full charge to V2 at full discharge, wherein the set of electrodes includes a second electrode different from the first electrode, said second electrode including a second material having a second electrochemical potential V3, wherein the first additive is configured to participate in a first electrochemical reaction at an electrochemical potential V4 with the first electrode producing said interference, and wherein said electrochemical potential V4 has a value between said first electrochemical potential V0 and said second electrochemical potential V3.

26. The method of claim 25 wherein the first additive is initially in an oxidized state, wherein said first electrochemical reaction includes a reaction in which said additive is reduced, and wherein said reaction electrochemical potential V4 is greater than or equal to said first electrochemical potential V0.

27. The method of claim 26 wherein a charging of said electrodes produces said relative state-of-charge imbalance between said electrodes, wherein said first electrochemical potential V0 is initially greater than said reaction electrochemical potential V4, wherein said first electrochemical potential V0 is responsive to said charging to decrease towards V1, wherein said reaction in which said additive is reduced is configured to begin decreasing said relative state-of-charge imbalance when said first electrochemical potential V0, responsive to said charging, is less than said reaction electrochemical potential V4.

28. The method of claim 25 wherein the first additive is initially in a reduced state, wherein said first electrochemical reaction includes a reaction in which said additive is oxidized, and wherein said reaction electrochemical potential V4 is less than or equal to said first electrochemical potential V0.

29. The method of claim 28 wherein a charging of said electrodes produces said relative state-of-charge imbalance between said electrodes, wherein said first electrochemical potential V0 is initially lesser than said reaction electrochemical potential V4, wherein said first electrochemical potential V0 is responsive to said charging to increase towards V1, wherein said reaction in which said additive is oxidized is configured to begin decreasing said relative state-of-charge imbalance when said first electrochemical potential V0, responsive to said charging, is greater than said reaction electrochemical potential V4.

* * * * *